United States Patent [19]
Brown

[11] Patent Number: 6,029,099
[45] Date of Patent: *Feb. 22, 2000

[54] METHOD OF A NETWORK THAT LEARNS

[76] Inventor: Robert Alan Brown, 8 Foster St., Mattapoisett, Mass. 02739

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,282

[22] Filed: Mar. 10, 1997

Related U.S. Application Data

[60] Continuation of application No. 08/422,581, Apr. 14, 1995, abandoned, which is a division of application No. 08/155,587, Nov. 22, 1993, Pat. No. 5,579,440.

[51] Int. Cl.[7] ............................. G06E 1/00; G06F 15/45
[52] U.S. Cl. ..................... 700/245; 700/250; 706/16; 706/26
[58] Field of Search ................... 395/20, 11, 23; 700/245, 250

[56] References Cited

U.S. PATENT DOCUMENTS

| | | | |
|---|---|---|---|
| 4,258,425 | 3/1981 | Ramsey et al. | 708/248 |
| 4,366,551 | 12/1982 | Holtz | 364/900 |
| 4,802,103 | 1/1989 | Faggin et al. | 395/24 |
| 5,075,868 | 12/1991 | Andes et al. | 395/24 |
| 5,161,203 | 11/1992 | Buckley | 395/20 |
| 5,226,092 | 7/1993 | Chen | 382/14 |
| 5,687,076 | 11/1997 | Pam | 446/436 |
| 5,710,870 | 1/1998 | Ohm et al. | 700/263 |
| 5,719,480 | 2/1998 | Bock et al. | 318/568.11 |
| 5,724,489 | 3/1998 | Yamamoto | 700/245 |
| 5,781,697 | 7/1998 | Jeong | 706/8 |
| 5,781,705 | 7/1998 | Endo | 700/262 |
| 5,870,527 | 2/1999 | Fujikawa et al. | 700/245 |
| 5,872,893 | 2/1999 | Takenaka et al. | 700/245 |

*Primary Examiner*—Tariq R. Hafiz
*Assistant Examiner*—Michael Pender

[57] ABSTRACT

A self-learning network with: (a) one or more sensor(s) in one or more sensor unit(s) with a plurality of memory cells that forward-select values of one or more intermediate variable(s) $I_1, J_1, \ldots$ according to their stored values and the conditions identified by its sensor(s) in a given sensing and action period, (b) with or without one or more intermediate units with a plurality of bidirectional memory cells that forward-select a value of one or more intermediate output variable(s) $I_2, J_2, \ldots$ according to their stored values and the value(s) of the intermediate input variable(s) $I_1, J_1, \ldots$, and (c) one or more actuator(s) in one or more actuator unit(s) connected to one or more intermediate variable(s) $I_1, J_1, \ldots$ or $I_2, J_2, \ldots$ with a plurality of bidirectional memory cells that forward-select values of one or more actuators according to their stored values and the value(s) of its intermediate variable(s) $I_1, J_1, \ldots$ or $I_2, J_2, \ldots$. The bidirectional memory cells then back-select a value of each intermediate co-variable $I_1', J_1', \ldots$ or $I_2', J_2', \ldots$ according to their stored values and the actions that actually occur within each specific sensing and action periods. The stored values are reduced in the forward-selecting memory cells, and the stored values are increased in the back-selecting bidirectional memory cells, and are increased in the memory cells at the intersection of the back-selected value(s) of the intermediate co-variable $I_1', J_1', \ldots$ and the conditions identified by its sensor(s) in that sensing and action period.

8 Claims, 19 Drawing Sheets

METHOD OF A NETWORK THAT LEARNS

This application is a continuation of application Ser. No. 08/422,581 filed Apr. 14, 1995, now abandoned, which is a divisional of application Ser. No. 08/155,587 filed Nov. 22, 1993 U.S. Pat. No. 5,579,440.

BACKGROUND

1. Field of Invention This invention relates to the method of machines that produce an action in response to sensed conditions in discontinuous steps according to instructions stored in memories, specifically to a machine that establishes its own instructions according to the most likely action state previously encountered by the machine in each step for each sensed condition in each step.

2. Discussion of Prior Art

Most controlled machines are programmed to operate in a specific way before they are put into use. This programming process requires a detailed set of instructions to produce some desired result. This can be accomplished readily for simple control tasks such as cutting parts with a numerically controlled milling machine according to the specific dimensions of the part drawing. However, it may be difficult to know beforehand what conditions will be encountered, and what actions will be required in an application like a surveillance robot. The problem can be overcome by putting the machine into operation, and then using the machine to discover and incorporate the desired control behavior.

In general practice, there are two ways to incorporate the desired control behavior after a machine is put into use. One is based upon absolute (all-or-nothing) associative memories, as shown in U.S. Pat. No. 4,538,243 to Bernd Zehner (1985), and the other is based upon neural networks, as shown in U.S. Pat. No. 5,161,203 to B. Shawn Buckley (1992).

An absolute associative memory writes the input word (sensed condition) into the address of the output word (desired action). In use, the associative memory system searches for the output word (address) that contains the exact match of the input word either through the Boolean "and" function, or a mismatch through the Boolean "or" function. Thus it is called an associative content addressable memory (ACAM), and is considered self-learning since it learns the output word that occurs with each input word.

A neural network operates in much the same way as an associative memory. However, a neural network operates by altering weights common to specific input words and desired output words. In use, a neural network finds the output word in which the sum of the weights belonging to the extant input word is a maximum. This output word is considered the best fit to the input word. Since the best fit is conditional, according to the fitness of the other possible output words, a neural network can be considered to have a conditional memory. Nevertheless, associative memories and neural networks suffer from several disadvantages:

(a) If an associative memory cannot find an output word that exactly matches the input word, additional less restrictive searches must be made by the associative memory system to find the output word that is associated with the input word. In most robot applications, some action state (output word) is required for every sensed state (input word). A robot machine controlled by an associative memory may not have enough time to make multiple searches to find an action state of each sensed state. Since the best fit output word is always found in every search in a conditional memory, a neural network is a more appropriate controller for a robot type machine.

(b) Memory-controlled machines must also deal with the question: Do specific input and output variables belong together as a group, or do they belong in separate groups? An associative memory cannot inherently make these distinctions. However, neural networks have the capability of being inherently self-organizing. That is to say, they can identify input and output variables that operate best when grouped together, and can identify the input and output variables that operate best when they are separate from other input and output variables.

(c) Associative memories and neural networks are designed around the binary (two-value) number system, which is less efficient than the trinary (three-value) number system.

(d) When memory units can be arranged in interconnected networks, information can flow forward from input variables to output variables, and backward from output variables to input variables in many different pathways. However, absolute associative memories cannot be connected to one another directly in networks because their absolute memory cells leave no traces of previously erased pathways. However, neural network units can be connected directly into networks because output data can be associated with input data through conditional traces in one or more intermediate layers of neural network units.

(e) However, the analog circuitry required to accurately sum currents in a neural network is difficult to implement in the large scale integration of printed circuits (LSI) in comparison to the discrete operations of an associative memory. Usually, digital computers are used to simulate the operation of neural networks. However, the serial process of the digital computer imposes speed limitations on the inherently parallel process of neural networks.

OBJECTS AND ADVANTAGES

A great improvement in self-learning machines could be achieved by the creation of a discrete memory system that can perform the many functions of a neural network. A complete discussion of this kind of self-learning machine is presented in my forthcoming book entitled *Machines That Learn* (1994), Oxford University Press. Accordingly, several objects and advantages of my invention are as follows:

(a) My self-learning machine learns the actions that are desired by its operators, or discovers and incorporates whatever actions are allowed by its environment, as each new condition is encountered. It uses discrete conditional memory cells that store a range of analog values rather than the single absolute (all-or-nothing) state of an associative memory. The analog value stored in each conditional memory cell is adjusted automatically in the manner of the lagged demand register in my own U.S. Pat. No. 3,325,732 (1967), according to the historical probability of each output word occurring with each input word, instead of being changed in the all-or-nothing manner of an associative memory. Thus, the relative fitness of each output word for a given input word can be found in a single search.

(b) Since the analog value of each conditional memory cell in the self-learning memory matrices described herein can be adjusted automatically according to the concurrence of output states with input states, the state of all of the input variables can determine the state of all of the output variable in a unitary organization. Or, the state of individual input variables can determine the state of individual output variables despite the state of other input variables in a diverse organization. Thus, the simple self-learning memory matrices described herein are inherently self-organizing.

(c) The input and output variables of a memory-controlled machine can be digitized by means of an input encoder, output decoder, and feedback encoder. This greatly reduces the number of memory cells required to produce machine behavior with a given input/output resolution. Moreover, these digitizing devices can be readily designed to operate in the trinary number system, which is significantly more efficient than the binary number system used in associative memories and neural networks.

(d) My self-learning machines can use bidirectional memory cells and bidirectional memory matrices that back-select the value of an output co-variable of a first memory matrix preceding a second memory matrix, in which the back-selected value of the output co-variable belongs to the value of the output variable of the first matrix that is most likely to forward select the actual value of the output variable of the second matrix. Thus, these bidirectional memory matrices can be used in networks of matrix units.

(e) These discrete conditional memory cells also can be arranged in matrices similar to conventional discrete memories, allowing these self-learning memory circuits to be readily implemented using the large scale integration (LSI) techniques commonly used with conventional and associative memories. Thus, the self-learning memory matrices shown herein act like neural networks, while retaining the basic simplicity of absolute associative memories.

Still, further objects and advantages will become apparent from a consideration of the following description and drawings.

DRAWING FIGURES

SUMMARY OF INVENTION

This invention provides a machine that recognizes the input state that occurs at predetermined moments in time, selects the output state that has most often occurred with this input state based upon its memory using the Boolean "and" function, reduces its propensity to select that output state when that input state occurs in the future, attempts to produce the selected output state within a predetermined period of its recognition of the input state, measures the actual output state that takes place within a predetermined period of its attempt to produce the output state, and increases its propensity to select the actual output state when that input state occurs in the future.

A simple way of carrying out the Boolean "and" function is by means of a set of discrete switches (memory cells) connected in series. The set of cells represent a specific output word. Of this output word set, the cells representing values of a given input variable are a subset of this set. A cell is made to conduct by applying a sufficient ramp voltage to its search terminal, and applying a voltage to its sense terminal to represent the value of some part of an input word. If every cell in a subset of cells is made conductive by the input word and the ramp voltage, and an output-enable voltage is applied to one end of the word set, the set of cells will conduct the output-enable voltage to an output terminal, signifying the selection of that output word. If just one cell in a subset is nonconductive, the set of cells will not conduct, signifying that this output word is not selected.

Moreover, the propensity of each cell to conduct can be adjusted by changing the sensitivity of each cell to the ramp voltage. The sensitivity of each cell can be adjusted according to the concurrence of an input word and the output word that it represents. Thus, an output word will be selected for the extant input word at some ramp voltage in a single search. Once an output word is selected, the output-enable voltage can be discontinued so that only one output word is selected in that search. If the output-enable voltage is maintained, a list of output words will be generated in the rank order of their fitness to the input word as the ramp voltage continues to rise.

These conditional memory cells can be modified for bidirectional operation, allowing the bidirectional memory cells to be used in networks of self-learning units.

Embodiment, Forward Selecting Sensor Unit, FIGS. 1–6

Figure 6:
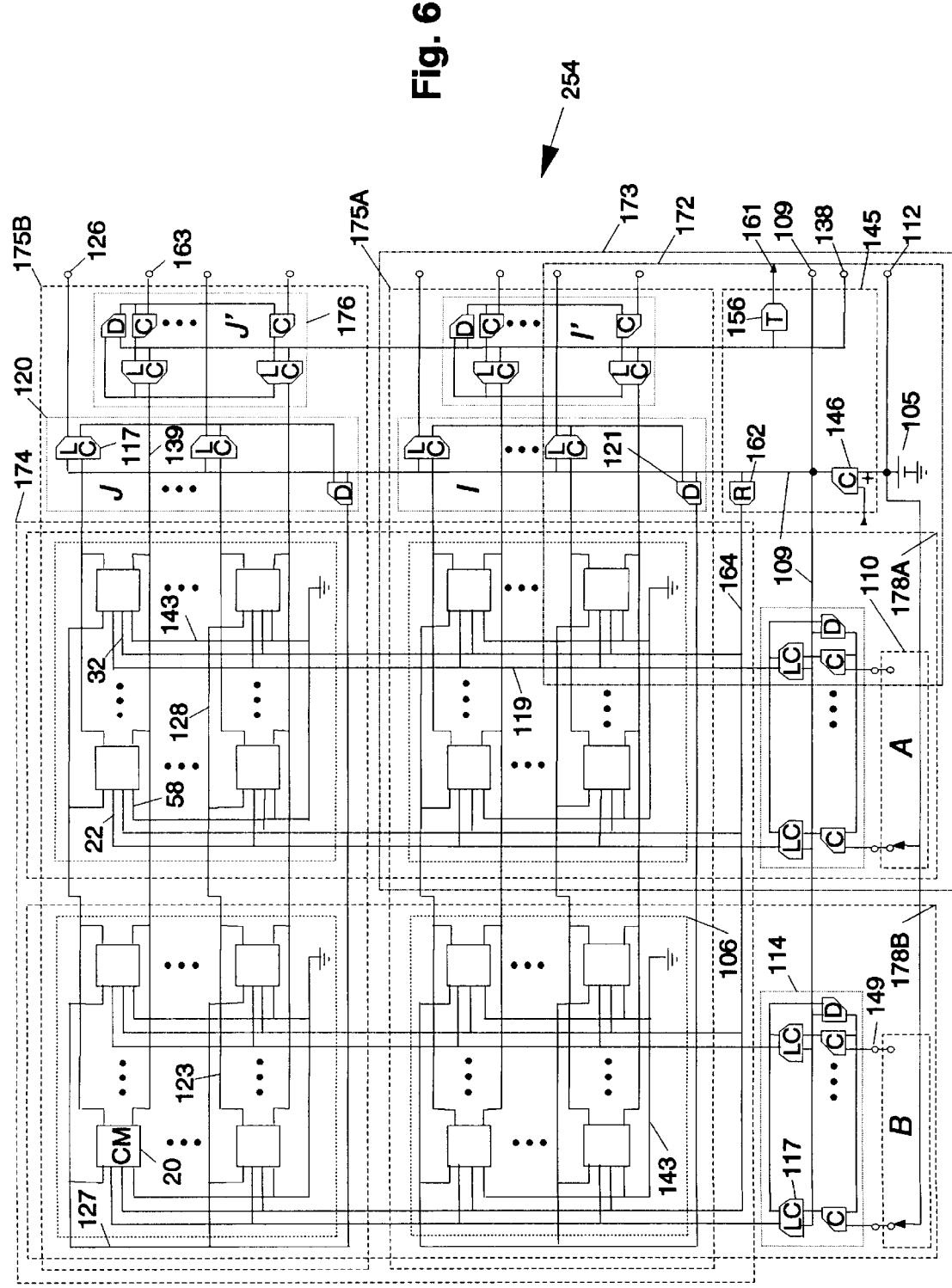
FIG. 6 is a schematic drawing of a monolithic self-learning sensor unit that contains a monolithic memory matrix of memory submatrices connected to multiple sensor and matrix output variables.
Figure 19:
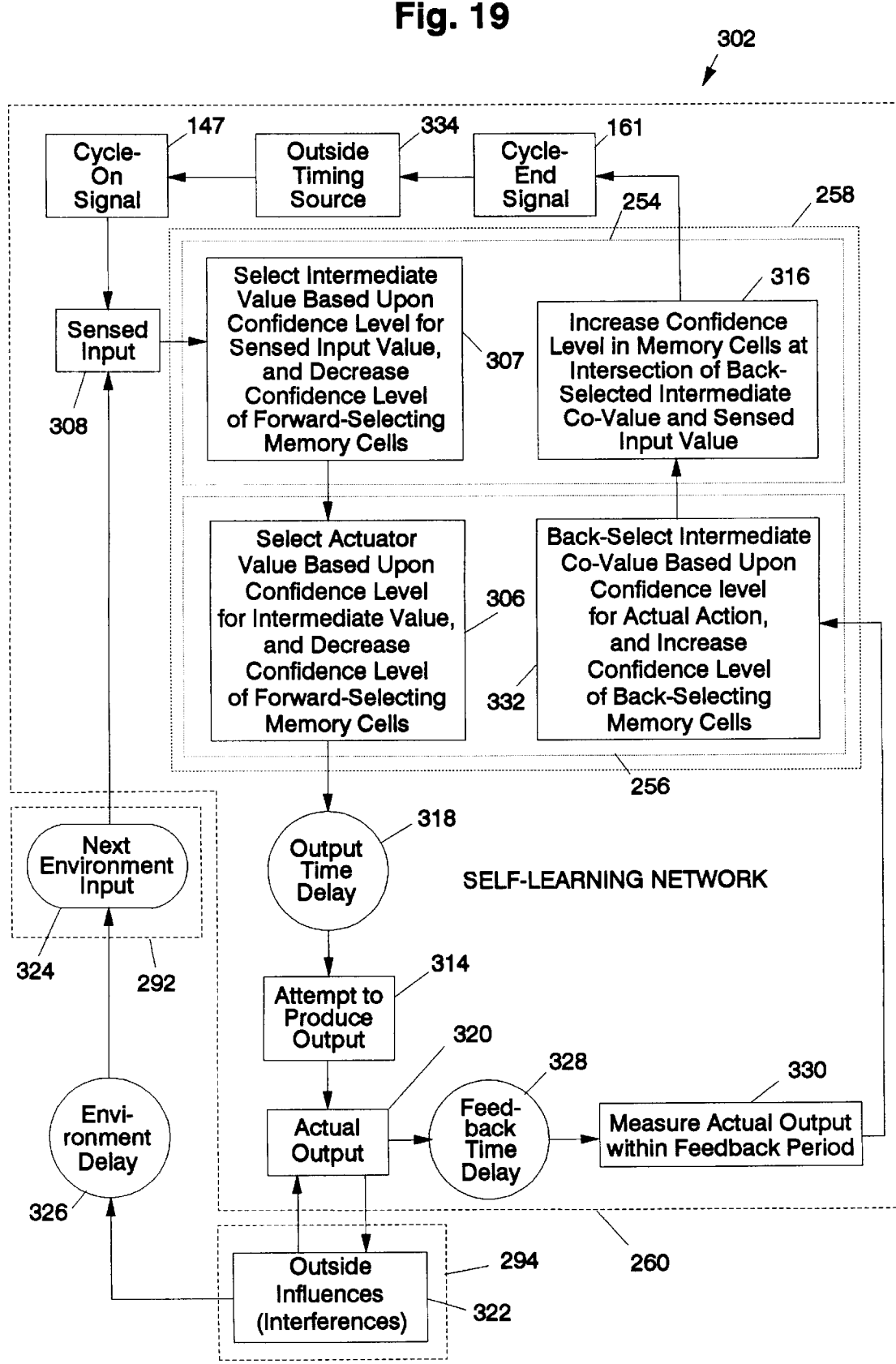
FIG. 19 is a flowchart of the empirical algorithm used by a work of self-learning units.

A self-learning sensor unit 254 shown in FIG. 6 is made up of a sensor or sensors 110 that identify conditions in an environment at particular moments determined by an outside timing source 334 shown in FIG. 19, a set of scalar memory submatrices 106 made up of conditional memory cells 20, which select outputs based upon these sensed conditions and their stored sensitivity values, causing the sensitivity of the selecting memory cells 20 to be reduced, and a feedback circuit 176 and 139, which identifies the actual actions that occur at particular moments after the sensed conditions, causing the sensitivity of the feedback-selected memory cells 20 to be increased, and a cycle logic controller 145, which governs the sequence of sensing, selecting, and backfeeding, as described in the following drawings.

Description of a conditional memory cell

Figure 1:
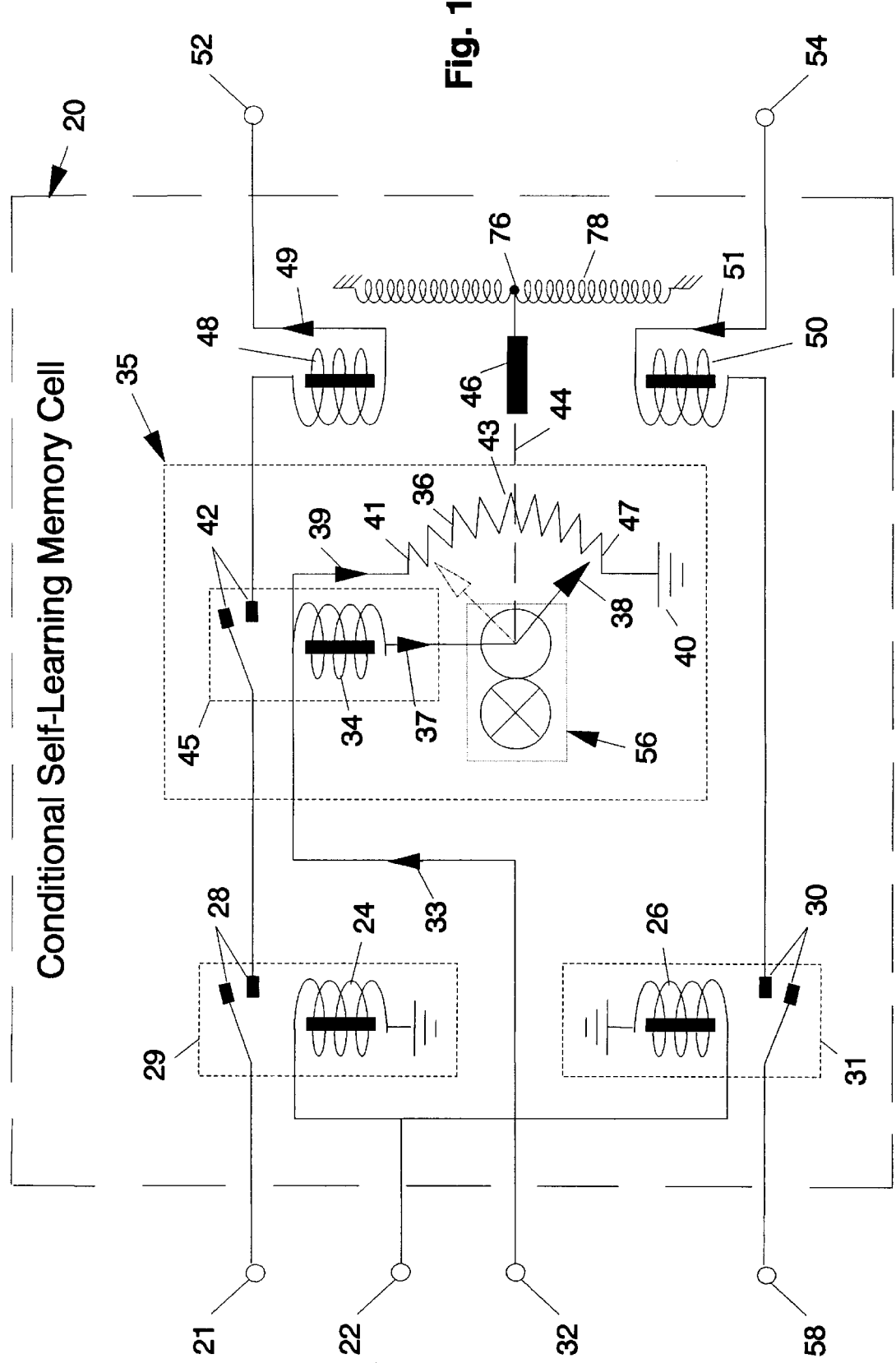
FIG. 1 is a detailed schematic of a single conditional self-learning memory cell.
Figure 5:
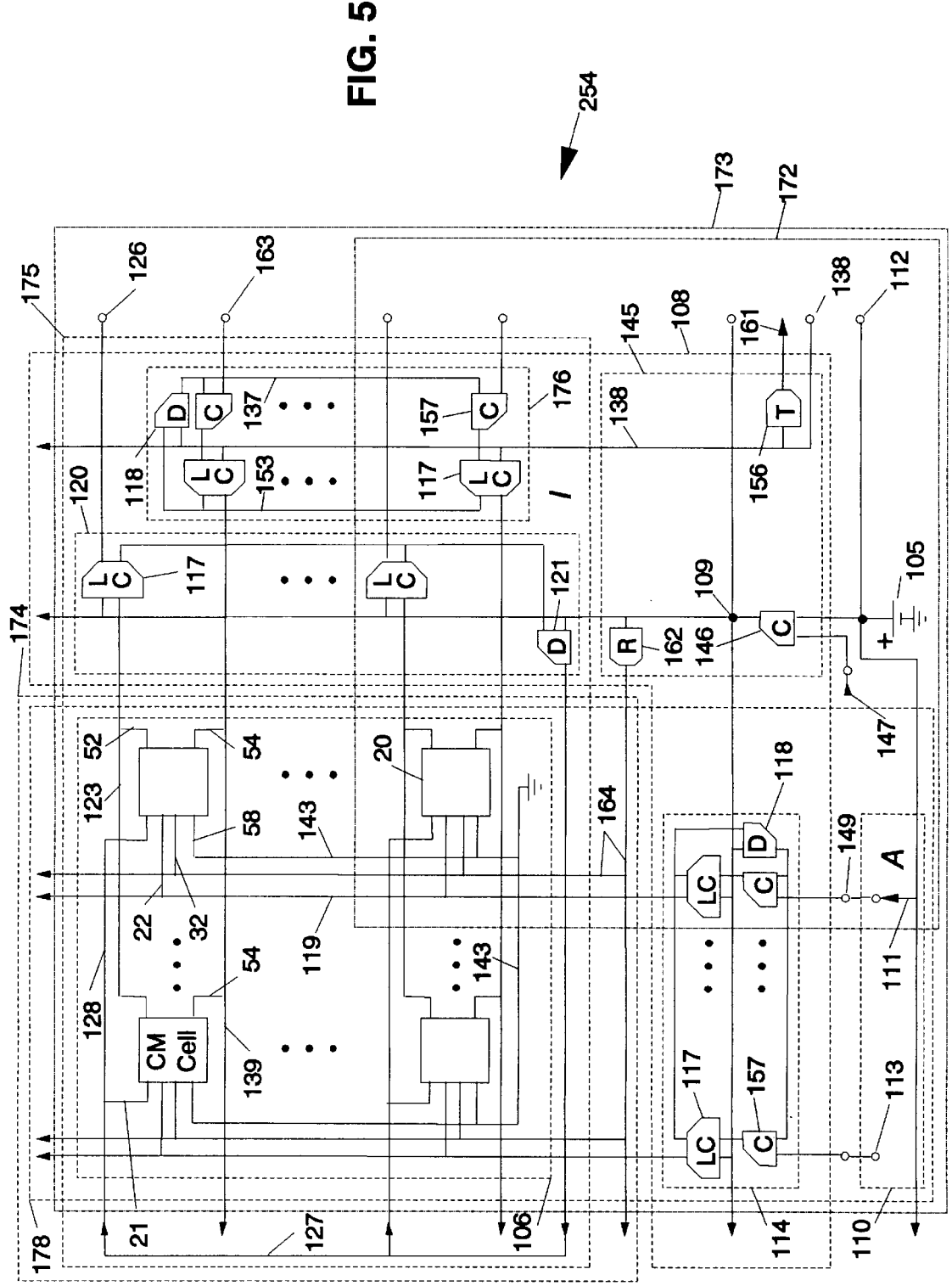
FIG. 5 is a schematic drawing of a portion of a self-learning sensor unit that includes a scalar self-learning memory submatrix connected to its single sensor variable and single matrix output variable.

The conditional memory cell 20 shown in FIG. 1 is the basic memory element used in a self-learning conditional memory submatrix 106 shown in FIG. 5. The conditional memory cell 20 is used to select an output state in response to an input state in a given transition (sensing and action) cycle. The conditional memory cell 20 includes a sense terminal 22 that represents a particular input state, and is connected to an output-enable coil 24 and a feedback-enable coil 26. The output-enable coil 24 is designed to close the normally open contacts 28 of the output-enable connect 29 when the sense terminal 22 is energized by a particular input state. The feedback-enable coil 26 is designed to close the normally open contacts 30 of the feedback-enable connect 31 when the sense terminal 22 is energized a particular input state. The memory cell 20 also includes a search terminal 32, which is connected to one end of a search coil 34 and a variable resistor element such as a slidewire 36 connected to ground 40. The other end of the search coil 34 is connected to a contact wiper arm 38 of the slidewire 36. The wiper arm 38 contacts the slidewire 36 such that the amount of current that flows through the search coil 34 from the search terminal 32 at a given voltage is determined by the position of the wiper arm 38 on the slidewire 36. The output contacts 42, search coil 34, wiper arm 38, and slidewire resistor element 36 form a voltage sensitivity switch 35.

Sensitivity of the voltage-sensitive switch

With a given voltage level on the search terminal 32, maximum current flows through the search coil 34 when the wiper arm 38 is closest to the ground 40 of the slidewire 36, and minimum current flows through the search coil 34 when the wiper arm 38 is furthermost from the ground 40 of the slidewire element 36. The contacts 42 of the output connect 45 are designed to close at some predetermined current level in coil 34. Therefore, the output contacts 42 in the voltage-sensitive switch 35 close when there is a predetermined low voltage present at the search terminal 32, and the contact armature 38 is in the maximum current position 47. Or, the output contacts 42 close then there is a predetermined high voltage present at the search terminal 32, and the contact armature 38 is in the minimum current position 41. Accordingly, the output contacts 42 are designed to close when the contact armature 38 is in positions intermediate between the minimum position 41 and maximum position 47, and the voltage present at the search terminal 32 is intermediate between the predetermined low and high level.

Thus, if a voltage ramp 104 is applied to the search terminal 32, the output contacts 42 close at some voltage level determined by the position of the wiper arm 38. Therefore, the position of the wiper arm 38 determines the sensitivity (S) (Eq. 1) of the voltage-sensitive switch 35, and the position of the wiper arm 38 is used as an analog memory record of the sensitivity (S) of that conditional memory cell 20.

Calculation of sensitivity

As shown by Equation 1, the sensitivity (S) of the voltage-sensitive switch 35 is equal to one minus the ratio of the actual voltage ($V_a$) required to close the contacts 42 of the voltage-sensitive switch 35 minus the intrinsic voltage ($V_i$) required to close the contacts 42 of the connect 45 when the armature 38 is in the maximum current position 47, to the maximum voltage ($V_m$) required to close the contacts 42 when contact armature 38 in the minimum current position 41.

$$S = 1 - (V_a - V_i)/V_m. \qquad \text{Eq. 1}$$

For example, the intrinsic voltage ($V_i$) could be 0.1 volts, and the maximum voltage ($V_m$) could be 10 volts. If the contact armature 38 is in the minimum current position 41, then the sensitivity (S) of the voltage-sensitive switch 35 is $1-(10-0.1)/10=0.01$. If the armature 38 is in the mid position 43, such that 5 volts are required to close the contacts 42, then the sensitivity (S) of the voltage-sensitive switch 35 is $1-(5-0.1)/10=0.51$. If the armature 38 is in the maximum current position 47, then the sensitivity (S) of the voltage-sensitive switch 35 is $1-(0.1-0.1)/10=1$.

Changing sensitivity

Figure 2:
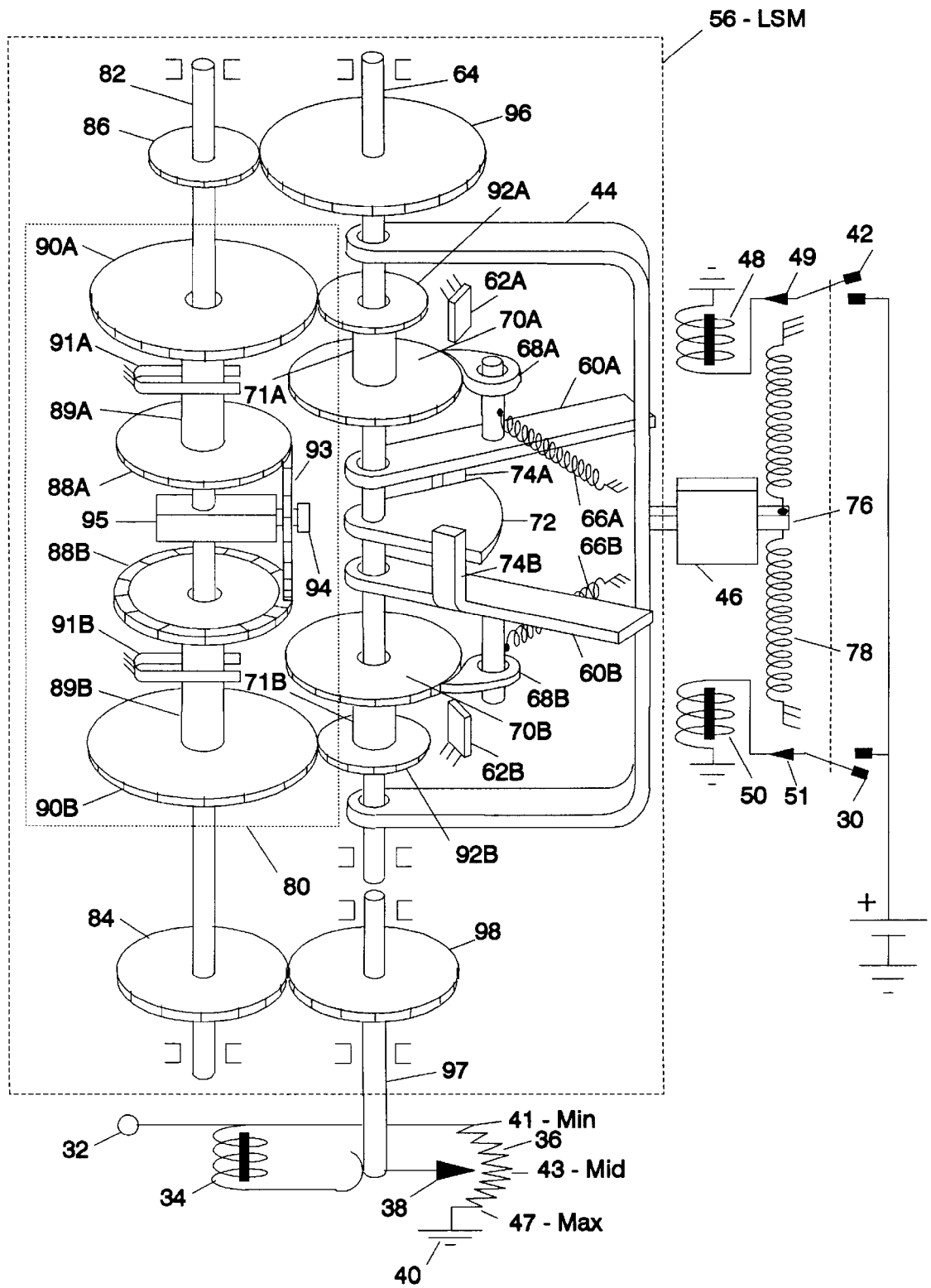
FIG. 2 is an isometric drawing of the logarithmic subtracting mechanism in the conditional memory cell shown in FIG. 1.

The conditional memory cell 20 also contains a bail 44 and pole piece 46 that changes the position of the wiper arm 38 by a fixed ratio of its position from the minimum position 41 through the logarithmic subtracting mechanism (LSM) 56 shown in FIG. 2 whenever a sufficient current 49 flows through the minimum coil 48. This occurs whenever a predetermined voltage is present at the output-enable terminal 21, the output-enable contacts 28 and output contacts 42 are closed, and the output terminal 52 is grounded.

The logarithmic subtracting mechanism (LSM) 56 also changes the position of the wiper arm 38 by a fixed ratio of its position from the maximum position 47 when a sufficient current 51 flows through the maximum coil 50. This occurs whenever a predetermined voltage is present at the feedback terminal 54, the feedback-enable contacts 30 are closed, and the feedback-complete terminal 58 is grounded. Thus, the position of the wiper arm 38 is determined by the number of times the minimum coil 48 is energized relative to the number of times the maximum coil 50 is energized.

Description of the logarithmic subtraction mechanism

FIG. 2 shows an isometric drawing of the logarithmic subtraction mechanism (LSM) 56 referred to in FIG. 1. The logarithmic subtraction mechanism 56 is used to change and store the analog record of the sensitivity (S) in the conditional memory cell 20. The bail 44, pole piece 46, minimum coil 48, and maximum coil 50 shown in the memory cell 20 in FIG. 1 can rotate the minimum lever 60A or maximum lever 60B to a fixed minimum stop position 62A or fixed maximum stop position 62B around a main shaft 64 against a minimum spring 66A or maximum spring 66B, according to which coil 48 or 50 is energized. A pawl 68A on minimum lever 60A or a pawl 68B on maximum lever 60B engages and rotates a minimum ratchet wheel 70A or maximum ratchet wheel 70B according to which lever 60A or 60B is moved. A moveable stop 72 connected to the main shaft 64 prohibits either lever 60A or 60B from returning past a position determined by the position of the movable stop 72 by virtue of a minimum lug 74A on the minimum lever 60A or a maximum lug 74B on the maximum lever 60B when the minimum coil 48 or the maximum coil 50 is de-energized, and the bail 44 returns to a center position 76 by the action of a bail spring 78. Thus, the amount of rotation of each ratchet wheel 70A or 70B is determined by the position of the moveable stop 72 when the minimum coil 48 is energized by the write-minimum contacts 42, or the maximum coil 50 is energized is energized by the write-maximum contacts 30.

Ratchet wheels 70A and 70B are connected to the ratchet output gears 92A and 92B by ratchet hubs 71A and 71B respectively. The ratchet output gears 92A and 92B mesh with the differential input gears 90A and 90B. The differential input gears 90A and 90B are connected to the differential side members 88A and 88B by the differential hubs 89A and 89B respectively. Thus, the ratchet wheels 70A or 70B drive the side members 88A or 88B of the differential 80 through a predetermined gear ratio by virtue of the mesh between the differential input gear 90A and ratchet output gear 92A, or the differential input 90B and ratchet output gear 92B. Friction members 91A and 91B act upon the differential hubs 89A and 89B to keep the differential side members 88A and 88B from moving except in response to the movement of their respective differential input gears 90A and 90B.

The difference between the movement of side members 88A and 88B determines the position of the differential center member 93 mounted on the center shaft 94. The center shaft 94 is rigidly connected to the differential shaft 82 by the differential center support block 95. Thus, the output position of the differential shaft 82 represents the difference between the movement of ratchet wheels 70A and 70B.

The differential shaft 82 is connected to the main shaft 64 through a second differential output gear 86 and a main shaft input gear 96. Thus, the moveable stop 72 is positioned by the output of the mechanical differential 80 through a ratio of movement determined by gears 86 and 96. The differential shaft 82 is also connected to a wiper arm shaft 97 through the first differential output gear 84 and wiper arm gear 98. Wiper arm 38 is rigidly connected to the wiper arm shaft 97. Alternatively, the wiper arm 38 can be mounted upon the main shaft 64 directly. Thus, the positions of the movable stop 72 and the wiper arm 38 are changed according to the gear ratio between the ratchet wheels 70A and 70B and the differential side members 88A and 88B, the gear ratio between the differential shaft 82 and the main shaft 64, and the amount that levers 60A and 60B are moved by the bail 44.

Description of response curves

Figure 3A:
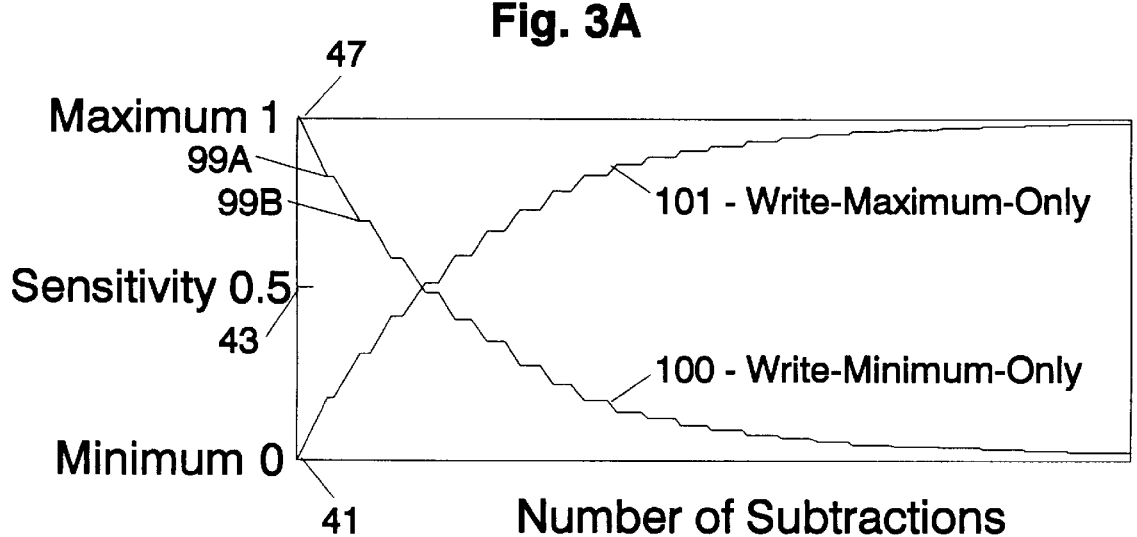
FIG. 3A and 3B are curves showing the changes in sensitivity created by the logarithmic subtracting mechanism in FIG. 2 in response to different learning conditions.
Figure 3B:
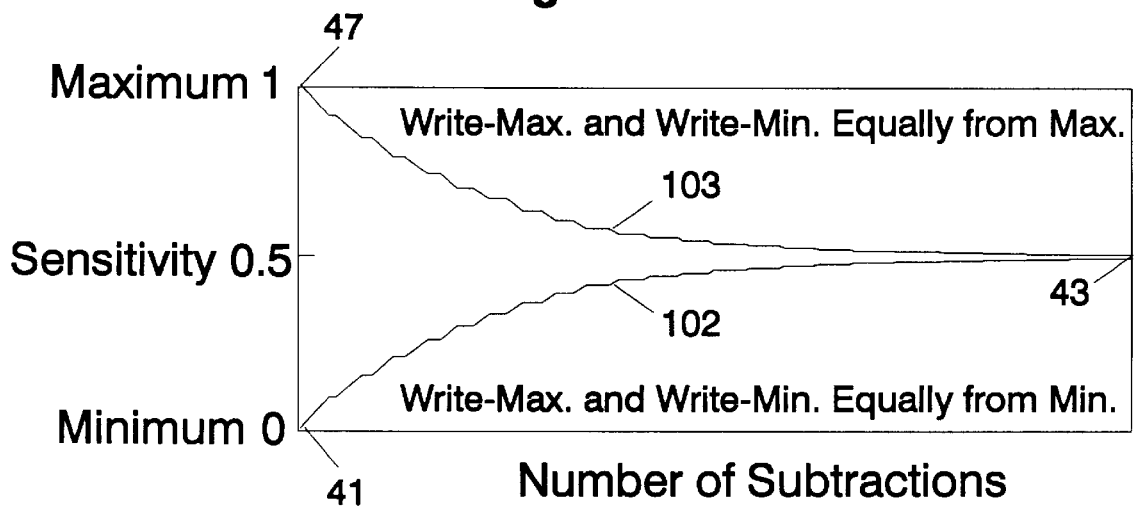

FIGS. 3A and 3B show response curves 100, 101, 102, and 103 that represent the position of the wiper arm 38 (FIGS. 1 and 2) under different learning conditions. The write-minimum only curve 100 in FIG. 3A shows the position of the wiper arm 38 starting from the maximum position 47, proceeding asymptotically toward the minimum position 41 when the minimum coil 48 only (FIG. 1) is energized repeatedly. The write-maximum only curve 101 shows the position of the wiper arm 38 starting from the minimum position 41, proceeding asymptotically toward the maximum position 47 when the maximum coil 50 only (FIG. 1) is energized repeatedly.

The write equally from minimum curve 102 in FIG. 3B shows how the position of the wiper arm 38 moves asymptotically toward the mid-position 43 when the wiper arm 38 starts from the minimum position 41, and the minimum coil 48 and maximum coil 50 are energized repeatedly in succession. The write equally from maximum curve 103 shows how the position of the wiper arm 38 moves from the maximum position 47 to the mid-position also when the minimum coil 48 and maximum coil 50 are energized repeatedly in succession.

Description of the ramp curve

Figure 3C:
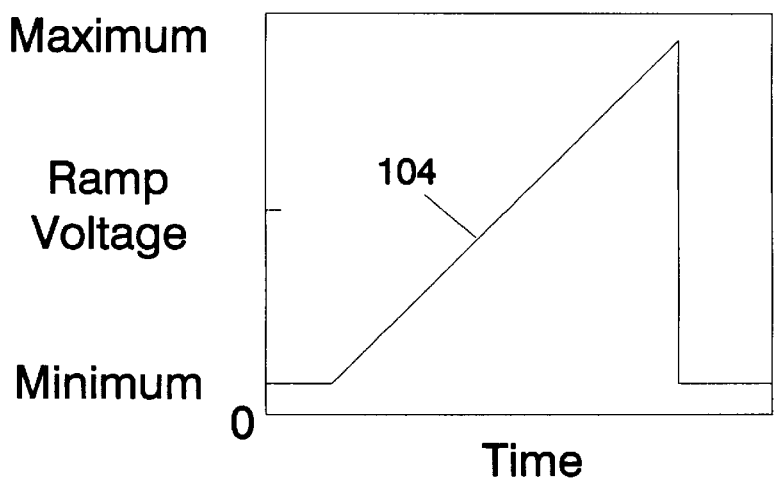
FIG. 3C shows the ramp voltage curve created by the ramp generator to search for the most sensitive self-learning conditional memory cell.
Figure 4:
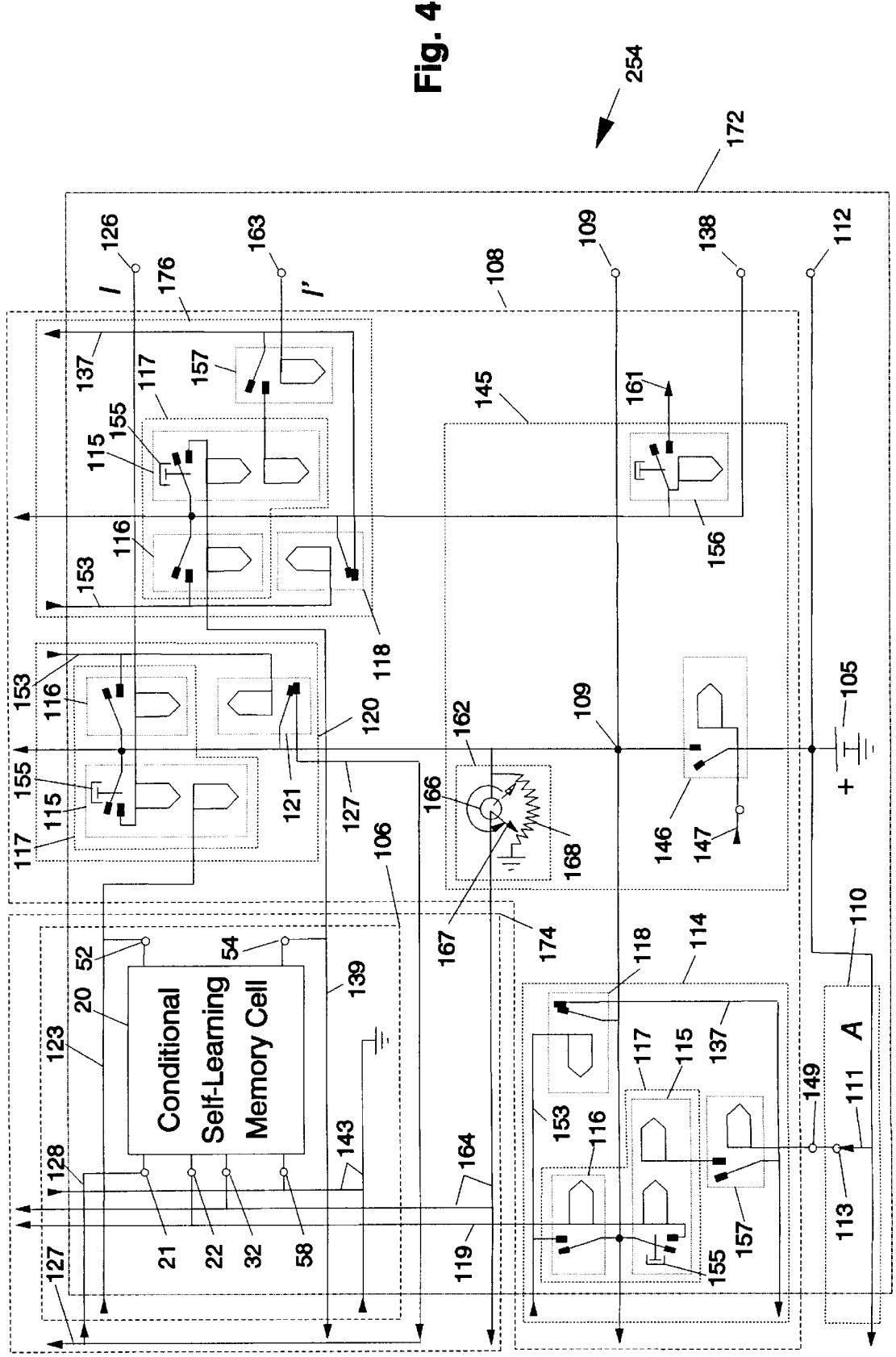
FIG. 4 is a detailed schematic of a portion of a self-learning sensor unit that includes only a single conditional memory cell.
Figure 8:
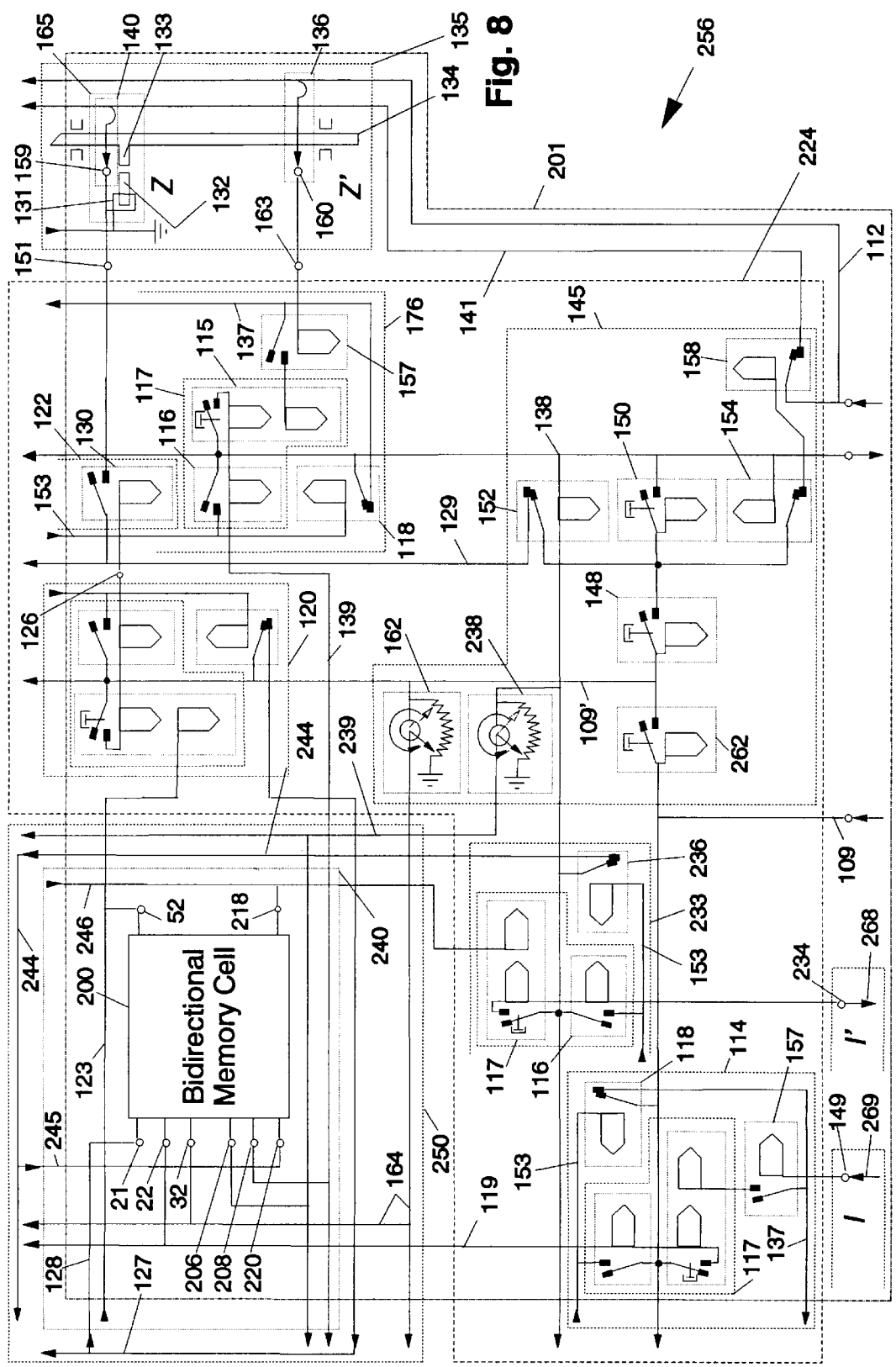
FIG. 8 is a detailed schematic drawing of a portion of a bidirectional self-learning actuator unit that includes a single bi-directional memory cell.

FIG. 3C shows the voltage ramp curve 104 used to interrogate the sensitivity of all of the memory cells 20 in a memory matrix 106, as shown in FIG. 4, and the bidirectional memory cells 200 in a bidirectional matrix 240, as shown in FIG. 8. The ramp curve 104 is created by the forward-selecting ramp generator 162 shown in FIG. 4, and the back-selecting ramp generator 238 shown in FIG. 8.

Description of a portion of a self-learning sensor unit with single memory cell

FIG. 4 shows a detailed schematic of a portion 172 of a self-learning sensor unit 254 that includes a sensor 110, a portion of a scalar memory submatrix 106 that shows only one memory cell 20, a matrix driver 108 that includes a matrix input interface circuit 114, a ramp generator 162, a matrix output interface circuit 120, a feedback interface circuit 176, and a cycle logic controller 145, which is activated by a power source 105 from a cycle-on signal 147.

Cycle logic controller

The cycle logic controller 145 directs the events that take place in the sensor unit 254 during a transition cycle, and includes a cycle-on connect switch 146 that energizes the forward selection interface bus 109 when the cycle-on signal 147 is produced by the outside timing source 334 (FIG. 19) for the duration of a transition cycle. The cycle logic controller 145 also includes a ramp generator 162, and a cycle-end timer 156, which produces a cycle-end signal 161. The cycle-end signal 161 is used by the outside timing source 334 to discontinue the cycle-on signal 147 at the end of a given transition cycle.

Sensor

The sensor 110 has a slidewire 112 connected to a movable switch armature 111. The slidewire 112 can be permanently connected to the power source 105. The switch armature 111 is placed in contact with any one of the plurality of sensor switch terminals 113 according to the value of the sensor variable A.

Matrix input interface circuit

Each sensor switch terminal 113 is connected to an input connect 157 that is enabled by an interface disconnect 118. Each input connect 157 in the matrix interface circuit 114 represents a given value of the sensor variable A. Each input connect 157 is connected to an input latch circuit 115 within a latch-and-connect circuit 117. The latch-and-connect circuit 117 includes a connect 116 that is connected to the matrix interface disconnect 118 by the interface disconnect bus 153. The input interface circuit 114 includes as many input connects 157 and latch-and-connect circuits 117 as there are values of the sensor variable A, and permits only one latch-and-connect circuit 117 in the input interface circuit 114 to be energized in a given transition cycle.

A damper 155 can be placed on the contact armature belonging to each input latch circuit 115 to make sure that the sensor switch armature 111 dwells on the sensor terminal 113 for more than a brief moment before the contacts of the input latch circuit 115 are closed. Thus, the damper 155 does not allow an input latch-and-connect circuit 117 to latch in any value of a rapidly moving (slewing) sensor switch armature 111.

Ramp generator

The ramp generator circuit 162 within the matrix driver 108 tests the sensitivity of every memory cell 20 in the submatrix 106. The ramp generator circuit 162 includes a ramp bus 164, a drive motor 166, a contact armature 167, and a variable resistor element 168.

Matrix output interface circuit

The matrix output interface 120 within the matrix driver 108 includes a set of latch-and-connect circuits 117 made up of the latch circuit 115 and the connect 116, the interface disconnect bus 153, and an output-enable disconnect 121 that disconnects an output-enable bus 127. The latching relay in circuit 115 contains a damper 155, which delays the closing of the latch-and-connect circuit 117 so that sufficient electrical energy can flow through the minimum coil 48 in the conditional memory cell 20 in FIG. 1 to activate its logarithmic subtraction mechanism 56 before the output-enable bus 127 is disconnected by the output-enable disconnect 121.

Matrix feedback interface circuit

The matrix driver 108 also includes a matrix feedback interface circuit 176 that contains a set of latch-and-connect circuits 117 and input connects 157, each of which is connected to a matrix output co-terminal 163. The feedback interface circuit is energized by the feedback-enable bus 138. One latch-and-connect circuit 117 in the feedback interface circuit 176 produces a voltage on its feedback terminal bus 139 when its corresponding input connect 157 is energized, and then the feedback interface circuit 176 disconnects all of its input connects 157 through its input disconnect 118 in the manner of the input interface circuit 114. This allows only one feedback terminal bus 139 belonging to the feedback interface circuit 176 to be energized in a given transition cycle.

Cycle-end timer

The cycle-end timer 156 is also energized by the feedback-enable bus 138. When the cycle-end timer 156 times out, it sends a cycle-end signal 161 to the outside timing source 334 indicating that the sensor unit 254 has been given time to increase the sensitivity of its feedback selected memory cells 20. This causes the outside timing source 334 to discontinue the cycle-on signal 147 at the cycle-on connect 146. This discontinues electrical power to all of the components in all the units connected to the sensor unit 254 except the sensor terminals 111 and the actuator brake terminals 159 shown in FIG. 8. This allows all of the connects, disconnects, and latches to return to their normal positions in the networks 260, 280, 290, and 300, and allows the bail 46 of the feedback-selected memory cell 20 in each submatrix 106 to return to its normal center position 76.

Description of a scalar sensor unit

FIG. 5 shows a larger view 173 of a self-learning sensor unit 254 that includes the portion 172 of the self-learning sensor unit 254 in FIG. 4, and the rest of the scalar memory submatrix 106 connected to a single sensor variable A and a single output variable I. A scalar unit 172 contains as many sensor latch-and-connect circuits 117 in its input interface circuit 114 as values of its sensor variable A, and contains as many output latch-and-connect circuits 117 in its output interface circuit 120 as it has values of its output variable I.

Scalar submatrix

A scalar sensor unit 173, as shown in FIG. 5, contains only one sensor 110, one output interface 120, one feedback interface 176, and a single scalar matrix 106 driven by a matrix driver 108. The scalar matrix 106 contains a memory cell 20 at the intersection of each input sense bus 119 and each output terminal bus 123. In a scalar matrix 106, only one memory cell 20 selects the specific output terminal 126 that corresponds to its output terminal bus 123. This selecting memory cell 20' must be in the column of memory cells 20 connected to the latched input sense bus 119 belonging to the extant position of the sensor switch contact armature 111 that occurs at the beginning of a transition cycle.

Each scalar submatrix 106 contains as many columns of memory cells 20 as there are values of its scalar sensor variable A belonging to a single sensor 110, and each submatrix 106 contains as many rows of memory cells 20 as there are values of its scalar output variable I. An output-enable terminal 21 of every memory cell 20 in a row is connected to a given output-enable terminal bus 128. The sense terminal 22 of every memory cell 20 in each column is connected to a sense terminal bus 119 belonging to a given input latch-and-connect circuit 117. The search terminal 32 of every memory cell 20 in the submatrix 106 is connected by the ramp bus 164 to the ramp generator 162. The feedback terminal 54 of every memory cell 20 in a given row is connected to the given feedback terminal bus 139 that is associated with a given value of the output variable I. The feedback-complete terminal 58 of every memory cell 20 in a given scalar submatrix 106 is connected to the feedback-complete terminal bus 143, which is connected to ground. The scalar submatrix 106 can energize a specific output terminal bus 123 whenever a specific sense terminal bus 119 is energized within a given transition cycle, according to the content of the memory cells 20 in the scalar submatrix 106, as explained in the operation of FIG. 4.

Description of a monolithic self-learning sensor unit

FIG. 6 shows a monolithic self-learning sensor unit 254 that has a monolithic matrix 174 made up of a set of scalar submatrices 106, one of which is shown in the portion self-learning sensor unit 173 in FIG. 5. The monolithic memory matrix 174 is connected to multiple sensors 110 representing sensor variables A and B, and multiple matrix output interface units 120 representing the output variables I and J. The power bus 112 is extended to every sensor 110, and the input/output interface bus 109 is extended to every sensor 110 and every matrix output interface 120. The feedback-enable bus 138 is extended to every feedback interface circuit 176 in the monolithic self-learning sensor unit 254. Each scalar submatrix 106 is connected to each unique combination of a sensor 110 and output interface 120.

Set of submatrices belonging to a sensor variable

The monolithic memory matrix 174 contains a set 178 of submatrices 106 that are associated with a given sensor 110 and a set of output variables I, J . . . . All of the memory cells 20 in each submatrix 106 in the set 178 are connected to the input sense terminal buses 119 associated with each value of the sensor variable 110 belonging to that set 178.

Set of submatrices belonging to an output variable

The monolithic memory matrix 174 also contains a set 175 of submatrices 106 that are associated with a given output variable say I and a set of sensor variables A, B, . . . . All of the memory cells 20 in each submatrix 106 in the set 175 are connected to the output-enable terminal buses 128, output terminal buses 123, feedback terminal buses 139, and feedback-complete terminal buses 143 associated with each value of the matrix output variable 120 belonging to that set 175.

Submatrix connections

In the monolithic memory matrix 174, each output terminal bus 123 associated with a given matrix output terminal 126 is connected to the output-enable terminal bus 128 associated with the same output terminal 126 in the submatrix 106 immediately to the right, except for the output terminal buses 123 in the submatrix 106 closest to the output terminal 126. The output terminal buses 123 closest to their output terminals 126 are connected to their respective output latch-and-connects 117 in the output interface circuit 120. Each output latch-and-connect circuit 117 belonging to a given output variable I or J . . . is connected to an output-enable disconnect 121 that removes electrical power to the output-enable bus 127 feeding all of the memory cells 20 in the set 175 of submatrices 106 associated with a given actuator 135 for the remainder of the transition cycle whenever any one latch-and-connect circuits 117 in that set 175 of submatrices 106 is energized. This ensures that only one output latch-and-connect 117 is selected by the set 175 of submatrices 106 associated with a given output variable I or J . . . in each transition cycle.

Embodiment, Bidirectional Memory Unit, FIG. 7–14

Figure 11:
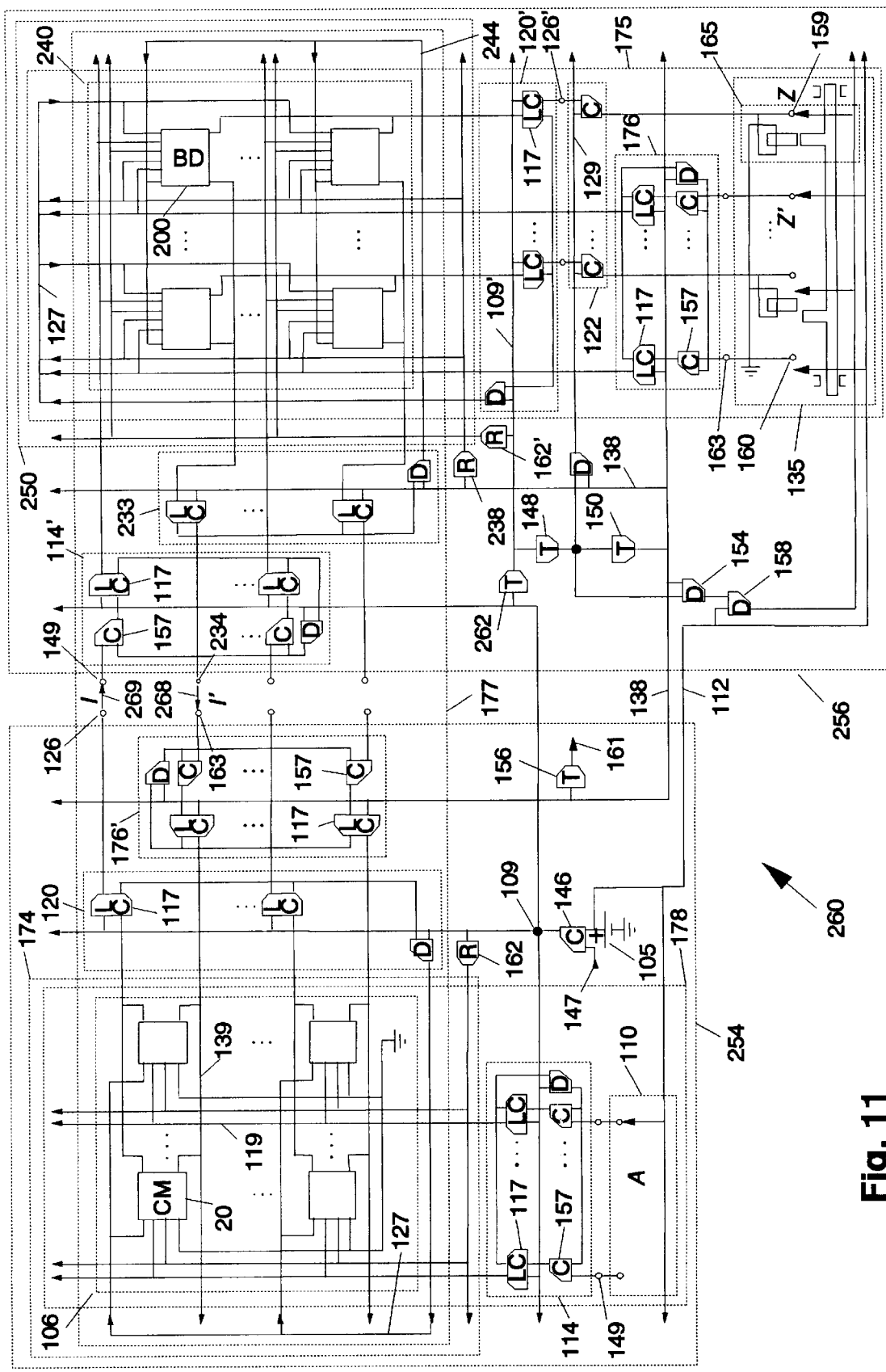
FIG. 11 is a schematic drawing of a duplex network of self-learning units made up of the sensor unit in FIG. 5 and the actuator unit in FIG. 9.

In some cases, the number of transitions required in the line of behavior of a control system may be small compared to the total number of possible transitions created by the resolution of the sensor and actuator variables shown in the monolithic self-learning machine 10 shown in the pending parent patent application Ser. No. 08/155,587. In this case, the number of memory cells 20 can be reduced by connecting a sensor unit 254 to an actuator unit 256 by means of an intermediate variable I in the duplex network 260, as shown in FIG. 11. Each value 269 of the intermediate variable I can represent a unique transition between values of the sensors 110 and values of the actuators 135. Only as many value terminals 126/149 of the intermediate variable I (FIG. 11) are required as the expected number of transitions in the control task.

However, a feedback signal 268 must be sent to the sensor unit 254 through an intermediate co-variable I' to increase the sensitivity of the memory cell 20 in the sensor unit 254 associated with the actual sensor and actuator values that occur in a given sensing and action period (transition cycle). This requires the bidirectional actuator unit 256 shown in FIGS. 8 through 11 made up of bidirectional memory cells 200 shown in FIG. 7, which can back select the value 268 of the intermediate co-variable I' that represents the value 269 of the intermediate variable I that is most likely to forward select the actuator/brake terminal 159 belonging to the actual value 160 of the actuator 135 in a given transition cycle.

Description of a bidirectional memory cell

Figure 7:
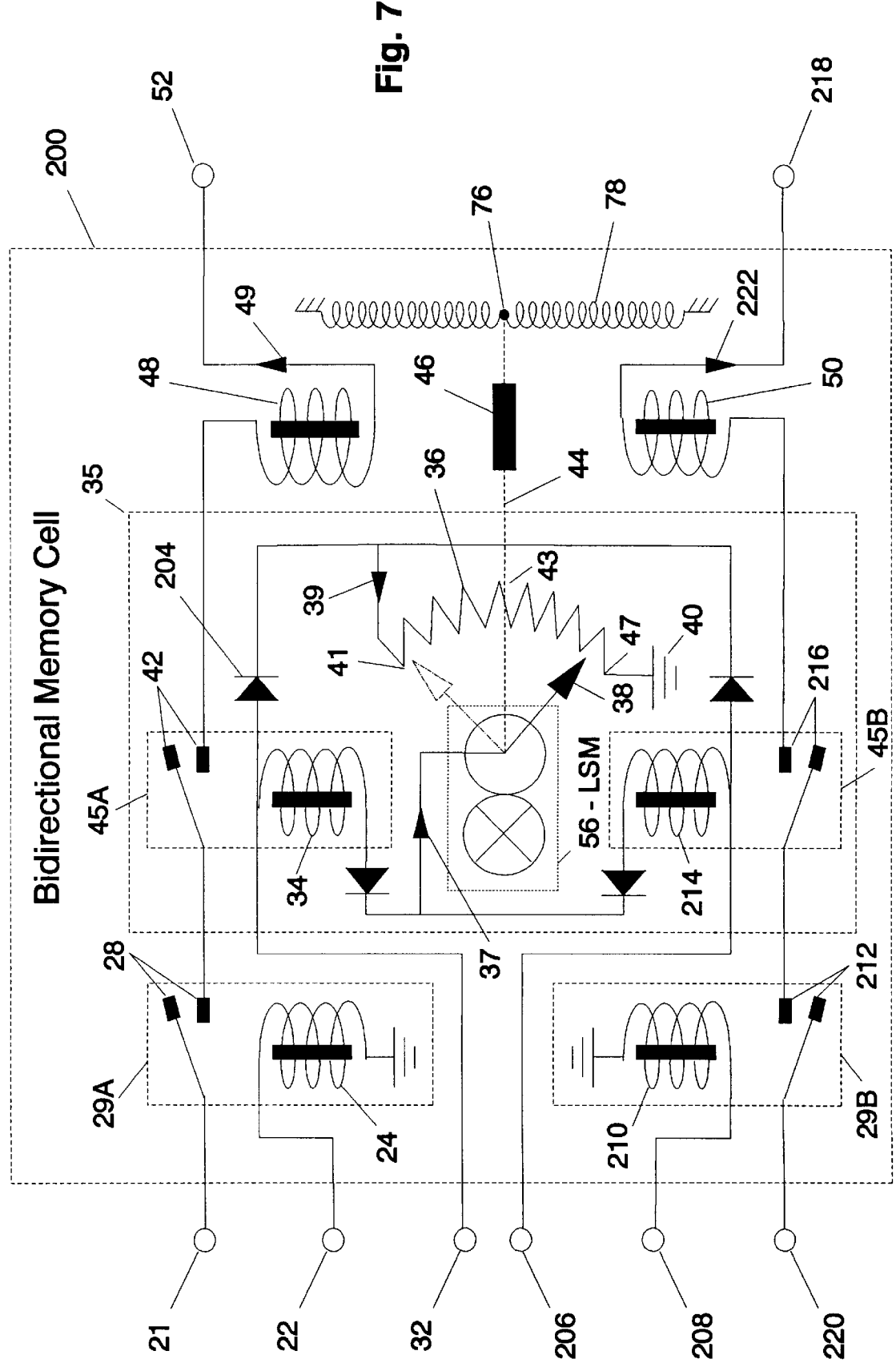
FIG. 7 is a detailed schematic drawing of a bidirectional memory cell required in a network of self-learning units.

As shown in FIG. 7, the top half of the bidirectional memory cell 200 is identical to the conditional memory cell 20 in FIG. 1, except that the sense terminal 22 is connected to the output-enable coil 24 only, and the forward-selecting search coil 34 is connected to an additional back-selecting search coil 214 that operates with the same wiper arm 38 and variable resistor element 36 as the forward-selecting search coil 34. The bidirectional memory cell 200 also contains diodes 204 that isolate the back-selecting search terminal 206 from the forward-selecting search terminal 32.

The components 210, 212, 216, 218, and 220 in the bottom half of a bidirectional memory cell 200 are used in a different way than the components 26, 30, 48, 54, and 58 in the bottom half of the conditional memory cell 20 in FIG. 1. The back-select sense terminal 208 is connected to the back-select sense coil 210, which operates the normally open back-select enable contacts 212 of the back-select enable connect 29B. The back-select search coil 214 operates the normally open back-select output contacts 216 of the back-select output connect 45B. The back-select enable contacts 212 and the back-select output contacts 216 are connected in series with the maximum coil 50. The feedback terminal 54 in the conditional memory cell 20 in FIG. 1 becomes the back-select output terminal 218 in the bidirectional memory cell 200 in FIG. 9, and the feedback-complete terminal 58 in the conditional memory cell 20 in FIG. 1 becomes the back-select enable terminal 220 in the bidirectional memory cell 200 in FIG. 9.

Current 222 flows through the maximum coil 50 of a bidirectional memory cell 200 when a voltage is present on the back-select enable terminal 220, the back-select enable contacts 212 and the back-select output contacts 216 are close, and the back-select output terminal 218 is grounded. The current 222 through the maximum coil 50 of the bidirectional memory cell 200 flows in the opposite direction of the current 51 in the conditional memory cell 20. However, the current 222 still causes the logarithmic subtraction mechanism 56 to move the wiper arm 38 a predetermined ratio of the distance remaining toward the maximum position 47, as does a feedback signal 51 in the conditional memory cell 20.

Description of a bidirectional memory matrix with a single memory cell

The bidirectional memory cell matrix driver 224 in the portion 201 of a bidirectional actuator unit 256 shown in FIG. 8 is the same as the conditional memory cell matrix driver 108 shown in FIG. 4, except that it contains three additional circuits: (1) an input co-variable interface circuit 233 with its back-select enable circuit 244, 245, and 246, (2) an enlarged cycle logic controller 145 with an additional back-select ramp generator 238 and back-select ramp bus 239, an actuator-enable disconnect 152 that operates an actuator-enable bus 129 that enables an actuator-enable connect 130, actuator delay timers 262, 148, and 150, and brake disconnects 154 and 158, (3) an actuator/brake system that includes an actuator/brake 135, actuator enable connect 130, an actuator brake 165, and a feedback switch 136.

Memory cell connections

The forward selecting terminals 21, 22, and 32 of every bidirectional memory cell 200 are connected to the bidirectional matrix driver 224 in the same way, as shown in FIG. 8, as the same terminals of every conditional memory cell 20 are connected to its driver 108, as shown in FIG. 4. In addition, the back-select search terminal 206 of the bidirectional memory cell 200 is connected to the back-select ramp generator 238, its back-select sense terminal 208 is connected to a back-select sense terminal bus 139, its back-select enable terminal 220 is connected to the back-select enable bus 244, and its back-select output terminal 218 is connected to a back-select output terminal bus 246.

Vernier actuator

The self-learning actuator unit 256 must be able to influence variables in the environment through some physical action. In general, this can be achieved by the actuator 135 shown in FIG. 8. Each matrix output terminal 126 is connected to an actuator-enable connect 130, the output of which is connected to an actuator/brake solenoid 165 through actuator terminal 151. The actuator/brake solenoid 165 contains an actuator coil 131 which can magnetize a stator pole 132. This creates an attractive force upon a single armature pole 133 on the actuator armature 134 whenever its actuator terminal 151 is energized. Armature poles 133 are distributed along the actuator armature 134 in a spacing that is slightly greater or slightly less that the spacing of the stator poles 132. The set of armature poles 133 are held a fixed distance away from the stator poles 132 by the action of the end bearings 169 upon the actuator armature 134. However, the end bearings 169 allow the actuator armature 134 to move parallel to the stator poles 132 under the action of a stator pole 132 upon an armature pole 133, creating a vernier effect. That is to say, a unique position of the armature 134 is obtained whenever an armature pole 133 lines up with its related stator pole 132. Each unique position represents a value of the actuator variable Z.

Actuator brake

The actuator 135 must be held in a fixed position except when it is being positioned by an energized actuator terminal 151. This is accomplished by an actuator/brake system that includes a portion of the cycle logic controller 145 and the actuator and brake 135. The actuator/brake 135 also includes a set of brake switches 140 that connect a brake bus 141 to a particular actuator coil 131 through the brake terminal 159 according to the actual position value of the actuator. The brake switches 140 are spaced at intervals along the armature 134 such that a given brake switch 140 is closed when a given set of related poles 132 and 133 line up. This allows a voltage on the brake bus 141 to appear on the brake terminal 159 at a given actuator coil 131 whenever its brake switch 140 is closed. This voltage causes a current to flow through the actuator coil 131 of that actuator brake 165, creating a holding force that attempts to keep the armature pole 133 lined up with its related stator pole 132 at that location for as long as the voltage on the brake bus 141 is maintained.

Feedback switch

The actuator armature 134 also positions a set of feedback switches 136 spaced at intervals along the armature 134 such that a given feedback switch 136 is closed whenever a given set of related poles 132 and 133 line up. This allows a voltage from the main power bus 112 to appear on the feedback terminal 160 connected to whatever feedback switch 136 is closed. Each feedback switch 136 and feedback terminal 160 represents a particular actual (measured) position value of the actuator variable Z. The actual (measured) position value of the actuator variable Z will be called the actuator co-variable Z'.

Input and output interfaces

The bidirectional matrix 240 is connected to the same input interface 114, the same output interface 120, and the same feedback interface 176 as the sensor matrix 106, as shown in FIGS. 4, 5, and 6. However, the bidirectional matrix 240 requires an additional input co-variable interface circuit 233. The input co-variable interface circuit 233 contains a latch-and-connect circuit 117 for each intermediate co-terminal 234, and a back-select enable disconnect 236, which disconnects the back-select enable bus 244 when an input co-variable terminal 234 is back-selected. The input co-variable interface circuit 233 is energized by the feedback enable bus 138, allows only one intermediate co-terminal 234 belonging to a given intermediate co-variable I' to be selected in a single transition cycle, and allows the bail 44 of the LSM 56 shown in FIG. 7 in the back-selecting bidirectional memory cell 200 to reset to its normal center position 76 after it latches in an output terminal 234. A bidirectional memory matrix is not shown connected to a sensor 110 directly because there is no common need to back select a sensor co-variable.

Back-select ramp generator

A bidirectional memory matrix 240 also has a back-select ramp generator 238. The back-select ramp generator 238 is started by the feedback enable bus 138 from the feedback delay timer 150. The feedback-enable bus 138 produces a signal that energizes the back-select interface circuit 176 in an adjacent network unit also.

Description of a scalar bidirectional self-learning actuator unit

Figure 9:
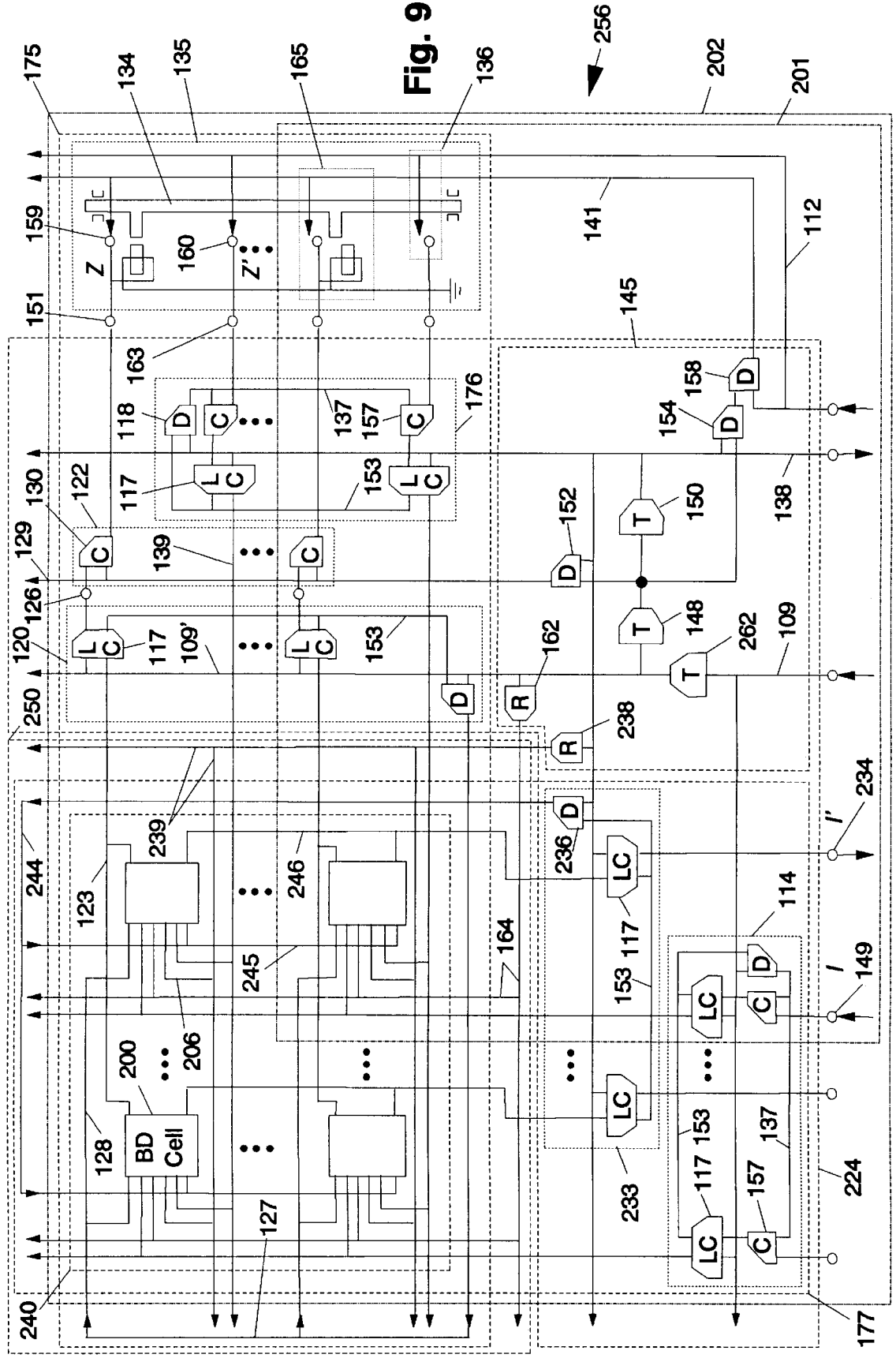
FIG. 9 is a schematic drawing of a portion of a bidirectional self-learning actuator unit that contains a single scalar bidirectional memory submatrix connected to its single input variable and single output variable.

The bidirectional matrix driver 224 shown in the portion 201 of the actuator unit 256 in FIG. 8 can be expanded to include the complete scalar bidirectional memory submatrix 240, forming the scalar portion 202 of the bidirectional self-learning actuator unit 256 shown in FIG. 9. Each forward-selecting output-enable terminal bus 128 is connected to an output terminal bus 123 in each submatrix 240 through the memory cells 200, and each output terminal bus 123 in each submatrix 240 is connect to an output-enable terminal bus 128 in an adjacent submatrix 240 in the manner of the forward-selecting matrix 174 in FIG. 6. Each back-select enable terminal bus 245 is connected to a back-select output terminal bus 246 in each submatrix 240 through the memory cells 200, and each back-select output terminal bus 246 in each submatrix 240 is connect to a back-select enable terminal bus 245 in an adjacent submatrix 240 in similar manner.

The number of input latch-and-connect circuits 117 in the interface circuit 114 of the single input variable I, and the input co-terminal latch-and-connect circuits 117 in the interface circuit 233 of the single input co-variable I', and the number of output latch-and-connect circuits 117 in the interface circuit 120 of the single actuator variable Z, and the back-select input latch-and-connect circuit 117 in the interface circuit 176 of the single actuator co-variable Z' can be increased to match the resolution of the intermediate variable/co-variable I/I' and actuator 135. The number of bidirectional memory cells 200 in the scalar bidirectional memory submatrix 240 equals the product of the number of values of the input and actuator variables, as represented by the number of input terminals/co-terminals 149/234, and output terminals/co-terminals 126/163.

The bidirectional self-learning actuator unit 256 is considered an actuator unit because it contains actuators 135 but no sensors 110.

Description of a monolithic bidirectional self-learning actuator unit

Figure 10:
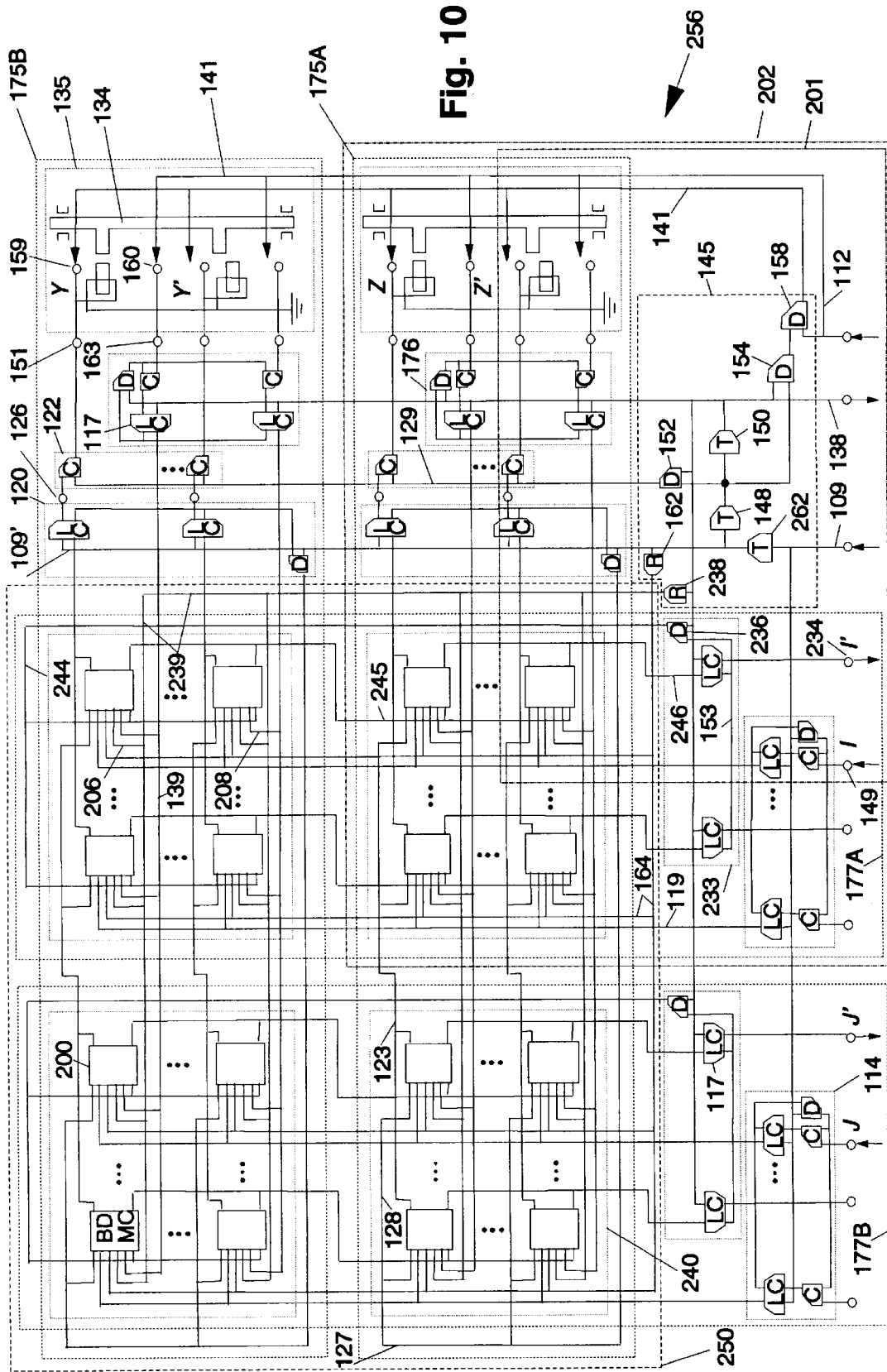
FIG. 10 is a schematic drawing of a monolithic bidirectional self-learning actuator unit that contains a monolithic bidirectional memory matrix connected to its multiple input variables and multiple output variables

The number of input variables I, J, . . . , and actuator variables Z, Y, . . . , and the number of scalar bidirectional submatrices 240 shown in the scalar portion 202 of the monolithic bidirectional self-learning actuator 256 in FIG. 9 can be increased, as shown in the complete monolithic bidirectional self-learning actuator unit 256 shown in FIG. 10. Each back-select sense bus 139 extends to the back-select sense terminal 208 of every memory cell 200 in a given row in the set 175 of bidirectional submatrices 240 associated with a given actuator 135, and the back-selecting ramp generator 238 is connected to the back-select search terminal 206 of every bidirectional memory cell 200 in the monolithic bidirectional matrix 250. The input sense bus 119 of each latch-and-connect 117, and the forward select ramp bus 164, extend to all of the memory cells 200 in the monolithic matrix 250 in the manner of the forward-selecting matrix 174 in FIG. 6. The number of submatrices 240 in the bidirectional monolithic matrix 250 is equal to the product of the number of input variables I, J, . . . and actuator variables Z, Y, . . . .

Description of a duplex network

Figure 12:
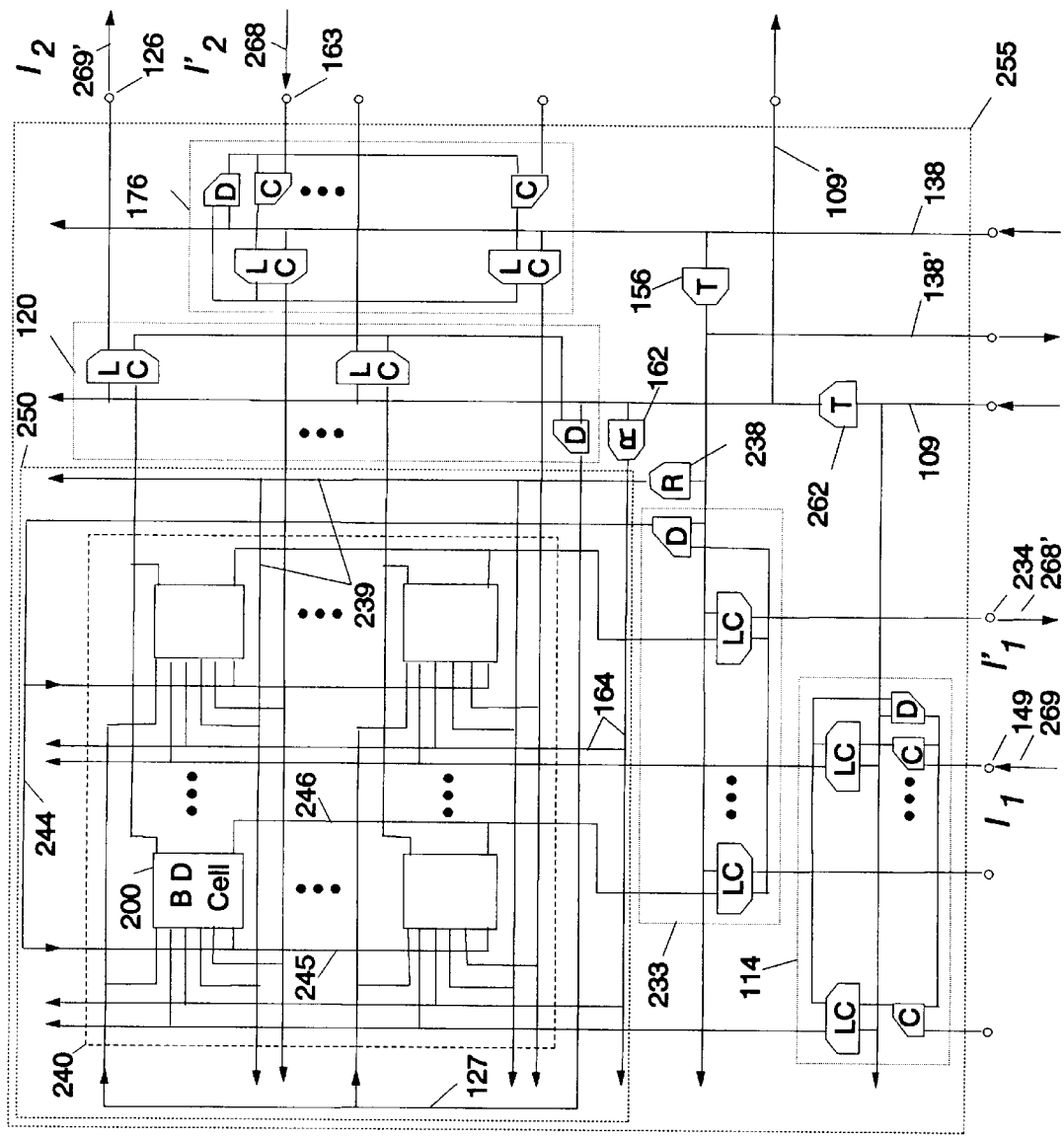
FIG. 12 is a schematic drawing of a portion of a bidirectional self-learning intermediate unit that contains a single scalar bidirectional memory submatrix connected to a single input variable and a single output variable.

The self-learning sensor unit 254 shown in FIG. 6 can be connected to the actuator unit 256 shown in FIG. 12, forming the duplex network 260, as shown in FIG. 11. The duplex network 260 allows the limited number of values of the actuator variables X, Y, . . . needed in a line-of-behavior of a control task to be produced by a limited number of values of the intermediate variable I, J . . . .

Description of a self-learning bidirectional intermediate unit

The actuator 135, actuator delay timers 148 and 150, brake disconnects 154 and 158, and the actuator enable disconnect 152 can be eliminated from the self-learning bidirectional actuator unit 256 shown FIGS. 8 through 10, forming the bidirectional self learning intermediate unit 255 shown in FIG. 12. The intermediate unit 255 uses a cycle-end timer 156 to allow the back-selection ramp 238 in the actuator unit 256 to back-select and latch an intermediate co-value 268 of the intermediate co-variable I' before the ramp 238 in the intermediate unit 255 starts to back-select an intermediate co-value 268 of the intermediate co-variable I'.

Description of a triplex network of self-learning units

Figure 13:
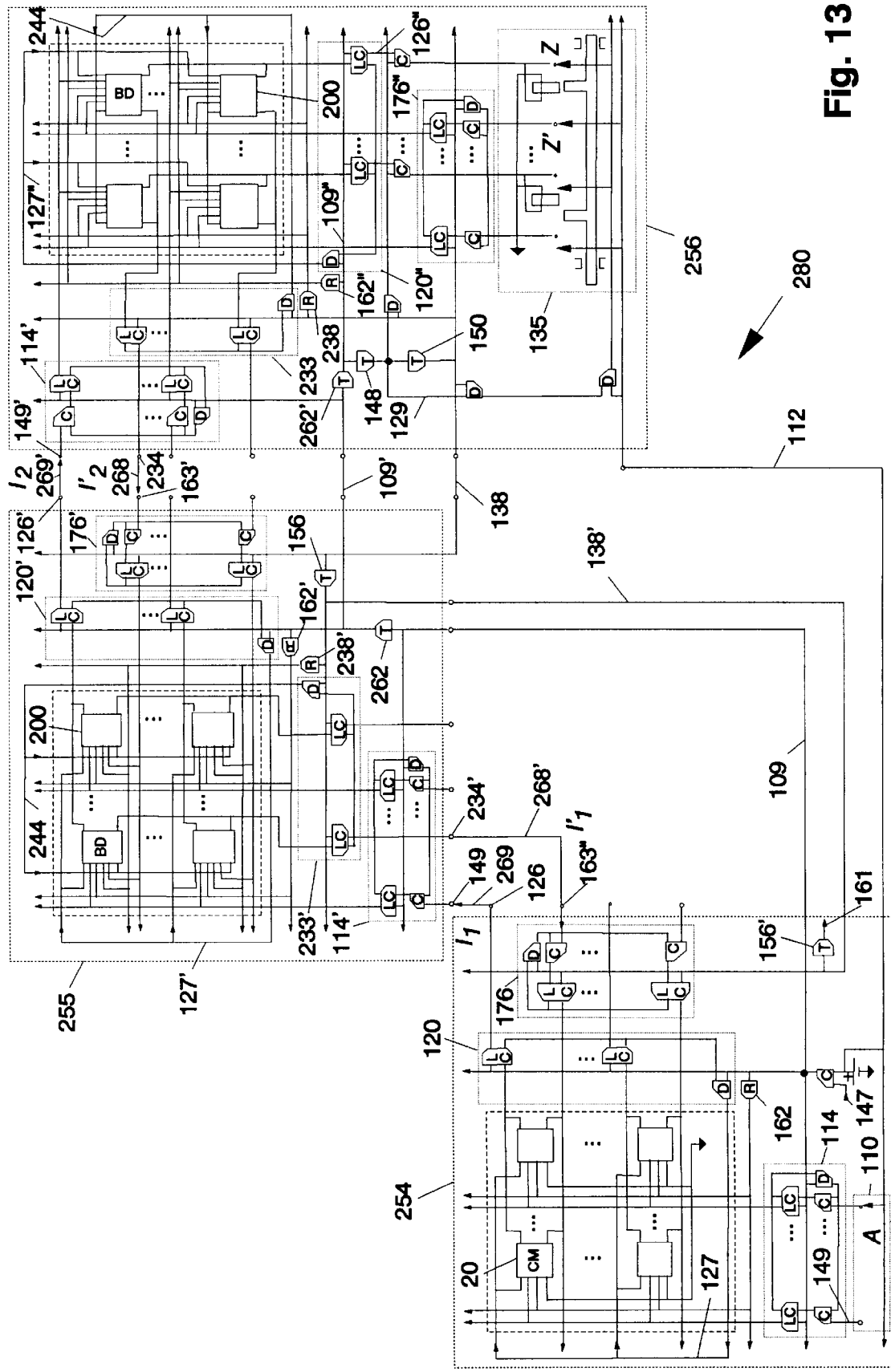
FIG. 13 is a schematic drawing of a portion of a triplex network of self-learning bidirectional units that includes a single self-learning intermediate unit.

The actuator unit 256 also can be connected to the sensor unit 254 by means of a self-learning bidirectional intermediate unit 255, forming the triplex network 280 shown in FIG. 13. The intermediate unit 255 allows more sensor and actuator variables to be connected using fewer memory cells than the monolithic machine shown in the parent patent application Ser. No. 08/155,587 or the duplex network 260 shown above. The intermediate unit 255 is considered an intermediate unit because it contains no sensors 110 and no actuators 135.

Description of a nodal network of self-learning units

Figure 14:
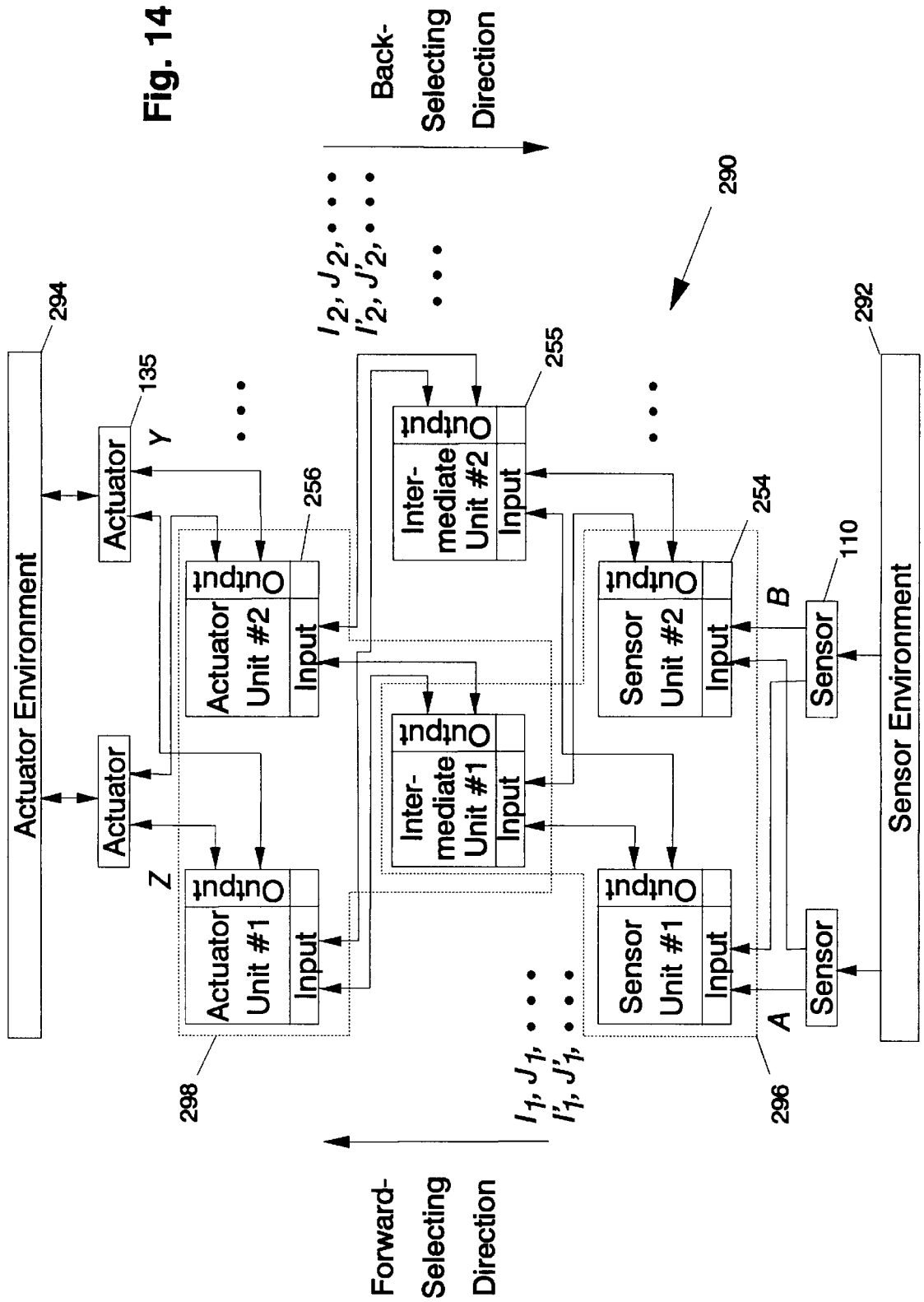
FIG. 14 is a block diagram of a multi-layer nodal network of self-learning units.

As shown in FIG. 14, the self-learning bidirectional intermediate unit 255 can be connected to multiple sensor units 254, forming a convergent network 296. The self-learning intermediate unit 255 also can be connected to multiple actuator units 256, forming a divergent network 298. The convergent network and the divergent network can be connected to form the directly connected nodal network 290. The self-learning intermediate unit 255 also can be connected to other intermediate units 255, forming a multilevel nodal network.

Embodiments, Digitized Self-Learning Units, FIGS. 15–18

Figure 15:
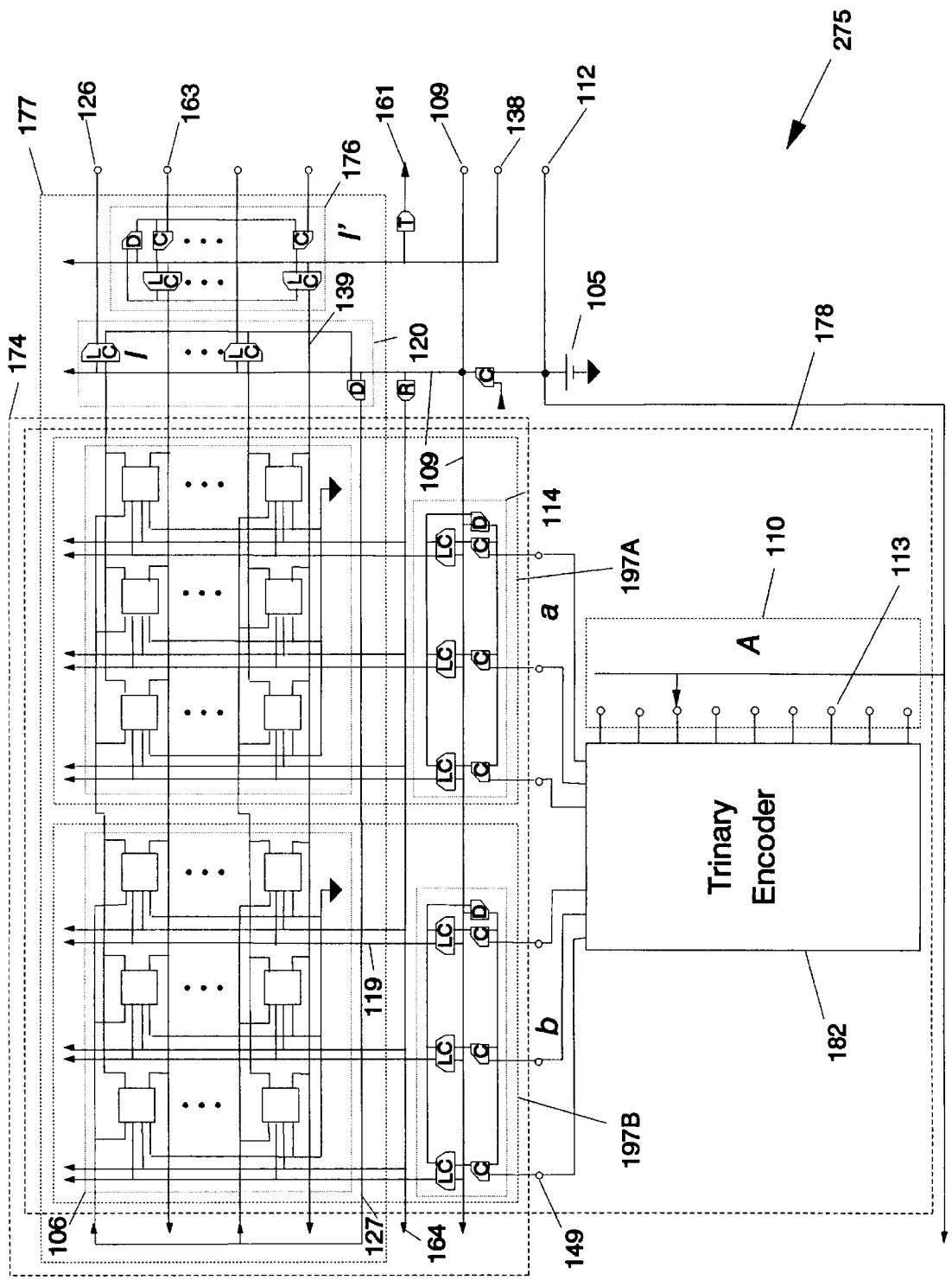
FIG. 15 is a schematic drawing of a portion of a digitized monolithic self-learning sensor unit in which each sensor variable is digitized into a set of aggregate sensor variables.
Figure 16:
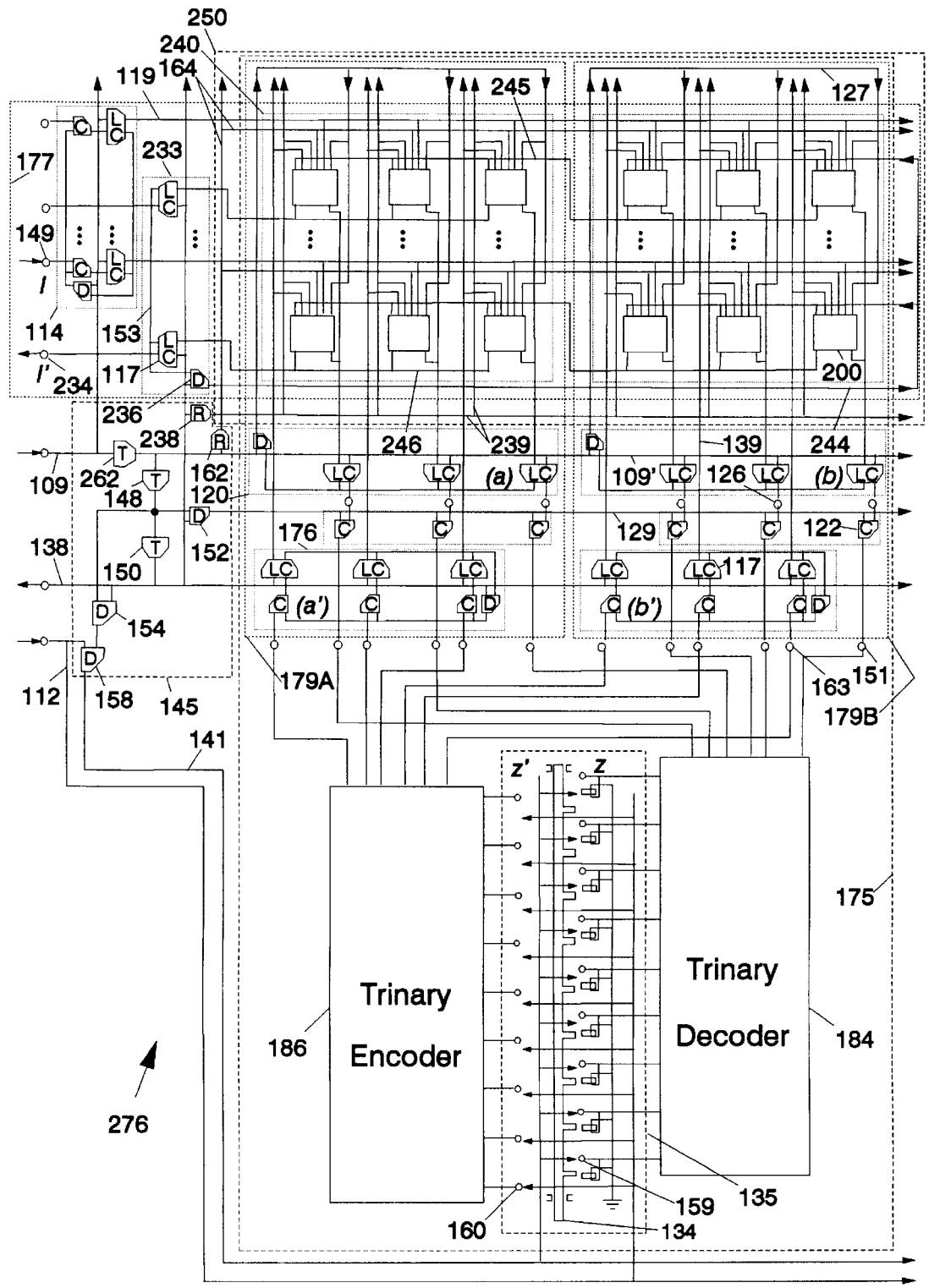
FIG. 16 is a schematic drawing of a portion of a digitized monolithic self-learning actuator unit in which each actuator variable is digitized from a set of aggregate actuator variables.
Figure 17:
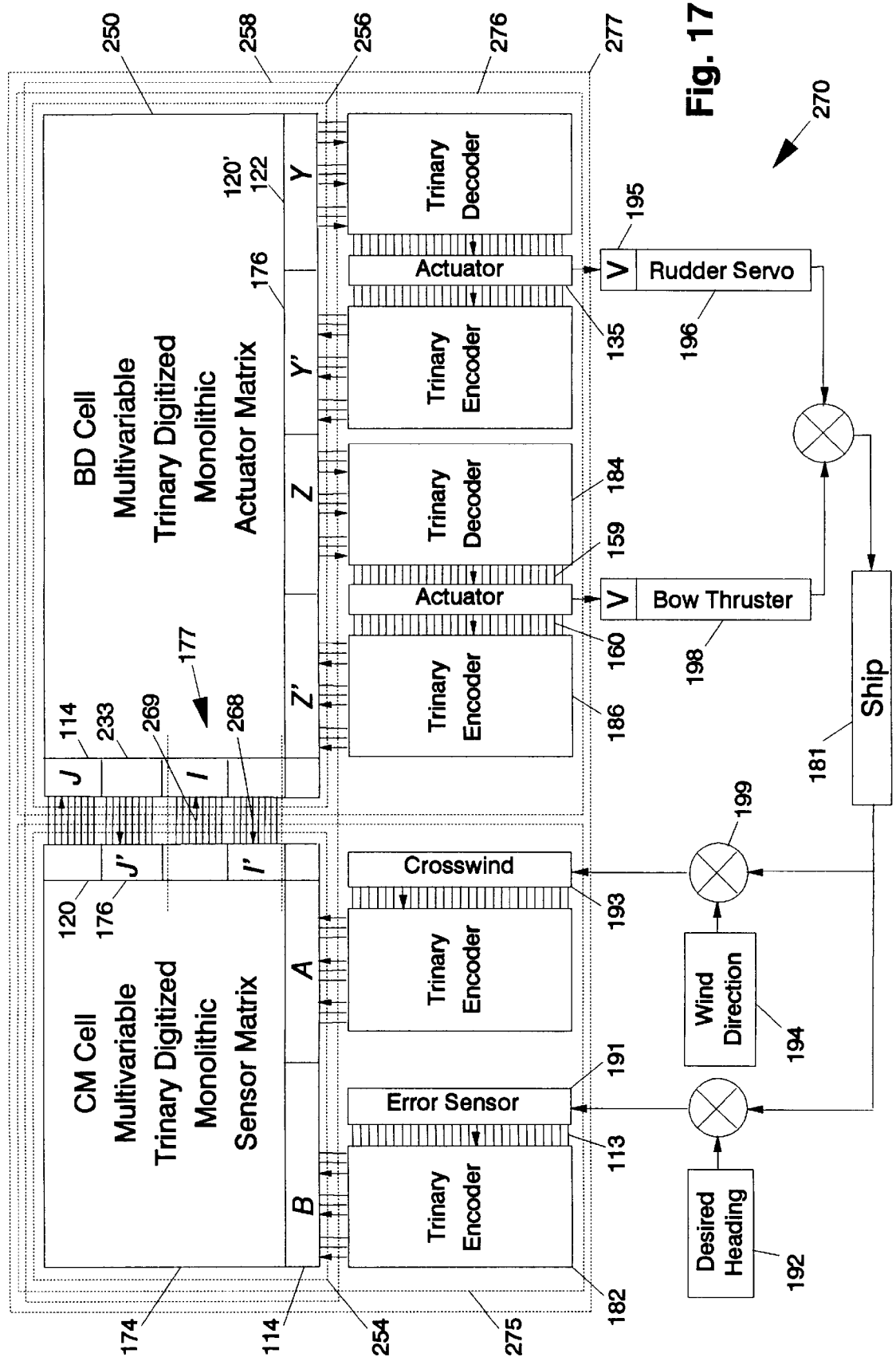
FIG. 17 is a block diagram of an auto-pilot using a digitized duplex network of self-learning units.

In some cases, the resolution of the sensors 110 and matrix output interfaces 176 of the scalar self-learning sensor unit 173 in FIG. 5 may require many matrix input terminals 149 and matrix output terminals 126. The number of memory cells 20 in the scalar submatrix 106 is equal to the product of the number of sensor terminals 113 and output terminals 159. Thus, a sensor 110 and output interface 176, each with a resolution of one part in 27 (approximately 4%) requires 27 sensor terminals 113 and 27 output terminals 126. This requires a scalar matrix 106 with 27×27=729 memory cells 20. The number of memory cells 20 in a memory matrix 106 can be greatly reduced by digitizing its sensor 110, as shown in FIG. 15. Likewise, the number of bidirectional memory cells in an actuator unit can be greatly reduced by digitizing the actuator 135, as shown in FIG. 16. The digitized sensor unit 275 can be connected to a digitized actuator unit 276, forming the digitized duplex network 277, as shown in FIG. 17.

Description of a digitized monolithic self-learning sensor unit

Each sensor variable A represented by the sensor 110 can be decomposed into a set of aggregate input variables A(a) and A(b) by a well know electrical device called an encoder 182. In the example shown in FIG. 15, the 9 values of sensor variable A, represented by the 9 sensor terminals 113, are decomposed by a trinary encoder 182 into two trinary (three-value) aggregate input variables A(a) and A(b) according to Equation 2, $$V = x^n,\qquad \text{Eq. 2}$$

where V is the number of value terminals 113 of the sensor variable A (in this case 9), x is the number of matrix input terminals 149 of each aggregate variable A(a) and A(b) (in this case 3), and n is the number of aggregate variables (in this case 2). This encoder 182 requires only x×n=6 matrix input terminals 149 in contrast to an undigitized sensor 110, which would require 9 matrix input terminals 149 for the 9 sensor terminals 113.

Each aggregate sensor variable A(a) or A(b) is connected to a set of submatrices 197A or 197B by a separate matrix interface circuit 114, which allows only one value 119 of each aggregate variable A(a) or A(b) to be latched in during a given transition cycle.

Description of a digitized monolithic self-learning actuator unit

Aggregate output variables Z(a) and Z(b) shown in FIG. 16 can be synthesized into the actuator variable Z by a well-known electrical device called a decoder 184. In the example shown in FIG. 16, two trinary (three-value) aggregate output variables Z(a) and Z(b) are decoded by a trinary decoder 184 into the 9 values terminals 159 of the actuator variable Z represented by actuator 135. The decoding is carried out according to Equation 2, where V is the number of value terminals 159 of the actuator variable Z (in this case 9), x is the number of value terminals 151 of each aggregate variable Z(a) and Z(b) (in this case 3), and n is the number of aggregate variables Z(a) and Z(b) (in this case 2). This decoder 184 can be driven by only x×n=6 actuator value terminals 151 in contrast to an undigitized actuator 135, which would require 9 actuator value terminals 151 to produce the same resolution as the digitized actuator 135.

Each aggregate actuator variable Z(a) or Z(b) is connected to a set of submatrices 179A or 179B by a separate matrix interface circuit 120 as if each aggregate variable Z(a) or Z(b) were a separate actuator variable.

The actual position of the actuator 135 is measured by the closed contacts of the actuator feedback terminal 160 connected to the feedback encoder 186. The feedback encoder 186 digitizes the actual position 160 of the actuator 135, into values of the aggregate co-variables Z(a)' and Z(b)', as represented by matrix output co-terminals 163, according to the Equation 2, where V is the number of values of the actuator variable Z (in this case 9), x is the number of values of each aggregate variable Z(a)' and Z(b)' (in this case 3), and n is the number of aggregate variables (in this case 2). Each matrix output co-terminal 163 of these aggregate co-variables Z(a)' and Z(b)' are connected to a corresponding feedback terminal bus 139 through the matrix interface circuit 176 as if each aggregate co-variable Z(a)' and Z(b)' were a separate actuator co-variable.

Description of a digitized multivariable duplex self-learning auto-pilot

The digitized self-learning sensor unit 275, as shown in FIG. 15, can be connected to a digitized bidirectional self-learning actuator unit 276, as shown in FIG. 16, forming a digitized multivariable duplex network 277, as shown in FIG. 17. A direction-error sensor 191, crosswind sensor 193, rudder servo-actuator 196, and bow thruster 198 can be added, forming the digitized multivariable duplex self-learning auto-pilot 270, as shown in FIG. 17. If trinary sensor encoders 182, trinary actuator decoders 184, and trinary feedback encoders 186 are used, each with 3 aggregate variables, 27 sensor values 113 can be recognized, 27 actuator positions 159 can be produced, and 27 actuator feedback positions 160 can be recognized. This 3.7% resolution may be adequate for many direction control applications.

The summing element 199 connected to the bow thruster 198 and rudder servo-actuator 196 indicates that the direction of the ship 181 is determined by the sum of the effects of the bow thruster 198 and rudder 196. The summing element 199 connected to the crosswind sensor 193 indicates that the crosswind direction is the sum or difference between the wind direction and the direction of the ship 181. The summing element 199 connected to the direction-error sensor 191 adds or subtracts the actual heading of the ship 181, as determined by a magnetic or gyro compass, to or from the actual heading of the ship 181, producing a direction error signal to the error sensor 191.

The digitized duplex self-learning machine 270 shown in FIG. 17 can produce a specific combination of rudder position 196 and bow thruster action 198 for each combination of direction error 191 and crosswind 193 in a unitary manner, or it can produce a given bow thruster action 198 for a given crosswind 193, and can produce a given rudder position 196 for a given direction error 191 in a diverse manner, depending upon which type of organization produces the most consistent results.

A greater force and/or a greater range of motion may be required than can be produced by the vernier actuators 135. In this case, the force/position servo-actuators 196 and 198 can be connected to the output of each vernier actuator 135 by means of servo-valves 195. If the operator of this self-learning machine 270 desires a different position of the servo-actuator 196, which runs at a high force level, the operator can adjust the position of the vernier actuator 135 or its servo-valve 195, which runs at a low force level. The self-learning machine 270 will learn the desired position forced upon the vernier actuator 135 under specific sensed conditions, and the servo-actuator 196 will reproduce these desired positions when these sensed conditions occur in the future.

The intermediate variables I, J, . . . can also act as intermediate aggregate variables in which each combination of values of the aggregate intermediate variables represents a given value of a single intermediate variable connecting the sensor unit 254 or the actuator unit 256. If a relatively few unitary transitions are required to provide adequate control behavior, the digitized multivariable duplex self-learning auto-pilot 290 may require fewer memory cells 20 and 200 than the digitized multivariable monolithic self-learning auto-pilot 180 shown in FIG. 8 in the pending parent application Ser. No. 08/155,587.

Trinary digitization

If the sensor A and actuator Z of the digitized self-learning machine shown in FIGS. 15 and 16 were each to have 27 values instead of the 9 values shown, the sensor variable A could be encoded into three trinary aggregate input variables A(a), A(b), A(c), and three trinary aggregate output variables Z(a), Z(b), Z(c) could be decoded into the 27 possible actuator positions. The 27 possible actuator positions could be encoded into the three trinary actuator co-variables Z(a)', Z(b)', Z(c)' needed to provide a feedback signal of the actual actuator position. The sensor matrix 174 would each require 9 matrix input terminals 149, and actuator matrix 175 would require 9 output terminals 151 and 9 matrix output co-terminals 163. Thus each matrix would require 9 memory cells per transition, compared to 27 memory cells per transition in an undigitized sensor matrix 254 or undigitized actuator matrix 256 with the same resolutions of one part in 27.

The trinary digitized system shown in FIGS. 15, 16 and 17 is preferred over a binary (two-value), quadrary (four-value), or any other number system, because it requires fewer memory cells 20 for sensors 110 and actuators 135 with given resolutions. For example, a binary digitized system with 6 input and 6 output aggregate variables requires 24 memory cells per transition, and can produce sensor 110 and actuator 135 resolutions of 1 part in 64. A trinary digitized system with 4 sensor and 4 actuator aggregate variables also requires 24 memory cells per transition, but can produce resolutions of the sensor 110 and actuator 135 of 1 part in 81. The advantage of the trinary digitized system over the binary digitized system increases as the resolution of the sensors and actuators increase.

Description of a digitized nodal network of self-learning units

Figure 18:
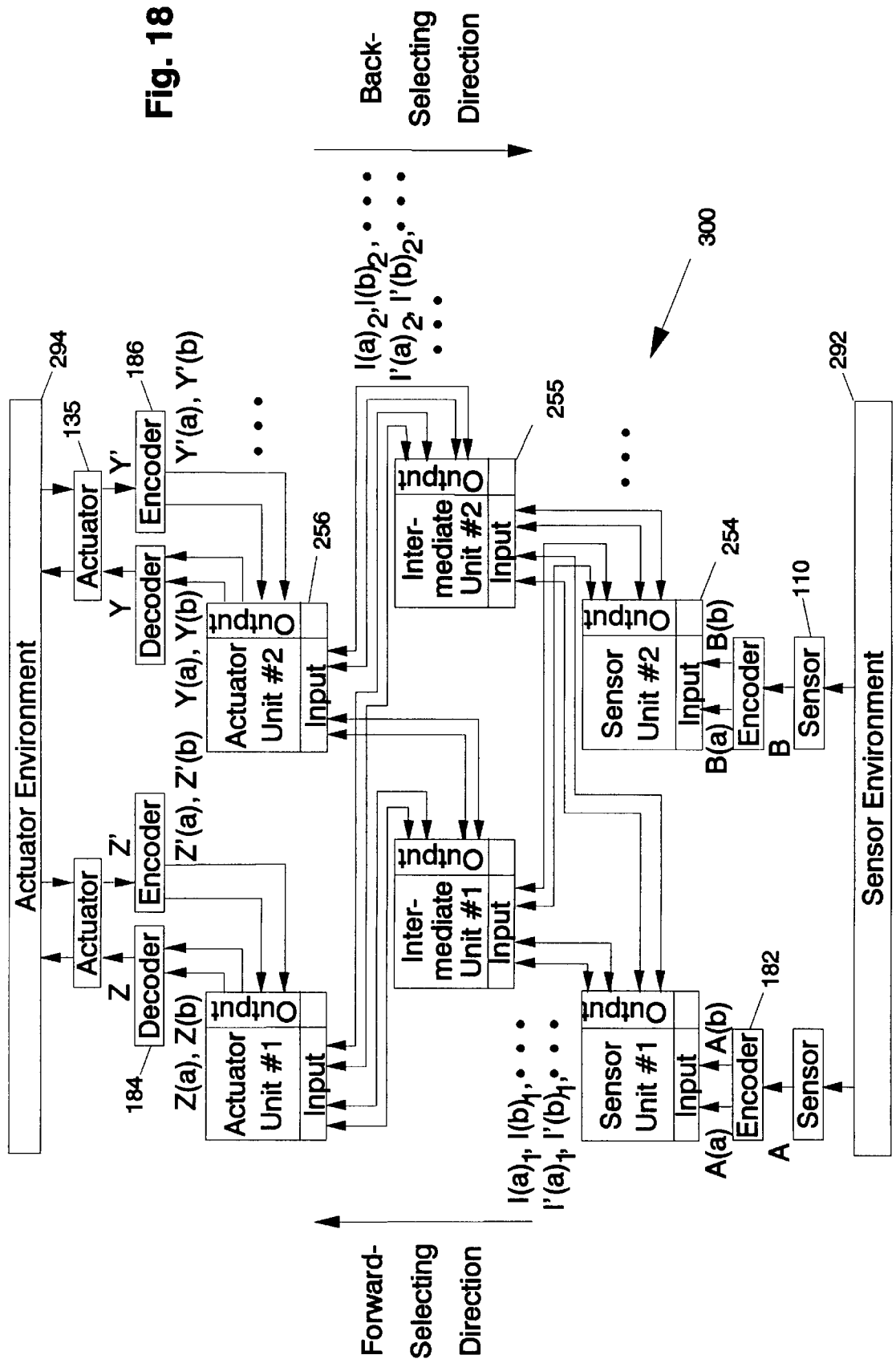
FIG. 18 is a block diagram of a digitized multi-layer nodal network of self-learning units.

The digitized self-learning sensor units 275 in FIG. 15 can be connected to the digitized actuator units 276 in FIG. 16 by the intermediate unit 255 shown in FIG. 12, forming the digitized nodal network 300 shown in FIG. 18. By digitizing the sensor variables A, B, . . . and actuator variables Z, Y, . . . , and actuator co-variables Z', Y', . . . , a digitized nodal network of self-learning units 300 can establish a unitary relation or diverse relations between specific sensors 110 and actuators 135 using far fewer memory cells 20 and 200, and connecting conductors 268 and 269 shown in FIG. 13, than the undigitized nodal network 290 shown in FIG. 14.

Description of the bidirectional self-learning algorithm

The diagram of the self-learning algorithm 302 in FIG. 19 shows the basic process used by the self-learning networks 260, 270, 280, 290, and 300 disclosed herein. The basic elements of the self-learning process are as follows: 1. The selection 307 of a value of an intermediate variable based upon the sensed conditions 308 and the confidence levels for various actions stored in the sensor matrix 254 at the beginning 147 of a transition cycle, and a reduction of the confidence levels of the forward-selecting memory cells 20. 2. Selection 306 of an action in each action period based upon the value of the intermediate variable and the confidence levels for various actions stored in the actuator matrix 256, and a reduction of the confidence levels of the forward-selecting memory cells 200. 3. The back-selection 332 of a value of the intermediate co-variable in the actuator matrix 256 based upon the confidence levels for the actual measured actions 330, and an increase of the confidence levels of the back-selecting memory cells 200. 4. An increase 316 in the confidence levels of the memory cells 20 in the sensor matrix 254 at the intersection for the back-selected values of the intermediate co-variables and the actual sensed conditions 308 within that sensing/action period.

Some time delay 318 between sensed conditions and an attempt to produce actions 314 is required in a machine that has to work in the real physical world. The actual action produced by this machine may also be influenced by outside interferences 322 from the environment or machine operators. These actions 320 must also influence the sensor environment 324 through some delay 326 for the machine to produce an active line-of-behavior. The actual action 320 must also be measured 330 after some delay 328 to allow time for the actuators to reach the ultimate positions selected by the machine, and allowed by the environment.

The discontinuous operation of the self-learning machines shown herein also requires a cycle-on signal 147 from a timing source 334. The timing source 334 may use the cycle-end signal 161 from each self-learning machine to start a new transition cycle.

Operation—FIGS. 1 to 6 Forward-selecting sensor units

The operation of the scalar portion 173 of the self-learning sensor unit 254 in FIG. 5, and the self-learning monolithic sensor unit 254 in FIG. 6, and the digitized self-learning sensor unit 275 in FIG. 15 can be explained by examining the operation of the conditional memory cell 20 in FIG. 1, the logarithmic subtraction mechanism 56 in FIG. 2, the logarithmic response curves 100, 101, 102, and 103 in FIGS. 3A and 3B, the ramp curve 104 in FIG. 3C, and the matrix driver 108 in FIG. 4, containing a single memory cell 20.

Operation of the conditional memory cell

The purpose of the conditional memory cell 20 shown in FIG. 1, is to establish and record the confidence level that a given value of a sensor variable A produces a given value of an output variable I. The confidence level of this transition is stored in the memory cell 20 that is at the intersection of a given value of the sensor variable A and a given value of the output variable I. This confidence level is stored as a position of the wiper arm 38 of the variable resistor 36 in this memory cell 20, which determines the sensitivity of its voltage-sensitive switch 35. This sensitivity is established in a given memory cell 20 by the number of times an output current signal 49 is conducted to ground through the output-enable terminal 21, output-enable contacts 28, output contacts 42, the minimum coil 48 and the output terminal 52, representing a given value of the output variable I, in relation to the number of times a feedback current signal 51 is conducted to ground from a corresponding value of the output co-variable I' through the feedback terminal 54, maximum coil 50, feedback-enable contacts 30, and the feedback-complete terminal 58. The operation of each element of the conditional memory cell 20 is explained below.

Operation of the output-enable and feedback-enable connects

At the beginning of a transition cycle, the sense terminal 22 of a particular memory cell 20 may be energized by the latched input sense bus 119, as described earlier with reference to FIG. 4. This closes the normally open contacts 28 of the output-enable connect 29 and the normally open feedback-enable contacts 30 of the feedback-enable connect 31 in all of the memory cells 20 connected to that latched input sense bus 119 for the remainder of that transition cycle. Also, at the beginning of a transition cycle, output-enable terminal 21 of a particular memory may be energized by a voltage on its output-enable terminal bus 128 shown in FIG. 4.

Operation of the voltage-sensitive switch

At this time, a rising (ramp) voltage 104 shown in FIG. 3C appears at the search terminal 32 of every memory cell connect to the ramp generator 162 also shown in FIG. 4. A ramp current 33 is conducted to the ground 40 from the search terminal 32 through the voltage-sensitive switch 35. The ramp current 33 is divided into a search current 37 through the search coil 34 and wiper arm 38, and a slidewire current 39 through the variable resistor element 36. The ratio of search current 37 to slidewire current 39 is determined by the position of the wiper arm 38 on its variable resistor element 36, which in turn determines the sensitivity of the voltage sensitive switch 35 as explained in the description of FIG. 1. Thus, the output contacts 42 of every memory cell 20 close at some ramp voltage 104 depending upon the position of the wiper arm 38 as the ramp voltage 104 rises toward its maximum value.

Producing an output

A memory cell 20 can produce a voltage at its output terminal 52 at the beginning of a transition cycle if its output-enable terminal 21 is energized by a voltage on its output-enable terminal bus 128, its output-enable contacts 28 are closed by a voltage on its sense terminal 22 from its input sense bus 119, and its output contacts 42 are closed by a sufficient current 37 through its search coil 34 from the ramp voltage 104 on its search terminal 32.

Changing sensitivity of the voltage-sensitive switch

If a memory cell 20 produces an output, and a sufficient current 49 flows to ground through the minimum coil 48 and the output terminal 52 of the selecting memory cell 20, the pole piece 46 on the bail 44 of the logarithmic subtraction mechanism 56 is pulled toward the minimum coil 48. This causes the logarithmic subtraction mechanism 56 to move the wiper arm 38 toward the minimum position 41 by a fixed fraction of the wiper arm's position from the minimum position 41, as explained in the operation of the logarithmic subtraction mechanism 56 in FIG. 2. When the current 49 is terminated, the bail 44 of the logarithmic subtracting mechanism 56 can return to its normal center position 76 by the action of the springs 78.

If a feedback voltage signal is presented to the feedback terminal 54, near the end of the transition cycle, the feedback-enable contacts 30 are closed by a voltage on the sense terminal 22, and a sufficient current 51 can flow to ground through the feedback-complete terminal 58, current 51 through the feedback terminal 54 passes through the maximum coil 50, causing the pole piece 46 on the bail 44 of the logarithmic subtracting mechanism 56 to be attracted toward the maximum coil 50. This causes the logarithmic subtracting mechanism 56 to move the wiper arm 38 toward the maximum position 47 by a fixed fraction of the distance remaining toward the maximum position 47, as explained in the operation of the logarithmic subtraction mechanism 56 in FIG. 2. When this current 51 is terminated, the bail 44 of the logarithmic subtracting mechanism 56 can return to its normal center position 76 by the action of springs 78.

Operation of the logarithmic subtraction mechanism

With reference to the logarithmic subtraction mechanism 56 in FIG. 2, the minimum coil 48 is energized when its memory cell 20 produces an output current 49 through its output terminal 52, as explained in the discussion of FIG. 1. This output current 49 attracts the bail pole piece 46 toward the energized minimum coil 48, causing the bail armature 44 to rotate around the main shaft 64 toward the maximum stop 62A. The bail armature 44 strikes the minimum lever 60A at a position determined by the movable stop 72, and rotates the minimum lever 60A to a position determined by the fixed minimum stop 62A. This causes the minimum pawl 68A to rotate the minimum ratchet 70A through an angle determined by the angle of movement of the minimum lever 60A. The rotation of the minimum ratchet 70A is carried to the side member 88A of the differential 80 through a ratio determined by the number of teeth on the connecting gears 90A and 92A. This causes the output shaft 82 of the differential 80 to turn through an angle that is one-half the rotation of its side member 88A.

The rotation of the differential output shaft 82 turns the output gears 84 and 86. Output gear 86 meshes with a gear 96 connected to the main shaft 64, which is rigidly connected to the movable stop 72. Thus, the movable stop 72 moves toward the minimum stop 62A through some angle determined by the movement of the minimum lever 60A, the ratio of the connecting gears 90A and 92A, a one-half reduction inherent in the differential 80, and the ratio of the output gears 86 and 96. If the ratio of the connecting gears 90A and 92A is a reduction of one-half, and the ratio of the output gears 86 and 96 is a reduction of one-half, the total gear reduction from the minimum lever 60A to the movable stop 72 is ½×½×½=⅛=k. This causes the movable stop 72 to move 12.5% of the distance remaining toward the fixed minimum stop 62A each time the minimum coil 48 is energized. Thus, the predetermined constant k, which determines the degree of reduction per step is equal to 0.125.

In like manner, the maximum coil 50 is energized when a feedback current 51 can pass through its memory cell 20, as explained in the operation of FIG. 1. This causes the bail armature pole piece 46 to be attracted toward the maximum coil 50. This causes the bail armature 44 to rotate around the main shaft 64, striking the maximum lever 60B at a position determined by the movable stop 72, moving the maximum lever 60B to the position of the fixed maximum stop 62B. This causes the maximum lever 60B to rotate through an angle determined by the distance between the movable stop 72 and the fixed maximum stop 62B. This causes the maximum pawl 68B to rotate the maximum ratchet 70B through an angle determined by the angle of movement of the maximum lever 60B. The rotation of the maximum ratchet 70B is carried to the side member 88B of the differential 80 through a ratio determined by the number of teeth on the connecting gears 90B and 92B. This causes the output shaft 82 of the differential 80 to turn through an angle that is one-half the rotation of its side member 88B.

The rotation of the differential output shaft 82 turns the output gear 86 and output gear 96 that is rigidly connected to the main shaft 64 along with the movable stop 72. Thus, the movable stop 72 moves toward the maximum stop 62B through some angle determined by the movement of the maximum lever 60B, the ratio of the connecting gears 90B and 92B, the one-half reduction in the differential 80, and the ratio of the output gears 86 and 96. If the ratio of the connecting gears 90B and 92B is a reduction of one-half, and the ratio of the output gears 86 and 96 is a reduction of one-half, the total gear reduction is $\frac{1}{2} \times \frac{1}{2} \times \frac{1}{2} = \frac{1}{8} = k$. This causes the moveable stop 72 to move 12.5% of the distance remaining to the fixed maximum stop 62B each time the maximum coil 48 is energized. Thus, the predetermined constant k, which determines the degree of increase per step, is equal to 0.125.

The output gear 84, which is rigidly mounted upon the output shaft 82 of the differential 80, meshes with a wiper arm gear 98, which is rigidly mounted on the wiper arm shaft 97, which holds the wiper arm 38 shown in the memory cell 20 in FIG. 1. Thus, the movement of the wiper arm 38 bears the same relation as the movement of the movable stop 72 according to the ratio of output gears 86 and 96, and the wiper arm gears 84 and 98. In the example shown, the ratio of the output gears 86 and 96 is a reduction of one-half, and the ratio of the wiper arm gears 84 and 98 is unity, which means that the wiper arm 38 moves through twice the distance of the moveable stop 72. The ratio of the wiper arm gears 84 and 98 is chosen to use the full range of rotation of the wiper arm 38 on its variable resistor element 36.

The friction elements 91A and 91B on each differential side member hub 89A and 89B are used to overcome the friction of the wiper arm 38 on its slidewire 36. This assures that each side member 88A and 88B of the differential 80 moves only under the influence of the minimum and maximum coils 48 and 50.

Logarithmic response curves

FIG. 3A, shows some possible positions that the wiper arm 38 can take because of the operation of the logarithmic subtraction mechanism 56 shown in FIG. 2. The write-minimum curve 100 occurs when the wiper arm 38 starts at the maximum position 47, and the minimum coil 48 in a given memory cell 20 is energized repeatedly. Using the gear ratios in the example described in FIG. 2, the first step 99A represents a movement of $k=\frac{1}{8}$ of the distance between the maximum position 47 and minimum position 41, leaving $\frac{7}{8}$ of the original distance remaining to the minimum position 41. The next step 99B represents $k=\frac{1}{8}$ of the remaining distance toward the minimum position 41, or a movement of $\frac{1}{8} \times \frac{7}{8} = \frac{7}{64}$ of the distance between the maximum position 47 and the minimum position 41. This series can be continued indefinitely, causing the position of the wiper arm to approach but not quite reach the minimum position 41. The same series applies to the position of the wiper arm 38 when the wiper arm 38 starts from the minimum position 41, and the maximum coil 50 in that memory cell 20 is energized repeatedly, as shown by the write-maximum curve 101.

With reference to FIG. 3B, if the minimum coil 48 and maximum coil 50 of a given memory cell 20 are energized sequentially, the position of the wiper arm 38 will approach, but not quite arrive at the mid-position 43, where a nearly equal but opposite motion arrives in each sequence at the differential 80 in the logarithmic subtracting mechanism 56 shown in FIG. 2. Under these equal write-maximum and write-minimum conditions, if the wiper arm 38 starts at a point above the mid-position 43, the wiper arm 38 will move down toward the mid-position 43. If the wiper arm 38 starts at a point below the mid-position 43, the wiper arm will move up toward the mid-position 43. Usually, the wiper arm 38 operates below the mid-position 43, causing a write-minimum and write-minimum sequence in one transition cycle to move the wiper arm 38 to a higher sensitivity position.

Operation of the conditional memory matrix with a single memory cell

The single memory cell 20, matrix driver 108, and sensor 110 in FIG. 4 show the operation of a portion 172 of the self-learning sensor unit 254. The matrix driver 108 provides the information from the sensor 110, the output terminal 126, and output co-terminal 163 needed for a matrix 106 of memory cells 20 to learn what action can be carried out for each sensed condition in each transition cycle.

Cycle-on signal

When the contacts of the cycle on connect 146 are closed by the cycle-on signal 147 from an outside timing source 334 in FIG. 19 at the beginning of a transition cycle, a voltage from the power source 105 is conducted to the input/output interface bus 109. This energizes the input interface 114, the output interface 120, and ramp generator 162. Thus, the frequency of the cycle-on signal 147 from the outside timing source 334 determines the sampling rate of the sensors 110 and ultimately the action rate of the actuators 135. The frequency of the cycle-on signal 147 could be higher than ten cycles per second in a fast-acting machine, or lower than ten cycles per day in a weather forecasting system.

Operation of the matrix input interface circuit

The voltage from the power source 105 is conducted to the input terminal 113 by the sensor switch armature 111. Current through the matrix input terminal 149 closes the normally open contacts of the input connect 157 at this location. At the beginning of a transition cycle, a current from the input-enable bus 137 closes the input latch circuit 115 at this location. This causes a current from the input interface bus 109 to flow through the latching coil of the input latch circuit 115 and the coil of the input latch connect 116. This keeps the normally open contacts of the input latch circuit 115 closed for the remainder of the transition cycle, causing a voltage to appear on the input sense bus 119 at this location. This causes a voltage to appear on the input disconnect bus 153, which energizes the coil of the interface disconnect 118 for the remainder of the transition cycle. This opens the normally closed contacts of the interface disconnect 118, which shuts off power to the input-enable bus 137 for the remainder of the transition cycle. This assures that only one input value of each sensor variable A is identified by the matrix input interface circuit 114 in each transition cycle.

The voltage on the input sense bus 119 energizes the sense terminal 22 of every memory cell 20 in the column of the latched input sense bus 119. This closes the output-enable contacts 28 and feedback-enable contacts 30 shown in FIG. 1 in all of the memory cells 20 in the column of the latched input bus 119 for the remainder of the transition cycle.

Operation of the ramp generator

The voltage from the power source 105 through the cycle-on connect 146 also causes the motor 166 of the ramp generator 162 to start turning at the start of the transition cycle, bringing the contact armature 167 of the ramp generator 162 toward the grounded end of its slidewire resistor element 168. When the rotating contact armature 167 of the ramp generator 162 contacts the grounded end of the slidewire resistor element 168, a low voltage appears on the ramp bus 164. This ramp voltage 104 continues to rise as the contact armature 167 continues to rotate against the slidewire resistor element 168, until the contact armature 167 reaches the ungrounded end of slidewire resistor element 168, as shown in FIG. 3C. This causes a rising ramp voltage 104 to appear on the ramp bus 164, which is connected to the search terminal 32 and search coil 34 of every memory cell 20 in every memory matrix 106 in the monolithic matrix 174 shown in FIG. 6.

Selection of an output latch

As the ramp voltage 104 continues to rise, the output contacts 42 begin to close in the various memory cells 20 in the monolithic matrix 174. At some point in the voltage ramp 104, the output contacts 42 close in the conditional memory cell 20 with the most sensitive voltage-sensitive switch 35 in a given submatrix 106. If its output-enable terminal bus 128 and its input sense bus 119 are energized, memory cell 20 becomes the forward-selecting selecting memory cell 20', which energizes its output terminal bus 123. Since the voltage from the output-enable terminal bus 128 can flow to ground through an output latch 115 of the output interface circuit 120, a current 49 through the minimum coil 48 of the selecting memory cell 20 will decrease the sensitivity of its voltage-sensitive switch 35, as described in the operation of the logarithmic subtracting mechanism 56 in FIG. 2.

Operation of the output-enable disconnect

In the portion 172 of the submatrix 106 shown in part in FIG. 4, the output terminal bus 123 is connected to the latch 115 of the output interface circuit 120 directly. When an output latch 115 is energized, the normally open contacts of the latch 115 close, causing a current to flow from the input/output interface bus 109 through the latching coil of the latch 115, the output latch connect coil 116, and the output terminal 126. This causes the contacts of the output connect 116 to close, causing a voltage to appear on the output-enable disconnect bus 153. This opens the normally closed contacts of the output-enable disconnect 121, which disconnects the power to the output-enable bus 127. This prohibits any other memory cell 20 in that matrix 106 from producing an output, and terminates the current 49 through the minimum coil 48 of the selecting memory cell 20, allowing the bail 44 of the logarithmic subtracting mechanism 56 of the selecting memory cell 20 to return to its normal center position 76, as shown in FIG. 1.

Operation of the output latch damper

It is desirable that the output-enable bus 127 be disconnected quickly once an output latch 115 has been energized, so that no other memory cells can produce an output in that transition cycle. It is also desirable that the ramp voltage 104 rise slowly enough to prevent more than one memory cell 20 in a submatrix 106 from producing an output in a given transition cycle. However, time must be given for the minimum coil 48 in the selecting memory cell 20 to operate its logarithmic subtraction mechanism 56 before the output-enable bus 127 is disconnected. Therefore, a switch armature damper 155 can be placed upon the contact armature of each latch coil 115. This damper 155 will not interfere with the process of selecting one-and-only-one output because when the first latch 115 of the output interface 120 times out, power to any other latch 115 in that interface 120 will be cut off by the output-enable disconnect 121, prohibiting any other energized partially closed latch 115 from completing its delayed closure.

Operation of the feedback interface

At the beginning of the feedback period, a voltage will appear on the feedback-enable bus 138 and on a matrix output co-terminal 163, as discussed in FIG. 11. This causes a current to flow through the coil of the input connect 157 of the feedback interface circuit 176. This latches in the latch-and-connect circuit 117 in the feedback interface 176 connected to the energized output co-terminal 163. This produces a voltage on the feedback terminal bus 139 at this location, which energizes the feedback interface disconnect 118. This disconnects the input-enable bus 137 of the feedback interface 176 for the remainder of the transition cycle. This prohibits any other feedback terminal bus 139 belonging to that feedback interface 176 from being energized during that transition cycle. A damper 155 is also placed on the contacts of the latch 115 to prohibit a transient signal on the co-terminal 163 from energizing the feedback interface 176.

Finding the feedback-selected memory cell

The voltage on the feedback terminal bus 139 causes a current 51 to flow though the feedback-complete terminal 58 of the one feedback-selected memory cell 20" in that submatrix 106 that is at the intersection of the energized feedback terminal bus 139 and the latched input sense bus 119, since that feedback-selected memory cell 20" is the only memory cell 20 on the energized feedback terminal bus 139 with closed feedback-enable contacts 30. This feedback-selected memory cell 20" may or may not be the same forward-selecting memory cell 20' that selected an output in that transition, depending upon whether the forward-selected output terminal 126 belongs to the feedback-selected output co-terminal 163.

Increasing sensitivity of the feedback-selected memory cell

The current 51 shown in FIG. 1 through the feedback terminal bus 139, feedback terminal 54, maximum coil 50, feedback-complete terminal 58, and feedback-complete bus 143 of the feedback-selected memory cell 20" causes the bail 44 of the logarithmic subtraction mechanism 56 of the feedback-selected memory cell 20" to be pulled toward the maximum coil 50, causing the logarithmic subtraction mechanism 56 to move its wiper arm 38 toward the maximum position 47 by a fixed ratio of its position from the maximum position 47 to its extant position, as explained in the operation of the logarithmic subtraction mechanism 56 in FIG. 2.

Increase in sensitivity of a forward-selecting and feedback-selected memory cell If a memory cell 20 always receives a feedback signal through the co-terminal 163 belonging to its output terminal 126, its wiper arm 38 will dwell somewhere near the mid-position 43 after many transition cycles, as shown in FIG. 3B. In actual operation, a memory cell may not receive a feedback signal through the co-terminal 163 belonging to its output terminal 126 in every transition. This causes there to be more write-minimum movements than write-maximum movements of the wiper arm 38 in a given memory cell 20 after many transition cycles. Thus, the wiper arms 38 of most memory cells 20 dwell somewhere between the minimum position 41 and mid-position 43. Thus, a write-minimum and write-maximum sequence in a given transition cycle in a given memory cell 20 usually causes the sensitivity of the voltage-sensitive switch 35 to increase, as shown by the sensitivity curve 102 in FIG. 3B.

A windfall condition can occur in which the feedback terminal 163 of a memory cell 20 receives a feedback signal without its output terminal 126 having been energized in a given transition cycle. In this windfall condition, the sensitivity of the voltage-sensitive switch 35 in that windfall memory cell 20 increases according to the write-maximum curve 101 shown in FIG. 3A. But, this windfall condition cannot occur many times because the sensitivity of that windfall memory cell 20 will rise until that memory cell 20 is more sensitive than the other memory cells 20 on its input sense bus 119. This will cause that windfall memory cell 20 to start selecting output. Then its wiper arm 38 will follow the normal rise curve 102 shown in FIG. 3B.

Cycle-end signal

When the feedback-enable bus 138 is energized at the start of the feedback period, the cycle-end timer 156 also starts timing out. After a predetermined delay, The cycle-end timer 156 sends a cycle-end signal 161 to the outside timing source 334 indicating that enough time has passed for the back-selected memory cell 20" to increase its sensitivity. So the cycle-on signal 147 can be terminated. When the cycle-on signal 147 is terminated, all of the components connected to the sensor unit 254 can return to their normal positions, and the bail 44 of the logarithmic subtracting mechanism 56 of the feedback-selected memory cell 20" can to return to its normal center position 76, as shown in FIG. 1.

Operation of a sensor unit with a scalar matrix

In the scalar sensor unit 173, the scalar matrix 106 selects the selecting memory cell 20' that has the highest historical probability that the output co-terminal 163 that represents the selecting memory cell 200' has been energized in the same transition cycle with the position of the sensor switch armature 111 that represents the selecting memory cell 20'. This selecting memory cell 20' is the most sensitive memory cell 20 in its column of memory cells 20 connected to the latched input sense bus 119, and is the most confident that the output co-terminal 163 that represents the selecting memory cell 20' is energized more often compared to any other co-terminal 163 belonging to another memory cell 20 in that submatrix 106.

In a scalar matrix 106, two or more positions of the sensor switch contact armature 111 can energize the same output terminal 126 in different transitions, but only one output terminal 126 can be energized with any one position of the sensor switch contact armature 111 in a given transition. The operation of the scalar sensor matrix 173 is explained in greater detail in the discussion of the operation of the matrix driver 108 in FIG. 4.

Operation of the monolithic self-learning sensor matrix

Additional sensors 110, output interfaces 120, feedback interfaces 176, and scalar matrices 106 can be added to the scalar sensor unit 173 shown in FIG. 5. The scalar matrices 106 can be connected in a specific way to form a monolithic memory matrix 174, forming the multivariable monolithic self-learning sensor unit 254 shown in FIG. 6.

Distributed forward-selection

At the beginning of a transition cycle, an input latch-and-connect 117 belonging to each sensor 110 connected to a monolithic matrix 174 energizes one input sense bus 119 in each set 178 of submatrices 106 belonging to each sensor 110. Each input sense bus 119 extends to the input sense terminals 22 of every memory cell 20 in the column of its input latch-and-connect 117 through every submatrix 106 in the monolithic matrix 174. The ramp generator 162 sends an interrogating signal to the search terminal 32 of every memory cell 20 in every submatrix 106 in the monolithic self-learning memory matrix 174. As the ramp voltage 104 (FIG. 3C) increases, the output contacts 42 (FIG. 1) of memory cells 20 connected to the latched input sense bus 119 in each submatrix 106 begin to close, starting conductive paths from an output-enable terminal bus 128 to an output terminal bus 123 in each submatrix 106 in the manner described in the operation of the scalar matrix 106 in FIG. 5. The output contacts 42 may close in two or more memory cells 20 in a submatrix 106. However, no current can flow through these memory cells 20 until a forward-selecting conductive path is created from the output-enable bus 127 to an output latch-and-connect 117 in the output interface 120 by closed output-enable contacts 28 and output contacts 42 in a memory cell 20 in every submatrix 106 in the set 175 associated with a given output interface 120.

Distributed sensitivity reduction

When a forward-selecting conductive path is formed from the output-enable bus 127 through the set 175 of submatrices 106 associated with a given output interface 120 to the output latch-and-connect 117 representing the forward-selected value of that output interface 120, a current can flow through minimum coils 48 (FIG. 1) of the forward-selecting memory cells 20' that create this conductive path. This decreases the sensitivity of these selecting memory cells 20' in the manner discussed in FIGS. 1 through 5, which decreases the propensity of these forward-selecting memory cells 20' to create that conductive path to the selected terminals 126 of their output interface 120 when the same set input sense buses 119 are latched in the future. Also at this time, the energized output latch-and-connect 117 disconnects the output-enable bus 127 to the set 175 of submatrices 106 associated with a given output interface 120. This prohibits any other output latch-and-connect 117 belonging to that output interface 120 from being energized in that transition cycle even if more conductive paths are formed by the rising ramp voltage 104 (FIG. 3C).

Criterion for forward-selection through multiple sensor variables

In a monolithic matrix 174, the forward-selecting memory cells 20' on the forward-selecting conductive path may not be the most sensitive memory cells 20 on the latched input sense bus 119 in a given submatrix 106. However, the criterion for forming a forward-selection conductive path in a row of memory cells 20 to a given output latch-and-connect 117 of a given output interface 120 is as follows: Of all the memory cells 20 energized by the latched input sense buses 119 belonging to different sensors 110, the lowest sensitivity forward-selecting memory cell 20' in the selecting row belonging to a given value 126 of a given output interface 120 must be higher than the lowest sensitivity memory cell 20 in any other row belonging to another value 126 of a given output interface 120. Although the sensitivities of the forward-selecting memory cells 20' are decreased when they forward select an output latch-and-connect 117 of the output interface 120, the sensitivities of all the memory cells 20" that complete the feedback process are increased more than they were decreased as explained in the operation; Increase in sensitivity of a forward-selecting and feedback-selected memory cell in FIG. 4, making these forward-selected and feedback-selected memory cells 20'/20" more likely to forward select the actual output values in that transition cycle the next time the sensed conditions in that transition occur again.

Coat-tail effect in the forward-selecting process through a monolithic sensor unit In some cases, the memory cells 20 on the forward-selecting conductive path may not be the most sensitive memory cells 20 on the latched sense bus 119 in a given submatrix 106. However, the sensitivity of the low-sensitivity memory cells 20 involved in the forward-selection process are raised through a coat-tail effect because they are part of the set of higher sensitivity forward-selecting cells 20 in the set 175 of submatrices 106 belonging to a given output variable I, J, . . . . This coat-tail effect tends to create high-sensitivity (readily conductive) pathways through the monolithic matrix 174 for specific sensor/output transitions.

Unitary or diverse organization

The monolithic sensor unit 254 can transform a specific combination of values of multiple sensor variables A, B, . . . into a specific combinations of values of its multiple output variables I, J, . . . in a unitary manner. The monolithic sensor unit 254 can also transform a specific set of values of a given sensor variable A into a specific set of values of a given output variable I, despite the values of another sensor variable B in a diverse manner. It can do so if the distribution of sensitivities in the memory cells 20 in the submatrix 106 at the intersection of the given sensor A and given output variable I produce the specific sensor/output relations, and if the sensitivities of all of the memory cells 20 in the rest of the set 175 of submatrices 106 belonging to a given output variable I are set in a high-sensitivity state. In this diverse configuration, the sensor A acts upon the output variable I as if they were an independent unit that is separate from the rest of the sensors 110 and output interfaces 120 in the rest of the monolithic sensor unit 254.

Self-organization

Thus, a monolithic sensor unit 254 can act as if it is a single (unitary) unit, or as if it is a set of (separate) diverse units, depending upon the distribution of sensitivities of its memory cells 20. The sensitivities of the memory cells 20 in a self-learning monolithic sensor unit 254 can be adjusted by the actual feedback co-terminals 163 energized by another unit 256, as in FIG. 11, for each sensed condition. If the other unit 256 requires a unique combination of outputs 126 for each combination of values 149 of the sensor variables, the self-learning monolithic sensor unit 254 will organize itself into a unitary system. If the other unit 254 requires that each output interface 120 operate independently in response to sensed conditions at given sensors 110, the self-learning sensor unit 254 will organize itself into a diverse system. Thus, a multivariable monolithic self-learning sensor unit 254 is self-organizing according to the requirements of another connected unit 254, or 255 in FIG. 13.

Operation-FIGS. 7 to 14—Bidirectional units

The conditional memory cell 20 shown in FIG. 1 can be used in a self-learning matrix 106 that can forward select a matrix output terminal 126 according to which matrix input terminal 149 is energized, as shown in FIGS. 4 through 6. However, a bidirectional memory cell 200 shown in FIG. 7 is needed in a network of self-learning units, such as the duplex network 260 in FIG. 11, to back-select the value terminal 234 of an intermediate co-variable I' belonging to the value terminal 149 of the intermediate variable I that is most likely to forward-select the actual measured value terminal 160 of the actuator variable Z' in that transition cycle.

The operation of the scalar portion 202 of the bidirectional actuator unit 256 in FIG. 9, the monolithic bidirectional actuator unit 256 in FIG. 10, the duplex network 260 in FIG. 11, the intermediate unit 255 in FIG. 12, the triplex network 280 in FIG. 13, the multilevel nodal network 290 in FIG. 14, the digitized sensor unit 275 in FIG. 15, the digitized actuator unit 276 in FIG. 16, the digitized duplex network 270 in FIG. 17, and the digitized nodal network of self-learning units 300 in FIG. 18 are all based upon the operation of the bidirectional memory cell 200 in FIG. 7, and the bidirectional matrix driver 224 in FIG. 8. The method of operation of networks of these self-learning units is shown by the diagram of the algorithm of self-learning networks 302 in FIG. 19.

Operation of a bidirectional memory cell

As shown in FIG. 7, the top portion of a bidirectional memory cell 200 operates the same as the top portion of the conditional memory cell 20 in FIG. 1, except that the sense terminal 22 operates only upon the output-enable coil 24 in the bidirectional memory cell 200. However, the bottom portion of the bidirectional memory cell 200 operates in a different manner than the bottom portion of conditional memory cell 20. A back-select ramp signal 104 (FIG. 3C) through the back-select search terminal 206 causes current 37 to flow through the back-select search coil 214 through the same wiper arm 38 and the same variable resistor element 36 as the forward-select search coil 34. The normally open back-select output contacts 216 close when sufficient current 37 flows through the back-select search coil 214. Current through the back-select sense terminal 208 and back-select enable coil 210 closes the normally open back-select enable contacts 212 of the back-select enable connect 29B. A voltage on the back-select enable terminal 220 causes a current 222 to flow through the maximum coil 50 when the back-select enable contacts 212 and the back-select output contacts 216 are closed, and the back-select output terminal 218 is grounded. This increases the sensitivity of the bidirectional memory cell 200 in the same manner as the forward selecting memory cells 20. The diodes 204 keep the current from the forward-selecting ramp voltage 104 through terminal 32 from flowing through the back-selecting search coil 214, and current from the back-selecting ramp voltage 104 through terminal 206 from flowing through the forward-selecting search coil 34.

Operation of a bidirectional memory matrix driver

Forward selection through the bidirectional memory matrix driver 224 shown in FIG. 8 operates the same as the forward selection through the self-learning memory driver 108 shown in FIG. 4. However, the bidirectional matrix driver 224 must also operate an actuator 135, a back-select ramp generator 238, and a matrix input co-variable interface 233.

Operation of the actuator brake

A voltage from the power source 105 is conducted to the actuator matrix by the power bus 112. This voltage is maintained on the actuator brake bus 141 through the normally closed contacts of the actuator brake disconnect 158. This causes a current to flow through the actuator brake switch 140, the actuator/brake terminal 159 and the stator coil 131 at the position where the actuator brake 140 holds an actuator armature pole 133 in alignment with an actuator stator pole 132. This brake current magnetizes the stator pole 132 at this location, causing the armature pole 133 at this location to be attracted to the stator pole 132 at this location. This causes the actuator armature 134 to be held at whatever position it is in.

Operation of the forward-select delay timer

When a sensor unit 254 energizes its input/output interface bus 109 at the start of a transition cycle, a connected unit, such as the actuator unit 256, must be ready to receive and latch in the forward-selected signal 269 from the sensor unit 254, as shown in FIG. 11. To this end, the interface bus 109 also energizes the input interface 114 in the actuator unit 256. However, some time must be allowed for the sensor unit 254 to forward-select a value of the intermediate variable I before the actuator unit 256 attempts to forward-select. To this end, the forward-select delay timer 262 in the cycle logic controller 145 delays the start of the forward-select ramp 162 in the actuator unit 256 until a value can be latched into its input interface 114.

Forward-selection through a bidirectional matrix

Once the forward-select delay timer 262 times out, the forward-selecting ramp generator 162 starts to produce a rising ramp voltage 104 shown in FIG. 3C, and the output interface 120 is enabled. The most sensitive bidirectional memory cell 200 connected to the energized input terminal 149 in the bidirectional matrix 240 produces a voltage at its output terminal 52 by the action of its input terminals 21, 22, and 32 in the same manner as the forward-selecting memory cell 20 in FIG. 1. This output is latched in and held on the matrix output terminal 126 belonging to that forward-selecting bidirectional memory cell 200'.

Operation of the actuator delay timer

There may be an intrinsic lag required between sensed conditions and the need to produce an action due to the physical relations in the environment and the sensor/actuator machine, such as the duplex network 260 in FIG. 11. This lag can be created by the actuator delay timer 148 in the self-learning actuator unit 256. A current through the coil of the actuator delay timer 148 from the output of the delay timer 262 causes the contacts of the actuator delay timer 148 to start closing against the retarding influence of the switch armature damper 155. After some delay determined by the damping characteristics of its damper 155, the contacts close in the actuator delay timer 148. This produces a voltage on the actuator-enable bus 129 through the actuator-enable disconnect 152, allowing a current to flow through the closed contacts of the selected actuator-enable connect 130 connected to the energized output latch-and-connect circuit 117 of the interface circuit 120.

Releasing the actuator brake

The output of the actuator delay timer 148 also causes a current to flow through the normally closed contacts of the brake reconnect 154. This opens the normally closed contacts of the brake disconnect 158, which disconnects the power to the actuator brake bus 141. This releases the actuator brake 165 so that the armature 134 can be positioned by the current through the selected actuator-enable connect 130.

Attempt to produce a specific action

The current through the closed contacts of the selected actuator-enable connect 130 causes a current to flow through the selected actuator coil 131. This magnetizes the stator pole 132 at this location, attracting the armature pole 133 that is related to this stator pole 132. This causes the actuator armature 134 to attempt to assume the selected position represented by the selected actuator value terminal 151.

Creating a feedback delay period

Some time may be required for the actuator armature 134 to assume the position called for by the energized stator coil 131. So some time must lapse before the actuator brake 165 is re-engaged and the position of the armature 134 is measured in the feedback period. Therefore, the output of the actuator delay timer 148 also causes a current to flow through the coil of the feedback delay timer 150. This starts the timing of the feedback delay timer 150, creating a feedback delay period.

Re-engaging the actuator brake at the end of the feedback delay period

After some delay from the attempt to produce a specific action, the feedback delay timer 150 times out, closing the contacts in the feedback delay timer 150. This ends the feedback delay period, and starts the feedback period. At the start of the feedback period, the coil of the actuator brake reconnect 154 is energized by the feedback delay timer 150, which opens the normally closed contacts of the brake reconnect 154 for the remainder of the transition cycle, allowing the normally closed contacts of the brake disconnect 158 to re-close for the remainder of the transition cycle. This re-engages the actuator brake 165 until it is disengaged some time in the next transition cycle, and the actuator brake 165 at the position of the closed brake switch 140 attempts to hold the actuator armature 134 in its extant position.

Movement of the actuator armature

If the actuator armature 134 can assume the position of the selected actuator coil 131 and pole piece 132, then the feedback co-terminal 160 contacts close in the feedback switch 136 at the selected location. If the actuator armature 134 is not allowed to arrive at the selected location, or if the actuator armature is moved to a different location due to an outside influence, such as an operator or the environment, so as to align another actuator pole 133' with another pole piece 132', then the contacts of the feedback switch 136' close at the actual armature location 160'. This causes a voltage to appear on the matrix output co-terminal 163' at the location of the closed feedback contacts 160'.

Operation of the output co-variable interface circuit

When the feedback delay timer 150 times out at the beginning of the feedback period, a voltage is also produced on the feedback-enable bus 138, which activates the output co-variable (feedback) interface 176, which latches in the actual position 160' of the actuator armature 134 at the beginning of the back-select (feedback) period, and prohibits any other back-select sense terminal bus 139 (feedback bus) from being energized during that transition cycle in the manner of the feedback interface circuit 176 in the portion 172 of the self learning sensor unit 254 shown in FIG. 4.

Operation of back-selection

Also, when the feedback delay timer 150 times out, the back-select ramp generator 238 starts an increasing voltage on its back-select ramp bus 239, which is connected to the back-select search terminals 206 and back-select search coil 214 shown in FIG. 7 in all of the bidirectional memory cells 200 in the monolithic bidirectional matrix 250. The amount of current that flows through each back-select search coil 214 is determined by the position of the wiper arm 38 in each bidirectional memory cell 200. If this current is sufficient to cause the back-select output contacts 216 in a memory cell 200 to close, if the back-select enable contacts 212 are closed by a voltage on the back-select sense bus 139 of that memory cell 200, and if there is a voltage on its back-select enable terminal 220 from the back-select enable terminal bus 245, than a current 222 can flow through the maximum coil 50 of that bidirectional memory cell 200 through the back-select output terminal 218 of that bidirectional memory cell 200 to the latch-and-connect circuit 117 of the input co-variable interface circuit 233 that is connected to its back-select output terminal 218 by the back-select output terminal bus 246. This current 222 increases the sensitivity of this bidirectional memory 200 in the manner described in the operation of the bidirectional memory cell 200 in FIG. 7 and the conditional memory cell 20 in FIG. 1.

Operation of the back-select output-enable disconnect

When a bidirectional memory cell 200 back-selects a back-select output terminal bus 246, the energized latch-and-connect 117 of the input co-variable interface 233 holds a voltage on its input co-terminal 234 for the remainder of that transition cycle. The input co-variable interface 233 then disconnects the back-select enable bus 244 through the back-select enable disconnect 236 by means of the back-select-enable disconnect bus 153. This prohibits any other input co-terminal 234 from being selected by that bidirectional matrix 240 for the remainder of the transition cycle, and allows the bail 44 of the back-selecting memory cell 200 to return to its normal center position 76.

Operation of a scalar bidirectional self-learning memory matrix

The scalar bidirectional self-learning memory matrix 240 shown in the portion 202 of the actuator unit 256 shown in FIG. 9 operates the same as the scalar self-learning memory matrix 106 shown in FIG. 5, except the bidirectional memory matrix 240 uses the back-selecting ramp generator 238 to back-select and hold a voltage on the input co-terminal 234 belonging to the input terminal 149 most likely to forward-select the actual position measured by the energized actuator feedback terminal 160 of the actuator 135. The bidirectional matrix 240 increases the sensitivity of this one back-selecting memory cell 200 in its bidirectional matrix 240, as described above.

Operation of a monolithic bidirectional self-learning actuator unit

The monolithic bidirectional self-learning actuator unit 256 shown in FIG. 10 forward-selects a set of values of its actuator variables X, Y, . . . according to the values of its input variables I, J, . . . and the sensitivity of its memory cells 200. It then decreases the sensitivity of its forward-selecting memory cells 200', as described earlier. It then back-selects a set of values of its input co-variables I', J', . . . according the actual values of its actuator co-variables X', Y', . . . and the sensitivity of its memory cells 200. It then increases the sensitivity of the back-selecting memory cells 200", as described earlier.

Forward-selection in a monolithic bidirectional memory matrix

When the input/output interface bus 109 is energized near the beginning of a transition cycle, each set 175 of bidirectional submatrices 240 in the monolithic bidirectional matrix 250 forward-selects the output position of its actuator 135, reduces the sensitivity of the forward-selecting memory cells 200, disengages the actuator brake 165, attempts to produce the selected position of the actuator 135, re-engages the actuator brake 165, and measures the actual position of the actuator 135 in the manner described in the actuator unit 256 in FIG. 9.

Back-selection in a monolithic bidirectional memory matrix

When the actual position of each actuator 135 is measured, a voltage appears on the back-select sense bus 139 corresponding to the actual position of each actuator in each set 175 of bidirectional matrices 240. This closes the back-select enable connects 29B in every memory cell 200 connected to these energized back-select sense buses 139 in the manner described in FIG. 7.

The back-select ramp generator 238 is driven by the output of the feedback delay timer 150, so the back-select ramp voltage 104 starts to increase when the global feedback-enable bus 138 is energized. In a manner identical to the forward-selection process through a monolithic matrix, the back-select output contacts 216 shown in FIG. 7 begin to close in all of the bidirectional memory cells 200 connected to the back-select ramp generator 238. However, conductive paths can form from the back-select enable terminal buses 245 to the back-select output terminal busses 246 only in memory cells 200 that are also connected to the one latched feedback sense bus 139 in each set 175 of bidirectional submatrices 240. Columns of memory cells 200 with closed contacts 212 and 216 shown in FIG. 7 begin to form portions of a conductive path from the back-select enable bus 244 to latch-and-connect circuits 117 in the input co-variable interface 233.

In some cases, the back-select output contacts 216 of two or more memory cells 200 in a row in a given submatrix 240 may close. However, no current can flow through these memory cells 200 until a back-selecting conductive path is completed in one column of memory cells 200 from the back-select enable bus 244 to a latch-and-connect 117 in the input co-variable interface 233 through the complete set 177 of bidirectional submatrices 240 associated with a given input variable I or J.

Increasing sensitivity of back-selecting cells

When a conductive path is completed to one latch-and-connect 117 in the input co-variable interface 233 in a set 177 of submatrices 240 associated with one input variable I or J . . . , a current 222 can flow through the maximum coils 50 of the memory cells 200 in the column of this energized input co-terminal 234. This increases the sensitivity of these memory cells 200 in the manner discussed in FIG. 1 through 4. At this time, the energized latch-and-connect circuit 117 in the input co-variable interface 233 operates the back-select enable disconnect 236, which disconnects the back-select enable bus 244 in the set 177 of submatrices 240 associated with the back-selected input co-variable I' or J' . . . . This prohibits any other latch-and-connect circuit 117 associated with that input co-variable I' or J' . . . from being energized in that transition cycle, and allows the bails 44 of the back-selecting memory cells 200 to return to their normal center positions 76.

This process is carried out in each set 177 of submatrices 240 associated with each input variable I or J . . . . The increase in sensitivity in the set of memory cells 200 that back-select a value of each input co-variable I' or J' . . . in that transition increases the propensity of these memory cells 200 to create a forward-selecting conductive path to the actual value 160 of each actuator 135 in that transition when the same input values 149 are latched-in in a future transition.

Criterion for the back-selection process in a bidirectional monolithic matrix

In a manner similar to the forward-selection process, the criterion for forming a back-selection conductive path to a given input co-terminal latch 234 of a given intermediate variable I is as follows: Of the memory cells 200 energized by the latched back-select sense buses 139 in the back-selected column of memory cells 200 belonging to a given input variable I or J . . . , the lowest sensitivity memory cell 200 must be higher than the lowest sensitivity memory cell 200 energized by the latched back-select sense buses 139 in any other column belonging to another value of that input variable I or J . . . .

Although though the sensitivities of memory cells 200 are decreased when they forward select an output latch-and-connect 117 in the output interface 120, the sensitivities of the bidirectional memory cells 200 that back-select an input co-terminal 234 are increased more than they were decreased, as explained in the discussion of the Increase in sensitivity of a forward-selecting and feedback-selected memory cell in FIG. 4, making these memory cells 200 more likely to forward select the actual output values in that transition cycle the next time the input conditions in that transition occur again.

Coat-tail effect in the back-selecting process through a bidirectional monolithic matrix In some cases, the memory cells 200 on the back-selecting conductive path may not be the most sensitive memory cells 200 on the latched back-select sense bus 139 in a given submatrix 240. However, the sensitivity of the low-sensitivity bidirectional memory cells 200 involved in the back-selection process are raised through a coat-tail effect because they are part of the set of higher sensitivity back-selecting cells 200. This coattail effect tends to create high-sensitivity (readily conductive) pathways through the bidirectional monolithic matrix for specific input/actuator transitions.

Self-organization in a multivariable bidirectional monolithic self-learning actuator unit Like a multivariable monolithic self-learning sensor unit 254, the multivariable monolithic bidirectional self-learning unit 256 can organize itself into a unitary or diverse system according to the requirements of an operator and/or the task environment. A monolithic actuator unit 256 can act as if it is a single (unitary) unit, or as if it is a set of (separate) diverse units, depending upon the distribution of sensitivities of its memory cells 200. The sensitivities of the memory cells 200 in a self-learning monolithic actuator unit 256 can be adjusted by the actual feedback co-terminals 163 energized by the actual actuator positions created by an operator or an environment 294 (FIG. 14) for each sensed condition. If the operator or the environment 294 requires a unique combination of outputs 159 for each combination of values 149 of the intermediate variables I, J, . . . , the self-learning monolithic actuator unit 256 will organize itself into a unitary system. If the operator and/or environment 294 requires that each actuator 135 operates independently in response to each intermediate variable I or J, the self-learning actuator unit 256 will organize itself into a diverse system. Thus, a multivariable monolithic self-learning actuator unit 256 is self-organizing according to the requirements of an operator and/or an environment 294.

Operation of a duplex network of self-learning units

The bidirectional actuator unit 256 shown above can be connected to the sensor unit 254 by means of the intermediate variables I, J, . . . , and intermediate co-variables I', J', . . . , forming the duplex network 260, as shown in FIG. 11. The sensor unit 254 forward-selects a value of its intermediate variable I, J, . . . based upon the values of its sensor variables A, B, . . . , and decreases the sensitivity of its forward-selecting memory cells 20'. The actuator unit 256 forward-selects a value of its actuator variables X, Y, . . . based upon the values of its intermediate variables I, J, . . . , and decreases the sensitivity of its forward-selecting memory cells 200'. The actuator unit then back-selects a value of its intermediate co-variables I', J', . . . , and increases the sensitivity of its back-selecting memory cells 200". Then the sensitivity of the memory cells 20" that are at the intersection of the extant values of the sensor variables A, B, . . . and the back-selected values of the intermediate co-variable I', J',. . . are increased, as described in the operation of the sensor unit 254.

Forward-selection of a value of the intermediate variable by the sensor unit

A cycle-on signal 147 at the cycle-on switch 146 of the sensor unit 254 in a duplex network 260 energizes the input/output bus 109 in the sensor unit 256 and the actuator unit 256. Each set 177 of submatrices 106 belonging to a given intermediate variable in the sensor unit 254 select, latch, and hold a voltage on one intermediate terminal 126 belonging to each intermediate variable I, J, . . . , and reduce the sensitivity of the selecting memory cells 20 in each submatrix 106 in the manner described in FIGS. 4, 5, and 6.

Forward-selection of a value of the actuator variable by the actuator unit

One intermediate variable input latch-and-connect circuit 117 in the input interface 114' of the actuator unit 256 is energized by the forward-selected value 269 of the intermediate variable I. This intermediate variable input latch-and-connect circuit 117 disconnects the rest of the intermediate connects 157 of that intermediate variable I for the remainder of the transition cycle, prohibiting any other value of the intermediate variable I from being latched in that transition cycle.

After some delay produced by the forward-select delay timer 262, to allow the sensor unit 254 to select an output, and the actuator unit 256 to latch it in, each set 175 of submatrices 240 in the actuator unit 256 then forward-selects one actuator latch-and-connect circuit 117 of the output interface 120' belonging to each actuator variable Z, Y, . . . , and decreases the sensitivity of each forward-selecting bidirectional memory cell 200 in each bidirectional submatrix 240 in the manner described in FIGS. 7, 8, 9, and 10.

Back-selection of a value of the intermediate co-variable by the actuator unit

After the delays required to position the actuator 135, the actuator delay timer 148 and feedback delay timer 150 in the actuator unit 256 time out in the usual manner. This energizes the back-select-enable bus 138 in both units 254 and 256, which starts the cycle-end timer 156, and energizes the intermediate co-variable interface 176' in the sensor unit 254. The actual position of the actuator 135 is measured and latched into the latch-and-connect circuit 117 in each output co-variable interface 176 in each set 175 of submatrices 240 in the actuator unit 256. Then the actuator unit 256 back-selects one intermediate co-terminal 234 belong to each intermediate co-variable I', J', . . . , and increases the sensitivity of each back-selecting bidirectional memory cell 200 in each bidirectional matrix 240 in the manner described in FIGS. 7, 8, 9, and 10.

Increase in sensitivity of the memory cell in the sensor matrix

The back-selected value 268 of the intermediate co-variable I' or J', . . . energizes the intermediate co-terminal 163 in the sensor unit 254, which energizes the corresponding intermediate co-variable input latch-and-connect circuit 117 in the intermediate co-variable interface 176' in the sensor unit 254. This disconnects the intermediate co-terminal input connects 157, prohibiting any other values of this intermediate co-variable I' from being received by the sensor unit 254 during that transition cycle. This latch-and-connect circuit 117 of the intermediate co-variable interface 176' also energizes and holds a voltage on its feedback terminal bus 139 in the sensor unit 254, increasing the sensitivity of the memory cell 20 that is connected to the latched input sense terminal bus 119 and to the latched feedback terminal bus 139 in each submatrix 106 in the sensor unit 254 in that transition in the manner described in FIG. 1.

When the cycle-end timer 156 in the sensor matrix times out, a cycle-end signal 161 is sent to the outside timing source 334 (FIG. 19) indicating that the transition cycle is over. When the cycle-on signal 147 is discontinued, power to all of the units except the sensors 110 and actuator brake 165 is terminated, allowing the rest of the components to be restored to their normal positions, and the feedback-selected LSMs 56 in the sensor unit 254 to be restored to their normal center positions in preparation for the next transition cycle.

Operation of the intermediate variable interfaces

The input interface circuit 114' of the actuator unit 256 latches and holds a value of a single intermediate variable terminal 149 belonging to one of its intermediate variables I, J, . . . , and disconnects the remaining intermediate variable terminals 149 belonging to that intermediate variable say I when it receives an input signal 269 from any connected unit, such as the sensor unit 254 in the manner shown previously. Thus, no other value of that intermediate variable I can be received by the actuator unit 256 during that transition cycle.

The output co-variable interface circuit 176' of the sensor unit 254 also latches and holds a value of a single intermediate co-terminal 163 belonging to one of the intermediate co-variables I', J' . . . , and disconnects the remaining intermediate co-terminals 163 belonging to that intermediate co-variable, say I', when it receives a back-selected feedback signal 268 from another unit. Thus, no other value of that intermediate co-variable I' can be received by the sensor unit 254 during that transition cycle.

Memory cell reduction in a duplex network

The number of values of the intermediate variable I and its co-variable I' in the set of matrices 177 is determined by the number of intermediate terminals 126/149 and their related intermediate co-terminals 234/163. Each value 269 of the intermediate variable I can be used to represent a specific transition between a specific value of a sensor variable A and an actuator variable Z. As many intermediate terminals 126/149 and their intermediate co-terminals 234/163 can be provided as the expected number of transitions in the line of behavior required by the task to be carried out by the duplex network.

If the number of values of the sensor and actuator variables A and z is large in comparison to the number of transitions required by the expected task, the number of memory cells 20 and 200 in a duplex network 260 of self-learning units 254 and 256 can be greatly reduced in comparison to a monolithic machine 10 shown in FIG. 5 in the parent patent application Ser. No. 08/155,587. For example, if this scalar self-learning machine 10 were to have 27 values of its sensor 110 and actuator 135 variables, it would require 27×27=729 memory cells 20. If a duplex network 260 were to be used in place of this scalar machine 10 in an auto-pilot that uses only one sensed condition for each of five actuator values (maximum left rudder, standard left rudder, dead ahead, standard right rudder, and maximum right rudder), then the sensor unit would require only 27×5=135 memory cells 20, and the actuator matrix would require only 5×27=135 bidirectional memory cells 200, for a total of 270 memory cells 20 and 200.

Unitary relations in a duplex network

The number of sensors 110 in the sensor unit 254, and actuators 135 in the actuator unit 256 in a duplex network 260 can be increased without limit. A unique combination of values of multiple sensors 110 in the sensor unit 254 can produce a unique combination of values of multiple actuators 135 in the actuator unit 256 through one set of intermediate terminals 126/149, which represents a value of the intermediate variable I. The actuator unit 256 can feed back a unique combination of actual values of multiple actuators 135 through one set of intermediate co-terminals 234/163, which represents a value of the intermediate co-variable I', which is used to increase the sensitivity of the appropriate memory cells 20 in the sensor matrix 254. Thus, the duplex network can establish as many unitary transitions between its sensors 110 and its actuators 135 as the number of intermediate terminals 126/149 of its intermediate I, and the number of intermediate co-terminals 234/163 of its intermediate co-variable I'.

Synchronous diverse relations in a duplex network

One intermediate variable I also can provide synchronous (coordinated) diverse relations between specific sensors 110 and actuators 135 in a duplex network 260. That is to say, one intermediate variable I can cause values of a specific sensor 110 or set of sensors 110 to produce values of a specific actuator 135 or set of actuators 135 provided the values of the other sensor 110 variables are maintained within limits during the synchronous diverse line of behavior. Since each actuator state (Z, Y, . . . ) in a synchronous diverse line of behavior is determined by a unique sensor state (A, B, . . . ), a synchronous diverse line of behavior also may be construed to be unitary.

Asynchronous diverse relations in a duplex network

The number of intermediate variables I, J, . . . also can be increased without limit, allowing an asynchronous (uncoordinated) diverse relation to occur through each intermediate variable. That is to say, each intermediate variable I, J, can cause values of a specific sensor 110 or set of sensors 110 to produce values of a specific actuator 135 or set of actuators 135 without regard for the values of the other sensor 110 variables during each asynchronous diverse line of behavior. These asynchronous diverse lines of behavior appear to be produced by separate duplex networks 260.

Operation of an intermediate unit

The self-learning intermediate unit 255 in FIG. 12 operates in the same way as the actuator unit 256 except that the self-learning intermediate unit 255 does not produce an actuator delay, and has no actuators. The self-learning intermediate unit 255 forward-selects values $269'$ of its output variables $I_2$ based upon the value 269 of its input variable $I_1$ and the sensitivity of the memory cells 200 in its matrix 250. After a delay to allow the actuators 135 in the triplex network 280 (FIG. 13) of which the intermediate unit 255 is a part, the intermediate unit 255 back-selects values $268'$ of its input co-variables $I'_1$ based upon the values 268 of the output co-variables $I'_2$ and the sensitivity of the memory cells 200 in its matrix 250.

Operation of a triplex network

If the number of sensors 110 and the number of actuators 135 is very large, and its believed that many of these sensors 110 and actuators 135 may operate in an asynchronous diverse manner, the number of memory cells 20 and 200 can be reduced by placing the sensors 110 in separate sensor units 254, and placing the actuators 135 in separate actuator units 256. The number of resulting intermediate variables I, J, . . . , which allow any sensor 110 to influence any actuator 135, can be greatly reduced by connecting these sensor units 254 to actuator units 256 through intermediate units 255, one of which is shown in the triplex network in FIG. 13.

Forward-selection through the sensor unit

A cycle-on signal 147 at the start of a transition cycle energizes the input/output bus 109 common to the sensor unit 254 and the intermediate unit 255, causes the sensor unit 254 to forward-select an intermediate value terminal 126, decrease the sensitivity of the forward-selecting memory cells 20 according to their LSMs 56, and disconnect the output enable bus 127 to allow the forward-selecting LSMs to reset. The value 269 of the intermediate variable $I_1$ is sent to and latched into the intermediate unit 255 through its input terminal 149'.

Forward-selection through the intermediate unit

At the start of the transition cycle, the forward-select delay timer 262 in the intermediate unit 255 is energized by the input/output bus 109 common to the sensor unit 254 and the intermediate unit 255. This delays the start of the ramp generator 162' in the intermediate unit 255 until the ramp generator 162 in the sensor unit 254 has time to forward-select and produce the output 269. When the forward-select delay timer 262' in the intermediate unit 255 times out, it energizes the input/output bus 109' common to the intermediate unit 255 and the actuator unit 256, and starts the ramp generator 162' in the intermediate unit 255. This causes the intermediate unit 255 to forward-select and produce a value 269' of its intermediate variable $I_2$, reduce the sensitivity of the forward-selecting memory cells 200 in the intermediate unit 255 according to their LSMs 56, and disconnect its output enable bus 127' to allow the LSMs 56 in the forward-selecting memory cells 200 to reset.

Forward-selection through the actuator unit

The forward-select delay timer 262' in the actuator unit 256 is energized by the input/output bus 109' common to the intermediate unit 255 and the actuator unit 256. This delays the start of the ramp generator 162" in the actuator unit 256 until the ramp generator 162' in the intermediate unit 255 has time to forward-select and produce its output 269' of the intermediate variable $I_2$, $J_2$, . . . . When the forward-select delay timer 262' in the actuator unit 256 times out, it energizes the output bus 109", and starts the ramp generator 162" in the actuator unit 256. This causes the actuator unit 256 to forward-select and produce an output on its matrix output terminal 126", decrease the sensitivity of the forward-selecting memory cells 200 in the actuator unit 256, and disconnect its output enable bus 127" to allow the LSMs 56 in the forward-selecting memory cells 200 to reset. The actuator unit 256 then produces a motion of its actuator 135 as explained in the operation of the actuator unit 256 in FIGS. 7 through 10.

Back-selection through the actuator unit

When actuator delay timer 148 and the feedback delay timer 150 time out at the start of the feedback (now back-select) period, the back-select input/output bus 138 common the actuator unit 256 and the intermediate unit 255 is energized. This starts the back-select delay timer 156 in the intermediate unit 255, and causes the actuator unit 256 to back-select a value 268 of the intermediate co-variable $I'_2$, increase the sensitivity of their back-selecting memory cells 200 according to their LSMs, and disconnect its back-select enable bus 244 to allow the back-selecting LSMs to return to their normal center positions 76.

Back-selection through the intermediate unit

When the back-select timer 156 in the intermediate unit 255 times out, it energizes the back-select input/output bus 138' common to the intermediate unit 255 and the sensor unit 254, and starts the back-select ramp generator 238' in the intermediate unit 255. This causes the intermediate unit 255 to back-select a value 268' of its intermediate co-variable $I'_1$ through its matrix co-variable terminal 234', increase the sensitivity of the back-selecting memory cells 200 according to their LSMs 56, and disconnect the back-select enable bus 244' to allow the back-selecting LSMs 56 to reset.

Increasing sensitivity of back selected memory cells in the sensor unit

The back-selected value 268' of the intermediate co-variable $I'_1$ is latched into the sensor unit 254 through its intermediate co-variable terminal 163", which is used to increase the sensitivity of the memory cells 20 in the sensor matrix 254 at the intersection of the energized back-selected terminal 163" and the sensor selected input terminals 149. The energized back-select-enable bus 138' in the sensor unit 254 energizes the cycle-end timer 156', which produces a cycle-end signal 161 when it timers out. This indicates to the outside timing source 334 that the cycle-on signal 147 can be terminated in that transition cycle, which allows all of the connects, disconnects, and latches in the network to reset, and the feedback-selected LSMs 56 in the sensor unit 254 to return to their normal center positions 76.

Operation of a nodal network of bidirectional self-learning units

The intermediate output variables $I_1$, $J_1$, . . . and intermediate co-variables $I'_1$, $J'_1$, . . . of any sensor unit 254 can be connected to the intermediate input variables $I_1$, $J_1$, . . . and intermediate co-variables $I'_1$, $J'_1$, . . . of one or more intermediate units 255. The intermediate output variables $I_2$, $J_2$, . . . and intermediate co-variables $I'_2$, $J'_2$, . . . of any intermediate units 255 can be connected to the intermediate input variables $I_2$, $J_2$, . . . and intermediate co-variables $I'_2$, $J'_2$, . . . of any actuator units 256, forming a nodal network 290, as shown in FIG. 14.

All of the units in a nodal network 290 must operate in the same transition cycle, preferably from a single timing source 334, in the manner of the triplex network shown in FIG. 13. In a given transition, information as to the values of the sensor state (A, B, . . . ) of the sensors 110 is transformed by the sensor units 254 into a new unitary intermediate input state ($I_1$) or separate diverse intermediate states ($I_1$, $J_1$, . . . ) that represent the sensor states (A, B, . . . ). This intermediate input state or these intermediate input states are transformed by the intermediate units 255 into a new intermediate output state ($I_2$) or separate intermediate output states ($I_2$, $J_2$, . . . ) which are transformed into values of the actuator variables Z, Y, . . . by the actuator units 256.

These forward-selecting transformations proceed from the sensors 110 to the actuators 135 before the actuator delays created by the timer 148 in the actuator unit 256 shown in FIG. 13. The back-selecting transformations of the intermediate co-variables I', J', . . . must also occur from the actuators 135 to the sensor units 254 within the same transition cycle. Information inherent in the task environment must then flow from the conditions in the actuator environment 294 to change the conditions in the sensor environment 292 before the start of the next transition cycle to create an ongoing line of behavior.

The directly connected nodal network 290 can establish a unitary relation between the sensor variables 110 and the actuator variables 135 through a single intermediate unit 255, or specific sensor variables 110 and actuator variables 135 can establish asynchronous diverse relations through different intermediate units 255.

Operation of FIGS. 15 through 18—Digitized self-learning units

A digitized duplex machine 270 (FIG. 17) can produce sensor/actuator relations based upon the combination of values of all of its sensor and actuator aggregate variables a, b, . . . in a unitary manner. In this case, a particular value of a sensor variable A produces a specific value of the actuator variable Z. However, each aggregate variable a or b is more or less significant. For example, the tens-place is more significant than the units-place in a decade number system. Thus, a digitized machine can produce sensor/actuator relations based upon the values of its most significant sensor and actuator aggregate variables a, b, . . . in a diverse manner. In this case, a generally high, middle, or low value of a sensor can produce a generally high, middle, or low value of its actuator. This feature greatly reduces the number of memory cells 20/200 and learning time required to produce machine behavior requiring less resolution than that provided by the sensor 110 and actuator 135 hardware. In addition, a duplex machine 270 with digitized sensor and actuator variables can have a higher resolution with fewer memory cells 20 than an undigitized duplex machine 260 (FIG. 11) or the undigitized scalar machine 173 shown in the parent application Ser. No. 08/155,587 in FIG. 5.

Operation of a digitized self-learning sensor unit

The sensor variable A in the multivariable monolithic sensor unit 254 shown in FIG. 6 can be represented by the aggregate input variables A(a) and A(b) of a sensor encoder 182, forming a digitized self-learning sensor unit 275 shown in FIG. 15. The sensor encoder 182 assures that each value of the sensor variable A produces a unique combination of values of the aggregate input variables A(a) and A(b). The digitized monolithic sensor unit 275 with a digitized sensor variable A and undigitized output variables I, J, . . . operates the same as a monolithic sensor unit 254 (FIG. 6) with multiple sensor variables A, B, . . . and multiple output variables I, J, . . . .

More sensors 110 and output variables K, L, . . . can be added to the digitized monolithic sensor unit 275 by extending the power bus 112, input/output interface bus 109, ramp bus 164, input sense buses 119, feedback-enable bus 138, and feedback buses 139 to the additional sensors 110, input interfaces 114, output interfaces 120, feedback interfaces 176, and submatrices 106.

Operation of a digitized self-learning actuator unit

The actuator variable Z in the multivariable monolithic actuator unit 256 shown in FIG. 10 can be represented by the aggregate matrix output variables Z(a) and Z(b) of an actuator decoder 184, and aggregate output co-variables Z(a)' and Z(b)' of an actuator feedback encoder 186, forming a digitized self-learning actuator unit 276 shown in FIG. 16. The actuator decoder 184 assures that each unique combination of values of the aggregate output variables Z(a) and Z(b) produces a unique position value of the actuator variable Z. The actuator feedback encoder 186 assures that each measured actuator position Z' produces a unique combination of values of the aggregate output co-variables Z(a)' and Z(b)'.

More actuators 135 and input variables K, L, . . . and input co-variables K', L', . . . can be added to the digitized monolithic actuator unit 276 by extending the power bus 112, actuator brake bus 141, input/output interface bus 109, forward-select ramp bus 164, back-select ramp bus 239, input sense buses 119, matrix output enable bus 109', actuator-enable bus 129, feedback-enable bus 138, feedback buses 139, and back-select enable bus 244 to the additional input interfaces 114, input co-variable interfaces 233, output interfaces 120, output co-variable interfaces 176, actuators 135, and submatrices 240.

Operation of a multivariable digitized duplex self-learning auto-pilot

The digitized sensor matrix 275 can be connected to the digitized actuator matrix 276, forming the digitized duplex network 277 shown in FIG. 17. A crosswind sensor 193 and a wind-direction indicator 194, and a direction error sensor 191 and a compass 192 with an adjustable card that establishes the desired heading can be connected to the sensor encoders 182. Servo-actuators 195 and a bow thruster 198 can be connected to the actuators 135 through servo-valves 195, forming the digitized duplex self-learning auto-pilot 270 shown in FIG. 17.

Both a helmsman and the multivariable digitized duplex self-learning auto-pilot 270 may attempt to operate the actuators 135 to control the direction of the ship 181. The helmsman and the self-learning auto-pilot 270 attempt to maintain a straight course by observing the values 113 of the direction errors sensor 191 and the crosswind sensor 193, and manipulating the positions 159 of the rudder position and bow thruster actuators 135. The helmsman can have a greater physical influence over the actuators 135 than the self-learning actuator unit 256 by operating the servo-valves 195 of the rudder servo and bow thruster. This causes the actuators 135 to feedback the actuator positions 160 produced by or allowed by the helmsman. After a period of learning, the digitized duplex self-learning auto-pilot 270 will acquire and reproduce the control behavior of the helmsman, allowing the helmsman to withdraw from the control process.

Self-organization in a ship auto-pilot

The whole of both sensor states A and B may be transformed into the whole of both actuator states Z and Y. These relations are said to be unitary. If a unitary organization is required by the task environment involved in the control of the ship 181, only one intermediate variable I is required.

However, a specific sensor 191 and a specific actuator 196, and another sensor 193 and another actuator 198 may be able to operate independently. If an asynchronous diverse organization is required by the task environment, then additional intermediate variables J, K, . . . are required in the duplex controller 260. As many intermediate variables must be provided as there are asynchronous diverse relations between specific sensor and actuator variables.

If a duplex controller 260 has multiple intermediate variables I, J, . . . , but a unitary relation between sensors 110 and actuators 135 is required by the task environment, the sensor matrix 174 and actuator matrix 250 must create patches of high-sensitivity submatrices 106 and 240 that allow every intermediate variable I, J, . . . to participate in transitions that need only one intermediate variable I. In this case, the intermediate variables I, J, . . . may be considered aggregate intermediate variables.

Memory cell reduction

The number of sensor variables A, B, . . . belonging to the digitized sensor unit 275, the number of intermediate variables I, J, . . . , and the number of actuator variables Z, Y, . . . belonging to the digitized actuator unit 276 can be increased without limit. However, the number of memory cells 20 and 200 required in a given application of a network can usually be reduced by limiting the number of intermediate variables I, J, . . . to the expected number of asynchronous diverse lines of behavior, and by limiting the number of values of these intermediate variables I, J, . . . to the expected number of transitions in these lines of behavior, and by limiting the number of values of the sensor variables A, B, . . . and actuator variables Z, Y, . . . to the resolutions required by the control task.

Operation of a digitized network

Each of the sensors 110 and actuators 135 in the network 290 in FIG. 14 can be digitized in the manner of the digitized sensor unit 275 shown in FIG. 15 and the digitized actuator unit 276 shown in FIG. 16, forming the digitized network 300 shown in FIG. 18. The intermediate variables I, J, . . . , and intermediate co-variables I', J', . . . are represented by a set of aggregate intermediate variables I(a) and I(b) . . . , and J(a) and J(b) . . . , and aggregate intermediate co-variables I'(a) and I'(b) . . . and J'(a) and J'(b) . . . . These aggregate intermediate variables I(a) and I(b) . . . , and J(a) and J(b) . . . , and aggregate intermediate co-variables I'(a) and I'(b) . . . and J'(a) and J'(b) . . . carry far more information than the signals 269 and 268 shown in FIG. 13 of a single intermediate variable I and I' or J and J'.

The sensor encoders 182 decompose the values of the sensor variables A and B into a set of aggregate input variables A(a) and A(b) . . . , and B(a) and B(b) . . . . The sensor units 254 forward-select values of the aggregate intermediate variables $I_1(a)$ and $I_1(b)$ . . . , and $J_1(a)$ and $J_1(b)$ . . . of the intermediate units 255, based upon the values of the aggregate input variables A(a) and A(b) . . . , and B(a) and B(b) . . . , and reduce the sensitivity of the memory cells involved in the forward-selection. The intermediate units 255 then forward-select values of the aggregate intermediate variables $I_2(a)$ and $I_2(b)$ . . . and $J_2(a)$ and $J_2(b)$ . . . based upon the values of the aggregate intermediate variables $I_1(a)$ and $I_1(b)$ . . . , and $J_1(a)$ and $J_1(b)$ . . . , and reduce the sensitivity of the memory cells involved in the forward-selection. The actuator units 256 then select values of the aggregate output variables Z(a) and Z(b) . . . , and Y(a) and Y(b) . . . , based upon the values of the aggregate intermediate variables $I_2(a)$ and $I_2(b)$ . . . , and $J_2(a)$ and $J_2(b)$ . . . , and reduce the sensitivity of the memory cells involved in the forward-selection. The actuator decoder 184 then synthesize the aggregate output variables Z(a) and Z(b) . . . , and Y(a) and Y(b) . . . into a value of the output variables Z and Y.

The actuator encoders 186 decompose the actual values of the actuator variables Z' and Y' into a set of aggregate output co-variables Z'(a) and Z'(b) . . . , and Y'(a) and Y'(b) . . . . The actuator units 256 back-select values of the aggregate intermediate co-variables $I_2'(a)$ and $I_2'(b)$ . . . , and $J_2'(a)$ and $J_2'(b)$ . . . , based upon the values of the aggregate output co-variables Z'(a) and Z'(b) . . . , and Y'(a) and Y'(b) . . . , and increase the sensitivity of the memory cells 200 involved in the back-selection. The intermediate units 255 then back-select values of the aggregate intermediate co-variables $I_1'(a)$ and $I_1'(b)$ . . . and $J_1'(a)$ and $J_1'(b)$ . . . based upon the values of the aggregate intermediate variables $I_2'(a)$ and $I_2'(b)$ . . . , and $J_2'(a)$ and $J_2'(b)$ . . . , and increase the sensitivity of the memory cells 200 involved in the back-selection. The back-selected values of the intermediate co-variables $I_1'(a)$ and $I_1'(b)$ . . . and $J_1'(a)$ and $J_1'(b)$ . . . are used to increase the sensitivity of the memory cells 20 connected to the extant values of the aggregate input variables A(a) and A(b) . . . , and B(a) and B(b) . . . in the sensor units 254.

Algorithm of the bidirectional self-learning network

The sequence of events that take place in a transition cycle in the self-learning networks 260, 270, 280, 290 and 300 can be summarized in the algorithm of a self-learning network 302 in FIG. 19. A transition cycle starts when a cycle-on signal 147 from an outside timing source 334 causes the simplest (duplex) self-learning network 260 to identify the input state 308 of the sensor environment 292. The sensor unit 254 of the duplex control memory 258 forward-selects an intermediate state 307 based upon the confidence level of the memory cells 20 for the sensed input conditions 308. The actuator unit 256 selects an actuator output state 306 based upon the confidence level of the memory cells 200 for the intermediate state 307. The confidence level of the memory cells 20 and 200 responsible for these selections are decreased 312 according to some fixed ratio of their confidence levels.

After a time delay 318 that may be required by the dynamics of the actuator environment 294 and the sensor environment 292, the actuators attempt to produce outputs 314. After another delay 328 to allow the actuators to move to their selected positions 314, and to allow the outside influences 322 in the actuator environment 294, or a machine operator to influence the actual positions 320 of the actuators, the actual positions 320 of the actuators are measured in step 330.

The actuator matrix 256 back-selects an intermediate co-state 332 based upon the actual output state 330 and the confidence levels of the memory cells 200. The confidence levels of the back-selecting memory cells 200 are increased by a fixed ratio of their confidence levels. Then the sensor matrix 254 increases the sensitivity 316 of the memory cells 20 at the intersections of the back-selected intermediate co-state 332 and the initial sensed conditions 308 by a fixed ratio of their confidence levels. Then the transition is terminated by a cycle-end signal 161 to the outside timing source 334. After another time delay 326 to allow the effects of the outputs 320 to influence the environment 324, another transition cycle is started by the outside time source 334.

Summary, Ramifications, and Scope

Accordingly, the reader can see that the self-learning machines shown herein can initiate action, and their environment and/or operators can restrict those actions that are physically impossible or inappropriate. This process allows a conditional self-learning machine to establish far more complex and effective behavior than a machine using a traditional associative memory, and may create many new applications, such as self-programming household controls, self-learning auto-pilots, and autonomous self-learning robots that can discover and incorporate behavior not even thought of by human operators.

Although the description above contains many specificities, these should not be construed as limiting the scope of the invention, but as merely providing illustrations of some presently preferred embodiments of this invention. Examples of the ramifications of this invention are given below.

Conditional predetermined machines

The minimum and maximum coils in the conditional self-learning memory cell can be eliminated, forming a conditional predetermined memory cell, and the feedback circuits in the self-learning memory matrices can be eliminated, forming a conditional predetermined memory matrix, which is programmed by manually positioning the wiper arm of the variable resistor element. The conditional predetermined memory cells can be placed in the conditional predetermined memory matrices, forming a conditional predetermined network that can be programmed manually over time to produce the same kind of behavior as the conditional self-learning machines shown herein.

Absolute predetermined machines

The wiper arm and variable resistor of the conditional predetermined memory cells can be replaced with a toggle switch that is either opened or closed by a programmer, forming an absolute predetermined memory cell. These absolute predetermined memory cells can be placed in matrices that have no ramp circuits. Absolute predetermined memory cells can form an absolute predetermined network that records and reproduces the last actual output state that takes places with a given input state in the manner of an associative memory. An absolute predetermined machine that can be programmed to produce the same kind of behavior as an absolute self-learning machine.

Absolute self-learning sensor units

The toggle switch in the absolute memory cell can also be positioned by the write maximum or write minimum coils of the self-learning memory cell, forming an absolute self-learning memory cell. These memory cells can be placed in a sensor unit, but cannot be placed in an actuator unit because they cannot back-select.

Mixed conditional, absolute, self-learning and predetermined machines

The conditional self-learning, conditional predetermined, absolute predetermined, and absolute self-learning memory cells can be placed in a given matrix, forming a mixed memory matrix that may be predisposed to produce specific behavior by virtue of the distribution of each type of memory cell within the matrix, the programming of the predetermined cells, and the learning of the self-learning cells. The learning in the self-learning cells can be made to dominate this predisposed behavior if high enough sensitivities are obtained, or the machine can full back upon its predisposed behavior if it cannot find the consistent relations in its task environment needed to obtain high-sensitivity memory cells.

Other methods of digitization

Methods of digitization can be used other than electrical encoders and decoders. For example, a mechanical encoder having a geared relation between each aggregate variable can be used in place of an electrical encoder. A mechanical decade encoder would have a ten-to-one reduction between each aggregate variable, and mechanical trinary encoder would have a three-to-one reduction between each aggregate variable, the latter being the preferred embodiment.

A mechanical decoder can be used in which the aggregate output variables of a matrix are connected to separate vernier actuators. These vernier actuators can be connected in series with a specific reduction in motion occurring within each connection such that the motion of the first actuator is reduced as it operates upon the second actuator, and so on. A mechanical decade decoder would have a reduction of ten-to-one between each actuator, and a mechanical trinary decoder would have a reduction of three-to-one, the latter being the preferred embodiment.

Each axis of a coordinate measuring machine, or any other machine with a rational coordinate system can encode a space or position vector into a set of aggregate sensor variables. Each axis of a robot or any other machine with a rational coordinate system can be used to decode the aggregate output variables of a matrix into a space or position vector. Another vector encoder can be used to measure the output vector, and provide a feedback signal to a self-learning matrix. The self-learning matrix can then establish a specific set of relations between an input vector and an output vector.

Other methods of implementation

Mechanical relays and physical contacts are used throughout the discussion of self-learning machines to demonstrate the operating principles of these machines without requiring a detailed understanding of solid state electronics. However, transistor gates, hall effect switches, and other solid state devices would be used in self-learning machines in most applications.

The mechanical logarithmic subtraction mechanism shown in FIG. 2 is presented to show how the types of response curves shown in FIG. 3A and FIG. 3B can be generated. Other methods of producing these types of responses could be used in most applications. For example, an electrical charge can be stored for long periods of time in a well-insulated capacitor. In this manner, the insulated gate of a metal nitride oxide semiconductor (MNOS) can be used to store a charge representing the sensitivity of a given conditional memory cell. This electrical charge can change the operating characteristics of the gate in much the same way that the variable resistor changes the operating characteristics of the voltage-sensitive switch. For example, this electrical charge can be reduced when its memory cell selects an output, and this electrical charge can be increased when its memory cell conducts a feedback-complete signal or back-selects a value of a co-variable. The charging and discharging of a capacitor is essentially logarithmic in the manner of the logarithmic subtraction mechanism in FIG. 2.

Permanently connected networks

The sensor and actuator units of the duplex network can be combined into a single duplex machine, simplifying the intermediate variable interfaces of each unit. Like the duplex network, the number of values of each intermediate variable in a duplex machine can be chosen to match the number of transitions in the line of behavior expected to be performed by the duplex machine. Also, the number of intermediate variables can be chosen to match the number of asynchronous diverse lines of behavior expected to be performed by the duplex machine.

In like manner, sensor units can be permanently connected to an intermediate unit, forming a convergent network unit, an intermediate unit can be permanently connected to two or more actuator units, forming a divergent network unit, and sensor units, intermediate units, and actuator units can be permanently connected, forming a directly connected nodal network machine.

Indirect networks

The monolithic and network machines can also be connected in an indirect network of machines in which the actuators of each input machine are indirectly coupled by intermediate environments to the sensors of output machines or intermediate machines. The forward-selecting transformations must proceed from the input machines through the intermediate environments and any intermediate machines to the output machines, and the back-selecting transformations must proceed from the actuator units through the intermediate environments and any intermediate units to the sensor units within one transition cycle. Digitized sensor machines also can be connected to digitized output machines and any digitized intermediate machines indirectly through intermediate environments using digitized sensors and digitized actuators. The digitized intermediate machines also can be connected to digitized actuator units indirectly through an additional intermediate environment using digitized sensors and digitized actuators. These networks of machines greatly increase the potential variety of behavior of these machines without greatly increasing the complexity of each machine.

Thus, the scope of the invention should be determined by the appended claims and their legal equivalents, rather than by the examples given.

I claim:

1. A method for operating a network using a bidirectional memory cell means that stores an analog memory record of a sensitivity, said bidirectional memory cell means being connected to one of a value of an input variable means and a one of a value of an input co-variable means, and one of a value of an output variable means and one of a value of an output co-variable means, uniquely, said method of said bidirectional memory cell means comprising:

a. allowing said bidirectional memory cell means to make a forward-selection of a forward-selected value of said output variable means, and b. making said forward selection by a forward-selecting bidirectional memory cell means, said forward-selecting bidirectional memory cell means being connected to an extant value of said input variable means and said forward-selected value of said output variable means, said forward-selection being made when a forward-selecting voltage ramp means reaches a required voltage level determined by an extant value of said sensitivity, and c. making a reduction is said sensitivity of said forward-selecting bidirectional memory cell means, said reduction being equal to said extant value of said sensitivity multiplied by a predetermined constant, said predetermined constant being in a range from one to a value greater than zero, and d. prohibiting said forward-selection of another value of said output variable means, and e. allowing said bidirectional memory cell means to make a back-selection of a back-selected value of said input co-variable means, and f. making said back-selection by a back-selecting bidirectional memory cell means, said back-selecting bidirectional memory cell means being connected to an extant value of said output co-variable means and said back-selected value of said input co-variable means, said back-selection being made when a back-selecting voltage ramp means reaches said required voltage level determined by said extant value of said sensitivity, and g. making an increase is said sensitivity of said back-selecting bidirectional memory cell means, said increase being equal to a difference between a maximum sensitivity and said extant value of said sensitivity, said difference being multiplied by a predetermined constant, said predetermined constant being in a range from one to a value greater than zero, and h. prohibiting said back-selection of another value of said input co-variable means, wherein i. said sensitivity of said bidirectional memory cell means is determined by a number of times said increase is made in relation to a number of times said decrease is made, whereby j. said bidirectional memory cell means is useful in a network of a self-learning unit means.

2. The method of claim 1 further comprising a bidirectional memory submatrix means, where said bidirectional memory submatrix means is made up of a plurality of said bidirectional memory cell means, wherein said bidirectional memory submatrix means is connected to one said input variable means and said input co-variable means, and one said output variable means and said output co-variable means, said bidirectional memory submatrix means operating in a sequence of a sensing and action period, a method of said bidirectional memory submatrix means comprising:

a. identifying an extant value of said input variable means in said sensing and action period, and b. prohibiting said bidirectional memory submatrix means from identifying another said extant value of said input variable means in said sensing and action period, and allowing said bidirectional memory submatrix means to make said forward selection, and c. making said forward-selection of said forward-selected value of said output variable means within said sensing and action period, said forward-selection being made by one said forward-selecting bidirectional memory cell means in said bidirectional memory submatrix means, said forward-selecting bidirectional memory cell means being connected to said forward-selected value of said output variable means, said forward-selecting bidirectional memory cell means also being in a forward-selecting energized set, said forward-selecting energized set being made up of said bidirectional memory cell means connected to said extant value of said input variable means, said forward-selection being made by comparing a sensitivity value stored in each said bidirectional memory cell means in said forward-selecting energized set of said bidirectional memory cell means, said forward-selecting bidirectional memory cell means having a highest of said sensitivity value in said forward-selecting energized set, and d. making said reduction of said sensitivity of said forward-selecting bidirectional memory cell means, and e. prohibiting said bidirectional memory submatrix means from making another said forward-selection in said sensing and action period, and allowing said bidirectional memory submatrix means to identify an extant value of said output co-variable means, and f. identifying said extant value of said output co-variable means after a predetermined delay from said making said forward-selection, and g. prohibiting said bidirectional memory submatrix means from identifying another said extant value of said output co-variable means in said sensing and action period, and allowing said bidirectional memory submatrix means to make said back-selection, and h. making said back-selection of said back-selected value of said input co-variable means within said sensing and action period, said back-selection being made by one said back-selecting bidirectional memory cell means in said bidirectional memory submatrix means, said back-selecting bidirectional memory cell means being connected to said back-selected value of said input co-variable means, said back-selecting bidirectional memory cell means also being in a back-selecting energized set, said back-selecting energized set being made up of said bidirectional memory cell means connected to said extant value of said output co-variable means, said back-selection being made by comparing said sensitivity value stored in each said bidirectional memory cell means in said back-selecting energized set of bidirectional memory cell means, said back-selecting bidirectional memory cell means having a highest of said sensitivity value in said back-selecting energized set, and i. making said increase in said sensitivity of said back-selecting bidirectional memory cell means, and j. prohibiting said bidirectional memory submatrix means from making another said back-selection in said sensing and action period, wherein k. each said forward-selected value has occurred with a highest historical probability with each said extant value of said input variable means in said sensing and action period, and wherein l. each said back-selected value has occurred with said highest historical probability with each said extant value of said output co-variable means in said sensing and action period, whereby m. each said forward-selected value and each said back-selected value of said bidirectional memory submatrix means can influence other said self-learning unit means in said network of said self-learning unit means.

3. The method of claim 2, further comprising a plurality of said input variable means and said input co-variable means, a plurality of said output variable means and said output co-variable means, and a plurality of said bidirectional memory submatrix means, wherein each said bidirectional memory submatrix means is connected to one said input variable means and said input co-variable means, and one said output variable means and said output co-variable means uniquely, forming a bidirectional monolithic matrix means, a method of said bidirectional monolithic matrix means further comprising:

a. identifying said extant value of each said input variable means in said sensing and action period, and b. prohibiting another said extant value of each said input variable means from being identified in said sensing and action period, and allowing said bidirectional monolithic matrix means to make a forward-selection of a forward-selected value of each said output variable means, and c. making said forward-selection of said forward-selected value in each said output variable means, where one said forward-selecting bidirectional memory cell means in each said bidirectional memory submatrix means contributes to said forward-selection, where said forward-selecting bidirectional memory cell means belong to one of a forward-selecting set, where any one of said forward-selecting set is connected to only one said forward-selected value of only one said output variable means, and where each said forward-selecting set also belongs to at least one of a forward-selecting energized set of said bidirectional memory cell means, said forward-selecting energized set being connected to an extant value of said input variable means, and wherein d. each said forward-selecting set contains a forward-selecting bidirectional memory cell means with a lowest sensitivity, wherein said forward-selecting bidirectional memory cell means with a lowest sensitivity has a higher sensitivity than a non-selecting bidirectional memory cell means with a lowest sensitivity in any of a non-selecting set, each said non-selecting set being connected to an unselected value of said output variable means, said non-selecting bidirectional memory cell means also being in said forward-selecting energized set, and e. making said reduction in said sensitivity in each said forward-selecting bidirectional memory cell means, and f. prohibiting another said forward-selection of said unselected value of said output variable means in said sensing and action period, and allowing an identification of said extant value of each said output co-variable means, and g. identifying said extant value of each said output co-variable means after said predetermined delay from said making said forward-selection, and h. prohibiting another said extant value of each said output co-variable means from being identified in said sensing and action period, and allowing said bidirectional monolithic matrix means to make said back-selection, and i. making said back-selection of said back-selected value of each said input co-variable means, where one of a back-selecting bidirectional memory cell means in each said bidirectional memory submatrix means contributes to said back-selection, where said back-selecting bidirectional memory cell means belong to one of a back-selecting set, where any one of said back-selecting set is connected to only one said back-selected value of only one said input co-variable means, and where each said back-selecting set also belongs to at least one of a back-selecting energized set of said bidirectional memory cell means, said back-selecting energized set being connected to said extant value of said output co-variable means, and wherein j. each said back-selecting set contains a back-selecting bidirectional memory cell means with a lowest sensitivity, wherein said back-selecting bidirectional memory cell means with a lowest sensitivity has a higher sensitivity than a non-back-selecting bidirectional memory cell means with a lowest sensitivity in any of a non-back-selecting set, each said non-back-selecting set being connected to an unselected value of said input co-variable means, said non-back-selecting bidirectional memory cell means also being in said back-selecting energized set, and k. making said increase in said sensitivity in each said back-selecting bidirectional memory cell means, and l. prohibiting another said back-selection of said unselected value of said input co-variable means in said sensing and action period, wherein m. said forward-selected value of said output variable means has a highest historical probability of occurring with said extant value of said input variable means in said sensing and action period, said highest historical probability being due to a multiple of said reduction in said sensitivity and said increase in said sensitivity, and wherein n. said back-selected value of said input co-variable means has a highest historical probability of occurring with said extant value of said output co-variable means in said sensing and action period, said highest historical probability being due to a multiple of said reduction in said sensitivity and said increase in said sensitivity, whereby o. said method of said bidirectional monolithic matrix means is useful in a self-learning intermediate unit means, and in a self-learning actuator unit means in said network of said self-learning unit means.

4. The method of claim 3 further including at least one of an actuator variable means, one said actuator variable means being connected to one said output variable means and said output co-variable means exclusively, said bidirectional monolithic matrix means and said actuator variable means forming said self-learning actuator unit means, a method of said self-learning actuator unit means further comprising:

a. identifying said extant value of each said input variable means in said sensing and action period, and b. prohibiting another said extant value of each said input variable means from being identified in said sensing and action period, and allowing said bidirectional monolithic matrix means to make said forward-selection of said forward-selected value of each said output variable means, and C. making said forward-selection of said forward-selected value of each said output variable means, and d. making said reduction in said sensitivity of said forward-selecting bidirectional memory cell means, and e. prohibiting another said forward-selection of said unselected value of said output variable means in said sensing and action period, and f. making an attempt to produce said forward-selected value, said attempt being made by said actuator variable means, said attempt being made after a predetermined delay from said forward-selection, said attempt being made for a predetermined action period, wherein g. each said actuator variable means arrives at an extant actuator value during said predetermined action period, said extant actuator value being determined by said forward-selected value and forces applied to said actuator variable means, and h. creating a holding force upon said actuator variable means at an end of said predetermined action period, said holding force being made by an actuator brake means, said holding force continuing except when said actuator variable means makes said attempt to produce said forward-selected value, and i. making a measurement of said extant actuator value of each said actuator variable means during a predetermined feedback period within said sensing and action period, said measurement being made by said output co-variable means, said predetermined feedback period occurring after said predetermined action period, and j. prohibiting said measurement of another said extant actuator value in said sensing and action period, and allowing said bidirectional monolithic matrix means to make said back-selection of said back-selected value of each input co-variable means, and k. making said back-selection of said back-selected value of said input co-variable means, said back-selecting being made by said back-selecting bidirectional memory cell means, and l. making said increase in said sensitivity of said back-selecting bidirectional memory cell means, and m. prohibiting another said back-selection of said unselected value of said input co-variable means in said sensing and action period, wherein n. said forward-selected value of said output variable means represents a value of said actuator variable means that is most likely to be carried out with said extant value of said input variable means in said sensing and action period, said forward-selected value being most likely by virtue of a multiple of said reduction in sensitivity and said increase in said sensitivity, and o. said back-selected value of said input co-variable means represents a value of said input variable means that is most likely to forward-select said extant actuator value in said sensing and action period, said back-selected value being most likely by virtue of a multiple of said reduction in sensitivity and multiple said increase in said sensitivity, whereby p. said method of said self-learning actuator unit means is useful in said network of said self-learning unit means.

5. The method of claim 4 further including a self-learning sensor unit means, said self-learning sensor unit means having at least one of a submatrix means, said submatrix means being made up of a plurality of a memory cell means, wherein each said submatrix means is connected to one of a sensor variable means and one of an output variable means of said self-learning sensor unit means and output co-variable means of said self-learning sensor unit means uniquely, and wherein each said memory cell means is connected to one of a value of said sensor variable means and one of a value of said output variable means of said self-learning sensor unit means and said output co-variable means of said self-learning sensor unit means uniquely, and where each said output variable means of said self-learning sensor unit means and said output co-variable means of said self-learning sensor unit means are connected to said input variable means and input co-variable means of said self-learning actuator unit means exclusively, said self-learning sensor unit means and said self-learning actuator unit means forming a duplex network of said self-learning unit means, a method of said duplex network of said self-learning unit means further comprising:

a. identifying said extant value of each said sensor variable means at a beginning of said sensing and action period, and b. prohibiting another said extant value of said sensor variable means from being identified in said sensing and action period, and allowing said self-learning sensor unit means to make a forward-selection of a forward-selected value of each said output variable means of said self-learning sensor unit means, where c. a forward-selecting memory cell means in each said submatrix means makes said forward-selection of said forward-selected value of said output variable means of said self-learning sensor unit means, where said forward-selecting memory cell means belong to a forward-selecting set of said memory cells means, said forward-selecting set being connected to said forward-selected value of said output variable means, and where members of said forward-selecting set also belong to a forward-selecting energized set of said memory cell means, said forward-selecting energized set being connected to said extant value of said sensor variable means at said beginning of said sensing and action period, and wherein d. a lowest sensitivity of said forward-selecting memory cell means in each said forward-selecting set is higher than a lowest sensitivity of a non-selecting memory cell means in any of a non-selecting set of said non-selecting memory cell means, each said non-selecting set being connected to an unselected value of said output variable means of said self-learning sensor unit means, said non-selecting memory cell means also being in said forward-selecting energized set, and e. making a reduction in a sensitivity of each said forward-selecting memory cell means, said reduction being equal to a sensitivity of each said forward-selecting memory cell means multiplied by a predetermined constant, said predetermined constant being in a range greater than zero and less than one, and f. prohibiting another said forward-selection of said unselected value of said output variable means of said self-learning sensor unit means in said sensing and action period, and allowing said self-learning actuator unit means to make said forward-selection of said forward-selected value of each said output variable means of said self-learning actuator unit means, and g. making said forward-selection of said forward-selected value of each of said output variable means of said self-learning actuator unit means, said forward-selection being made by one said forward-selecting bidirectional memory cell means in each said bidirectional memory submatrix means in said bidirectional monolithic matrix means of said self-learning actuator unit means, said forward-selection being made according to said sensitivity of said bidirectional memory cell means connected to each said forward-selected value of each of said output variable means of said self-learning sensor unit means, said forward selection being made in the manner of claim 4, and h. making said reduction in said sensitivity of said forward-selecting bidirectional memory cells means in each said bidirectional memory submatrix means, and i. prohibiting another said forward-selection of said unselected value of said output variable means of said self-learning actuator unit means in said sensing and action period, and allowing said actuator variable means to attempt to produce said forward-selected value, and j. making said attempt to produce said forward-selected value of said actuator variable means, said attempt being made in the manner of claim 4, wherein k. said actuator variable means arrives at said extant actuator value at said end of said predetermined action period, and l. creating said holding force upon said actuator means at said end of said predetermined action period, and m. making said measurement of said extant actuator value of each said actuator means at said end of said predetermined action period, and n. prohibiting said measurement of another said extant actuator value in said sensing and action period, and allowing said self-learning actuator unit means to make said back-selection of said back-selected value of each said input co-variable means of said self-learning actuator unit means, and o. making said back-selection of said back-selected value of said input co-variable means of said self-learning actuator unit means, said back-selection being made by a back-selecting bidirectional memory cell means in each said bidirectional memory submatrix means in said bidirectional monolithic matrix means of said self-learning actuator unit means, said back-selection being made according to said sensitivity of said bidirectional memory means connected to said extant actuator value, said back-selection being made in the manner of claim 4, and p. making said increase in said sensitivity of said back-selecting bidirectional memory cell means, and q. prohibiting another said back-selection of said unselected value of said input co-variable means of said self-learning actuator unit means in said sensing and action period, and allowing said self-learning sensor unit means to make said increase in sensitivity of said feedback-selected memory cell means, and r. making said increase in said sensitivity of each said feedback-selected memory cell means in each said submatrix means in said self-learning sensor unit means, said feedback-selected memory cell means being at an intersection of said extant value of said sensor variable means and said back-selected value of said input co-variable means of said self-learning actuator unit means, said increase being equal to a difference between a maximum possible sensitivity of said memory cell means and said sensitivity of said memory cell means, said difference being multiplied by a predetermined constant, wherein s. said duplex network of said self-learning unit means selects said forward-selected value of each said actuator variable means, said forward-selected value of each said actuator variable means having a highest historical probability of being carried out with said extant value of each said sensor variable means in said sensing and action period, said highest historical probability being due to a multiple said decrease in said sensitivity and a multiple said increase in said sensitivity, whereby t. said method of said duplex network of said self-learning unit means requires fewer said memory cell means and said bidirectional memory cell means when fewer of a sensor/actuator relations are required by a control task, since only as many of a value of an intermediate variable means are required as said sensor/actuator relations, said duplex network of said self-learning unit means forming a self-learning network.

6. The method of claim 5, further including a digitizing means, said digitizing means having digitized connections between each of said self-learning sensor unit means and said sensor variable means forming said digitized self-learning sensor unit means, and digitized connections between each of said self-learning actuator unit means and said actuator variable means forming said digitized self-learning actuator unit means, said digitized self-learning sensor unit means and said digitized self-learning actuator unit means forming a digitized duplex network of said self-learning unit means, a method of said digitized duplex network of said self-learning unit means further comprising:

a. decomposing said extant value of a sensor variable means by an encoder means into a unique combination of values of a plurality of an aggregate input variable means of said self-learning sensor unit means, and b. identifying said extant value of each said aggregate input variable means at said beginning of said sensing and action period, and c. prohibiting another said extant value of each said aggregate input variable means from being identified in said sensing and action period, and allowing said self-learning sensor unit means to make said forward-selection of said forward-selected value of each said output variable means of said self-learning sensor unit means, and d. making said forward-selection by said self-learning sensor unit means of said value of each said output variable means of said self-learning sensor unit means, said forward selection being made according to said sensitivity of said memory cell means connected to said unique combination of values of said plurality of said aggregate input variable means, said forward-selection being made in the manner of claim 5, and e. making said reduction in a sensitivity of each said forward-selecting memory cell means in said self-learning sensor unit means, and f. prohibiting another said forward-selection by said self-learning sensor unit means in said sensing and action period, and allowing said self-learning actuator unit means to make said forward-selection, and g. making said forward-selection by said self-learning actuator unit means of a unique combination of values of a plurality of an aggregate output variable means, said forward-selection being made in the manner of claim 5, and h. making said reduction in a sensitivity of each said forward-selecting bidirectional memory cell means in said self-learning actuator unit means, and i. prohibiting another said forward-selection by said self-learning actuator unit means in said sensing and action period, and j. synthesizing said forward-selected value of said actuator variable means by a decoder means from said unique combination of values of said plurality of said aggregate output variable means of said self-learning actuator unit means, and k. making said attempt by said actuator variable means to produce said forward-selected value of said actuator variable means, wherein l. said actuator variable means arrives at said extant actuator value at said end of said predetermined action period, and m. creating said holding force upon said actuator variable means, and n. making said measurement of said extant value of said actuator variable means at said end of said predetermined period, and o. decomposing said extant value of said actuator variable means by an encoder means into a unique combination of values of a plurality of an aggregate output co-variable means of said self-learning actuator unit means, and p. prohibiting said measurement of another said extant actuator value in said sensing and action period, and allowing said self-learning actuator unit means to make said back-selection of said back-selected value of each said input co-variable means of said self-learning actuator unit means, and q. making said back-selection of said back-selected value of said input co-variable means of said self-learning actuator unit means, said back-selection being made according to said sensitivity of said bidirectional memory cell means connect to said unique combination of values of said plurality of said aggregate output co-variable means, said back-selection being made in the manner of claim 5, and r. making said increase in said sensitivity of each said back-selecting bidirectional memory cell means in said self-learning actuator unit means, and s. prohibiting another said back-selection by said self-learning actuator unit means in said sensing and action period, and allowing said self-learning sensor unit means to make said increase in sensitivity of said feedback-selected memory cell means, and t. making said increase in a sensitivity of each said feedback-selected memory cell means in said self-learning sensor unit means, said feedback-selected memory cell means being at said intersection of said back-selected value of said input co-variable means of said self-learning actuator unit means and said unique combination of values of said plurality of said aggregate input variable means, wherein u. said forward-selected value of said actuator variable means has a highest historical probability of being carried out with said extant value of said sensor variable means in each said sensing and action period, said highest historical probability being due to a multiple of said decrease in said sensitivity and said increase in said sensitivity, whereby v. said method of said digitized duplex network of said self-learning unit means allows said digitized duplex network of said self-learning unit means to have fewer said memory cell means and said bidirectional memory cell means than an undigitized duplex network of said self-learning unit means, said digitized duplex network of said self-learning unit means forming a self-learn network.

7. The method claim 5 further including at least one of a self-learning intermediate unit means, said duplex network of said self-learning unit means and said self-learning intermediate unit means forming a nodal network of said self-learning unit means, where said self-learning intermediate unit means contains at least one said bidirectional memory submatrix means, wherein each said bidirectional memory submatrix means is connected to one of an input variable means of said self-learning intermediate unit means and an input co-variable means of said self-learning intermediate unit means, and one of an output variable means of said self-learning intermediate unit means and an output co-variable means of said self-learning intermediate unit means uniquely, and wherein said input variable means and said input co-variable means of said self-learning intermediate unit means is connected to said output variable means and said output co-variable means of at least one of said self-learning sensor unit means, and said output variable means and said output co-variable means of said self-learning intermediate unit means is connected to an said input variable means and said input co-variable means of at least one of said self-learning actuator unit means, said self-learning intermediate unit means operating in said sensing and action period, a method of said nodal network of said self-learning unit means further comprising:

a. making an identification of said extant value of said sensor variable means of said self-learning sensor unit means, said identification being made at said beginning of said sensing and action period, and b. prohibiting another said extant value of said sensor variable means from being identified in said sensing and action period, and allowing said self-learning sensor unit means to make said forward-selection of said forward-selected value of each said output variable means of said self-learning sensor unit means, and c. making said forward-selection of said forward-selected value of said output variable means of said self-learning sensor unit means in said sensing and action period, and d. making said reduction in said sensitivity of each said forward-selecting memory cell means in said self-learning sensor unit means, and e. prohibiting another said forward-selection by said self-learning sensor unit means in said sensing and action period, and allowing said self-learning intermediate unit means to make said forward-selection, and f. making said forward-selection of a forward-selected value of said output variable means of said self-learning intermediate unit means in said sensing and action period, said forward-selection being made according to said sensitivity of said bidirectional memory cell means connected to said forward-selected value of said output variable means of said self-learning sensor unit means, said forward-selection being made in the manner of said self-learning actuator unit means of claim 5, and g. making said reduction in said sensitivity of each of said forward-selecting bidirectional memory cell means in said self-learning intermediate unit means, and h. prohibiting another said forward-selection by said self-learning intermediate unit means in said sensing and action period, and allowing said self-learning actuator unit means to make said forward-selection, and i. making said forward-selection of said forward-selected value of each of said output variable means of said self-learning actuator unit means, said forward-selection being made according to said sensitivity of said bidirectional memory cell means connected to said forward-selected value of said output variable means of said self-learning intermediate unit means, said forward-selection being made in the manner of claim 5, and j. making said reduction in said sensitivity of each said forward-selecting bidirectional memory cell means in each said self-learning actuator unit means, and k. prohibiting another said forward-selection by said self-learning actuator unit means in said sensing and action period, and l. making said attempt to produce said forward-selected value of each said actuator unit means, and m. creating said holding force on each said actuator variable means by said actuator brake means, and n. making said measurement of said extant value of each said actuator variable means after said delay to allow said actuator variable means to reach said forward-selected value, and o. prohibiting said measurement of another said extant actuator value in said sensing and action period, and allowing said self-learning actuator unit means to make said back-selection, and p. making said back-selection in said self-learning actuator unit means of each said back-selected value of said input co-variable means of said self-learning actuator unit means, said back-selection in said self-learning actuator unit means being made in the manner of claim 5, and q. making said increase in said sensitivity of each said back-selecting bidirectional memory cell means in said self-learning actuator unit means, and r. prohibiting another said back-selection by said self-learning actuator unit means in said sensing and action period, and allowing said self-learning intermediate unit means to make said back-selection, and s. making a back-selection by said self-learning intermediate unit means of a back-selected value of each said input co-variable means of said self-learning intermediate unit means, said back-selection in said self-learning intermediate unit means being made according to said sensitivity of said bidirectional memory cell means connected to said back-selected value of each said input co-variable means of said self-learning actuator unit means, said back-selection in said self-learning intermediate unit means being made in the manner of claim 5, and t. making said increase in said sensitivity of each said back-selecting memory cell means in said self-learning intermediate unit means, and u. prohibiting another said back-selection by said self-learning intermediate unit means in said sensing and action period, and allowing said self-learning sensor unit means to make said increase in sensitivity of said feedback-selected memory cell means, and v. making said increase in said sensitivity of each said feedback-selected memory cell means in said self-learning sensor unit means, said feedback-selected memory cell means being at said intersection of said back-selected value of each said input co-variable means of said self-learning intermediate unit means and said extant value of said sensor variable means, wherein w. said forward-selected value of each said actuator variable means has a highest historical probability of having been carried out with said extant value of each said sensor variable means in each said sensing and action period, said highest historical value being due to a multiple of said decrease in said sensitivity and a multiple of said increase in said sensitivity, whereby x. said method of said nodal network of said self-learning unit means allows multiple said self-learning sensor unit means to be connected to multiple said self-learning actuator unit means with fewer interconnections and a smaller memory matrix means than multiple of said duplex network of said self-learning unit means, said nodal network of said self-learning unit means being a self-learning network.

8. The method of claim 7, further including a digitizing means, said digitizing means having digitized connections between each of said self-learning sensor unit means and said sensor variable means forming said digitized self-learning sensor unit means, and digitized connections between each of said self-learning actuator unit means and said actuator variable means forming said digitized self-learning actuator unit means, said digitized self-learning sensor unit means and said digitized self-learning actuator unit means forming a digitized nodal network of said self-learning unit means, a method of said digitized nodal network of said self-learning unit means further comprising:

a. decomposing said extant value of said sensor variable means by an encoder means into a unique combination of values of a plurality of an aggregate input variable means, and b. identifying said extant value of each said aggregate input variable means at said beginning of said sensing and action period, and c. prohibiting another said extant value of each said aggregate input variable means from being identified in said sensing and action period, and allowing said self-learning sensor unit means to make said forward-selection of said forward-selected value of each said output variable means of said self-learning sensor unit means, and d. making said forward-selection of said forward-selected value of each of said output variable means of said self-learning sensor unit means, said forward-selection being made according to said unique combination of values of said plurality of said aggregate input variable means, said forward-selection being made in the manner of claim 7, and e. making said reduction in said sensitivity of each said forward-selecting memory cell means in said self-learning sensor unit means, and f. prohibiting said self-learning sensor unit means from making another said forward-selection in said sensing and action period, and allowing said self-learning intermediate unit means to make said forward-selection, and g. making said forward-selection of said forward-selected value of each of said output variable means of said self-learning intermediate unit means, said forward-selection being made in the manner of claim 7, and h. making said reduction in said sensitivity of each said forward-selecting bidirectional memory cell means in said self-learning intermediate unit means, and i. prohibiting said self-learning intermediate unit means from making another said forward-selection in said sensing and action period, and allowing said self-learning actuator unit means to make said forward-selection, and j. making said forward-selection of a unique combination of values of a plurality of an aggregate output variable means, said forward-selection being made by said self-learning actuator unit means, said forward-selection being made according to said sensitivity of said bidirectional memory cell means connected to said forward-selected value of each said output variable means of said self-learning intermediate unit means, said forward-selection being made in the manner of claim 7, and k. making said reduction in said sensitivity of each of said forward-selecting bidirectional memory cell means in said self-learning actuator unit means, and l. prohibiting another said forward-selection by said self-learning actuator unit means in said sensing and action period, and m. synthesizing said forward-selected value of each of said actuator variable means by a decoder means from said unique combination of values of said plurality of said aggregate output variable means of said self-learning actuator unit means, and n. making said attempt to produce said forward-selected value of said actuator variable means during said predetermined action period, and o. creating said holding force upon said actuator variable means after said predetermined action period, and p. making said measurement of said extant actuator value after a sufficient delay to allow said actuator variable means to arrive at said forward-selected value, and q. decomposing said extant actuator value of said actuator variable means by an encoder means into a unique combination of values of a plurality of aggregate output co-variable means of each said self-learning actuator unit means, and r. prohibiting said measurement of another said extant actuator value in said sensing and action period, and allowing said self-learning actuator unit means to make said back-selection, and s. making said back-selection of said back-selected value of said input co-variable means of said self-learning actuator unit means, said back-selection being made according to said unique combination of values of said plurality of said aggregate output co-variable means, said back-selection being made in the manner of claim 7, and t. making said increase in said sensitivity of each said back-selecting bidirectional memory cell means in each said self-learning actuator unit means, and u. prohibiting another said back-selection by said self-learning actuator unit means in said sensing and action period, and allowing said self-learning intermediate unit means to make said back-selection, and v. making said back-selection of said back-selected value of said input co-variable means of said self-learning intermediate unit means, and w. making said increase in said sensitivity of each said back-selecting bidirectional memory cell means in said self-learning intermediate unit means, and x. prohibiting another said back-selection by said self-learning intermediate unit means in said sensing and action period, and allowing said self-learning sensor unit means to make said increase in sensitivity of said feedback-selected memory cell means, and y. making said increase in said sensitivity of each said feedback-selected memory cell means in said self-learning sensor unit means, said increase being made at said intersection of said back-selected value of said input co-variable interface means of said self-learning intermediate unit means and said extant value of said aggregate input variable means, wherein z. said digitized nodal network of said self-learning unit means forward-selects said forward-selected value of said actuator variable means, said forward-selected value of said actuator variable means having been carried out with a highest historical probability with said extant value of said sensor variable means in each said sensing and action period, said highest historical probability being due to a multiple of said decrease and said increase in said sensitivity, whereby aa. said method of said digitized nodal network of said self-learning unit means operates with fewer said memory cell means and fewer said bidirectional memory cell means than an undigitized nodal network of said self-learning unit means, said digitized nodal network of said self-learning unit means being a self-learning network.

* * * * *